(12) United States Patent
Anzures et al.

(10) Patent No.: US 10,209,810 B2
(45) Date of Patent: Feb. 19, 2019

(54) USER INTERFACE INTERACTION USING VARIOUS INPUTS FOR ADDING A CONTACT

(71) Applicant: Apple Inc., Cupertino, CA (US)

(72) Inventors: Freddy Allen Anzures, San Francisco, CA (US); Imran Chaudhri, San Francisco, CA (US); Alan C. Dye, San Francisco, CA (US); Jonathan P. Ive, San Francisco, CA (US); Duncan Robert Kerr, San Francisco, CA (US); Nicholas V. King, San Jose, CA (US); Kevin Lynch, Woodside, CA (US); Gregory Novick, Santa Clara, CA (US); Daniel Trent Preston, San Jose, CA (US); Monica Jenkins, San Francisco, CA (US); Lawrence Y. Yang, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 334 days.

(21) Appl. No.: 14/839,919

(22) Filed: Aug. 28, 2015

(65) Prior Publication Data

US 2016/0062630 A1  Mar. 3, 2016

Related U.S. Application Data

(63) Continuation of application No. PCT/US2015/034609, filed on Jun. 7, 2015.
(Continued)

(51) Int. Cl.
*G06F 3/048* (2013.01)
*G06F 3/00* (2006.01)
(Continued)

(52) U.S. Cl.
CPC ........... *G06F 3/0416* (2013.01); *F16M 13/00* (2013.01); *G06F 3/016* (2013.01); *G06F 3/017* (2013.01);
(Continued)

(58) Field of Classification Search
CPC ............ G06F 3/048; G06F 3/041; G06F 3/00
See application file for complete search history.

(56) References Cited

U.S. PATENT DOCUMENTS 5,672,107 A    9/1997  Clayman
6,556,222 B1   4/2003  Narayanaswami
(Continued)

FOREIGN PATENT DOCUMENTS

CN    1330303 A     1/2002
CN    102812446 A   12/2012
(Continued)

OTHER PUBLICATIONS

Notice of Allowance received for Chinese Patent Application No. 201620476062.4, dated Apr. 20, 2017, 3 pages (2 pages of English translation and 1 page of Official Copy).
(Continued)

*Primary Examiner* — Hugo Molina
(74) *Attorney, Agent, or Firm* — Dentons US LLP

(57) ABSTRACT

A device with a touch-sensitive display, a rotatable input mechanism, processors, and memory storing programs for displaying, on the touch-sensitive display, a user interface comprising a plurality of objects each associated with a contact and an affordance representing a first contact is disclosed. The memory may include programs for, in response to receiving the first input, updating the visual appearance of the affordance to represent the second contact among the plurality of contacts, and the memory also may include programs for, after updating the visual appearance of
(Continued)

the affordance, updating display of the affordance to an add contact affordance, where the add contact affordance was not displayed prior to detecting the second input corresponding to the selection of the object that is not associated with any contact. Further, the memory may include programs for displaying a user interface for adding a contact upon selection of the add contact affordance.

48 Claims, 51 Drawing Sheets

Related U.S. Application Data

(60) Provisional application No. 62/129,955, filed on Mar. 8, 2015, provisional application No. 62/044,961, filed on Sep. 2, 2014.

(51) Int. Cl.
| | | |
|---|---|---|
| *G06F 3/041* | (2006.01) | |
| *G06F 3/01* | (2006.01) | |
| *G06F 3/0484* | (2013.01) | |
| *G06F 3/0482* | (2013.01) | |
| *G06T 11/20* | (2006.01) | |
| *G06F 3/0488* | (2013.01) | |
| *H04L 12/58* | (2006.01) | |
| *F16M 13/00* | (2006.01) | |
| *G06F 3/0481* | (2013.01) | |

(52) U.S. Cl.
CPC ............ *G06F 3/048* (2013.01); *G06F 3/0481* (2013.01); *G06F 3/0482* (2013.01); *G06F 3/04842* (2013.01); *G06F 3/04845* (2013.01); *G06F 3/04847* (2013.01); *G06F 3/04883* (2013.01); *G06T 11/20* (2013.01); *H04L 51/066* (2013.01); *H04L 51/10* (2013.01); *G06F 2203/04104* (2013.01); *G06F 2203/04806* (2013.01); *H04L 51/32* (2013.01)

(56) References Cited

U.S. PATENT DOCUMENTS

| | | |
|---|---|---|
| 6,661,438 B1 | 12/2003 | Shiraishi et al. |
| 6,809,724 B1 | 10/2004 | Shiraishi et al. |
| 7,120,455 B1 | 10/2006 | Chen et al. |
| 7,262,785 B2 | 8/2007 | Silverman et al. |
| 7,697,002 B2 | 4/2010 | Mccall et al. |
| 8,464,167 B2 | 6/2013 | Saund et al. |
| 8,811,951 B1 | 8/2014 | Faaborg et al. |
| 8,941,500 B1 | 1/2015 | Faaborg et al. |
| 9,430,065 B2 | 8/2016 | Petkov et al. |
| 9,489,081 B2 | 11/2016 | Anzures et al. |
| 2004/0044732 A1 | 3/2004 | Fushiki et al. |
| 2004/0100497 A1* | 5/2004 | Quillen ................... H04L 67/36 715/751 |
| 2006/0209802 A1 | 9/2006 | Kang et al. |
| 2007/0038943 A1 | 2/2007 | FitzGerald et al. |
| 2007/0106739 A1 | 5/2007 | Clark et al. |
| 2007/0168879 A1 | 7/2007 | Reville et al. |
| 2007/0271528 A1* | 11/2007 | Park ..................... G06F 3/0482 715/810 |
| 2008/0057926 A1* | 3/2008 | Forstall ............... G06F 3/0482 455/415 |
| 2008/0122796 A1* | 5/2008 | Jobs .................... G06F 3/0488 345/173 |
| 2008/0201438 A1* | 8/2008 | Mandre .................. H04L 51/04 709/206 |
| 2008/0234006 A1 | 9/2008 | Lee et al. |
| 2008/0307342 A1 | 12/2008 | Furches et al. |
| 2009/0059730 A1 | 3/2009 | Lyons et al. |
| 2009/0085889 A1 | 4/2009 | Hyeon |
| 2009/0088659 A1 | 4/2009 | Graham et al. |
| 2009/0276702 A1* | 11/2009 | Bamford ............... G06F 3/0485 715/702 |
| 2010/0050086 A1 | 2/2010 | Sherrard et al. |
| 2010/0088628 A1* | 4/2010 | Flygh ................... G06F 3/0481 715/779 |
| 2010/0138756 A1 | 6/2010 | Saund et al. |
| 2010/0211915 A1 | 8/2010 | Sawai |
| 2010/0262905 A1 | 10/2010 | Li |
| 2010/0266323 A1* | 10/2010 | Min ........................ B41J 5/10 400/472 |
| 2010/0306702 A1 | 12/2010 | Warner |
| 2011/0022992 A1 | 1/2011 | Zhou et al. |
| 2011/0078634 A1* | 3/2011 | Klappert ............... G06F 3/0346 715/850 |
| 2011/0096040 A1 | 4/2011 | Hasegawa |
| 2011/0151850 A1 | 6/2011 | Haaparanta et al. |
| 2011/0157046 A1 | 6/2011 | Lee et al. |
| 2011/0167350 A1* | 7/2011 | Hoellwarth ........... G06F 3/0483 715/727 |
| 2011/0214044 A1 | 9/2011 | Davis et al. |
| 2011/0227718 A1* | 9/2011 | Waller .................. G06F 3/0481 340/461 |
| 2011/0304557 A1 | 12/2011 | Wilburn et al. |
| 2012/0030624 A1 | 2/2012 | Migos |
| 2012/0036147 A1* | 2/2012 | Borst ....................... H04L 51/12 707/769 |
| 2012/0042283 A1 | 2/2012 | Tuesta et al. |
| 2012/0058785 A1 | 3/2012 | Clark et al. |
| 2012/0210261 A1 | 8/2012 | Sarnoff et al. |
| 2012/0216113 A1 | 8/2012 | Li |
| 2012/0252416 A1 | 10/2012 | Kissinger et al. |
| 2012/0253485 A1 | 10/2012 | Weast et al. |
| 2012/0266069 A1 | 10/2012 | Moshiri et al. |
| 2013/0014022 A1 | 1/2013 | Takasugi et al. |
| 2013/0050119 A1* | 2/2013 | Nemoto ................ G06F 3/0488 345/173 |
| 2013/0050141 A1* | 2/2013 | Park ..................... G06F 3/0488 345/174 |
| 2013/0069889 A1 | 3/2013 | Pearce et al. |
| 2013/0086487 A1 | 4/2013 | Findlay et al. |
| 2013/0096895 A1* | 4/2013 | Willard .................. B60K 37/02 703/8 |
| 2013/0125062 A1 | 5/2013 | Lee et al. |
| 2013/0176505 A1* | 7/2013 | Lee ........................... H04N 5/44 348/734 |
| 2013/0179800 A1 | 7/2013 | Jeong et al. |
| 2013/0227474 A1* | 8/2013 | Dondurur ............. G06F 3/0482 715/808 |
| 2013/0275525 A1 | 10/2013 | Molina et al. |
| 2013/0283180 A1 | 10/2013 | Vance et al. |
| 2013/0321306 A1 | 12/2013 | Bauermeister et al. |
| 2014/0006941 A1 | 1/2014 | Smirnova |
| 2014/0007008 A1* | 1/2014 | Baca ..................... G06F 3/0482 715/810 |
| 2014/0062892 A1 | 3/2014 | Dickinson et al. |
| 2014/0066131 A1 | 3/2014 | Yoo |
| 2014/0068494 A1 | 3/2014 | Petersen et al. |
| 2014/0082522 A1 | 3/2014 | Gunderson et al. |
| 2014/0143678 A1 | 5/2014 | Mistry et al. |
| 2014/0149884 A1* | 5/2014 | Flynn, III ............... G06Q 10/10 715/752 |
| 2014/0184497 A1 | 7/2014 | Birnbaum et al. |
| 2014/0188271 A1* | 7/2014 | Hernandez ........... B67D 1/0888 700/232 |
| 2014/0325410 A1 | 10/2014 | Jung et al. |
| 2014/0325435 A1 | 10/2014 | Jung et al. |
| 2014/0365850 A1 | 12/2014 | Maloney et al. |
| 2014/0365912 A1* | 12/2014 | Shaw ................... G06F 3/04817 715/748 |
| 2014/0365980 A1 | 12/2014 | Morrison et al. |
| 2015/0015508 A1 | 1/2015 | Song et al. |
| 2015/0066683 A1 | 3/2015 | Azose |
| 2015/0082237 A1 | 3/2015 | Konishi et al. |
| 2015/0121251 A1 | 4/2015 | Kadirvel et al. |
| 2015/0135108 A1 | 5/2015 | Pope et al. |
| 2015/0149930 A1 | 5/2015 | Walkin et al. |
| 2015/0154443 A1 | 6/2015 | Ookawara et al. |

(56) References Cited

U.S. PATENT DOCUMENTS

| | | | |
|---|---|---|---|
| 2015/0160807 A1* | 6/2015 | Vakharia | G06F 3/0484 |
| | | | 705/26.63 |
| 2015/0160832 A1* | 6/2015 | Walkin | G06F 3/04883 |
| | | | 715/765 |
| 2015/0177975 A1* | 6/2015 | Lee | G06T 11/40 |
| | | | 715/211 |
| 2015/0206005 A1* | 7/2015 | Jung | G06K 9/00402 |
| | | | 382/189 |
| 2015/0254281 A1* | 9/2015 | Sauve | G06F 17/30268 |
| | | | 348/239 |
| 2015/0269009 A1 | 9/2015 | Faaborg et al. | |
| 2015/0277685 A1* | 10/2015 | Shieh | G06F 3/0412 |
| | | | 715/752 |
| 2016/0062541 A1 | 3/2016 | Anzures et al. | |
| 2016/0062574 A1 | 3/2016 | Anzures et al. | |
| 2016/0098093 A1 | 4/2016 | Cheon et al. | |
| 2016/0147436 A1 | 5/2016 | Tsutsui | |
| 2016/0162177 A1 | 6/2016 | Kim | |
| 2016/0253090 A1 | 9/2016 | Angelov et al. | |
| 2017/0168707 A1 | 6/2017 | Anzures et al. | |

FOREIGN PATENT DOCUMENTS

| | | |
|---|---|---|
| CN | 102968235 A | 3/2013 |
| CN | 103116468 A | 5/2013 |
| CN | 103488421 A | 1/2014 |
| CN | 103631514 A | 3/2014 |
| CN | 103870190 A | 6/2014 |
| CN | 205176822 U | 4/2016 |
| EP | 2323322 A1 | 5/2011 |
| EP | 2698686 A2 | 2/2014 |
| EP | 2733598 A2 | 5/2014 |
| EP | 2741177 A1 | 6/2014 |
| JP | 2008-47122 A | 2/2008 |
| TW | 200910167 A | 3/2009 |
| TW | 200949629 A | 12/2009 |
| TW | 201123817 A | 7/2011 |
| WO | 2011/107656 A1 | 9/2011 |
| WO | 2014004558 A2 | 1/2014 |

OTHER PUBLICATIONS

Office Action received for Danish Patent Application No. PA201570566, dated May 5, 2017, 14 pages.
Non Final Office Action received for U.S. Appl. No. 14/839,918, dated Feb. 8, 2016, 24 pages.
Non Final Office Action received for U.S. Appl. No. 14/839,921, dated Nov. 2, 2015, 24 pages.
Notice of Allowance received for Chinese Patent Application No. 201520670045.X, dated Mar. 8, 2016, 5 pages (3 pages of English Translation and 2 pages of Official Copy).
Office Action received for Danish Patent Application No. PA201570566, dated Feb. 15, 2016, 10 pages.
Final Office Action received for U.S. Appl. No. 14/839,918, dated Jun. 1, 2016, 22 pages.
Notice of Allowance and Search Report received for Taiwanese Patent Application No. 104128683, dated Jun. 8, 2016, 4 pages (3 pages of Official Copy and 1 page of Search Report Translation). (See Communication under 37 CFR § 1.98(a) (3)).
Office Action received for Australian Patent Application No. 2016100553, dated Jul. 14, 2016, 4 pages.
Office Action received for Danish Patent Application No. PA201570564, dated May 24, 2016, 9 pages.
Office Action received for Taiwanese Patent Application No. 104128681, dated Oct. 11, 2016, 54 pages (22 pages of English Translation and 32 pages of Official Copy).
"Things I Hate about your Design", Available online at https://thingsihateaboutyourdesign.wordpress.com/, 2011, 3 pages.
Office Action received for Australian Patent Application No. 2016100553, dated Oct. 4, 2016, 3 pages.

Office Action received for Australian Patent Application No. 2016100553, dated Oct. 28, 2016, 5 pages.
Office Action received for Chinese Patent Application No. 2016204760624, dated Sep. 14, 2016, 3 pages (1 page of English Translation and 2 pages of Official Copy).
Office Action received for Danish Patent Application No. PA201570566, dated Sep. 26, 2016, 12 pages.
Office Action received for Danish Patent Application No. PA201570564, dated Dec. 9, 2016, 12 pages.
Office Action received for Taiwanese Patent Application No. 104128682, dated Nov. 8, 2016, 15 pages (6 pages of English Translation and 9 pages of Official Copy).
International Preliminary Report on Patentability received for PCT Patent Application No. PCT/US2015/046778, dated Mar. 16, 2017, 24 pages.
International Preliminary Report on Patentability received for PCT Patent Application No. PCT/US2015/034609, dated Mar. 16, 2017, 10 pages.
Notice of Allowance received for U.S. Appl. No. 15/345,130, dated Jun. 27, 2017, 8 pages.
Search Report and Opinion received for Netherlands Patent Application No. 2015373, dated Jun. 6, 2017, 18 pages (7 pages of English Translation of Search Opinion and 11 pages of official copy).
Non-Final Office Action received for U.S. Appl. No. 14/839,918, dated Feb. 8, 2017, 30 Pages.
Office Action received for Australian Patent Application No. 2016100553, dated Jan. 11, 2017, 4 pages.
Office Action received for Chinese Patent Application No. 201620476062.4, dated Jan. 6, 2017, 3 pages (1 page of English Translation and 2 pages of Official Copy).
International Search Report and Written Opinion received for PCT Patent Application No. PCT/US2015/034609, dated Sep. 24, 2015, 14 pages.
Invitation to Pay Additional Fees received for PCT Patent Application No. PCT/US2015/046778, dated Nov. 27, 2015, 7 pages.
Office Action received for Australian Patent Application No. 2015101203, dated Dec. 14, 2015, 3 pages.
Office Action received for Australian Patent Application No. 2015101204, dated Dec. 17, 2015, 4 pages.
Office Action received for Chinese Patent Application No. 201520669793.6, dated Nov. 3, 2015, 3 pages (2 pages English Translation and 1 page official copy).
"IDroo Whiteboard for Skype", Available at https://web.archive.org/web/20130817130818/http://www.idroo.com, Aug. 17, 2013, 1 page.
"Feel Me' iOS Texting App Gives You a Direct Live Connection", Available on <http://mashable.com/2012/05/27/feel-me/#56ww9s07tuqZ>, May 27, 2012, 2 pages.
Non Final Office Action received for U.S. Appl. No. 14/839,921, dated Apr. 19, 2016, 23 pages.
Office Action received for Chinese Patent Application No. 2015206697936, dated Mar. 31, 2016, 4 pages (3 pages of English Translation and 1 page of Official copy).
Office action received for Danish Patent Application No. PA201570564, dated Apr. 5, 2016, 11 pages.
International Search Report and Written Opinion received for PCT Patent Application No. PCT/US2015/046778, dated Mar. 31, 2016, 31 pages.
Notice of Allowance received for U.S. Appl. No. 14/839,918, dated Aug. 3, 2017, 2 pages.
Notice of Allowance received for U.S. Appl. No. 14/839,918, dated Jul. 26, 2017, 2 pages.
Non-Final Office Action received for U.S. Appl. No. 14/839,918, dated Sep. 22, 2016, 25 pages.
Notice of Allowance received for U.S. Appl. No. 14/839,921, dated Aug. 9, 2016, 15 pages.
Office Action received for Danish Patent Application No. PA201570566, dated Sep. 5, 2016, 12 pages.
Notice of Allowance received for U.S. Appl. No. 14/839,918, dated Jul. 14, 2017, 10 pages.
Search Report and Opinion received for Netherlands Patent Application No. 2015375, dated Jun. 13, 2017, 18 pages (8 pages of English Translation and 10 pages of Official Copy).

(56) References Cited

OTHER PUBLICATIONS

Office Action received for Danish Patent Application No. PA201570564, dated Feb. 21, 2018, 15 pages.
Office Action Received for Chinese Patent Application No. 201510549823.4, dated Dec. 18, 2017, 21 pages (7 pages of English translation and 14 pages of Official Copy).
Notice of Allowance received for Taiwanese Patent Application No. 104128682, dated Apr. 18, 2018, 9 pages (6 pages of English Translation and 3 pages of Official Copy).
Office Action received for Taiwanese Patent Application No. 104128682, dated Sep. 30, 2017, 11 pages (5 pages of English Translation and 6 pages of Official Copy).
Notice of Allowance received for U.S. Appl. No. 14/839,918, dated Nov. 20, 2017, 5 pages.
Office Action received for Australian Patent Application No. 2015312265, dated Nov. 28, 2017, 5 pages.
Office Action Received for Chinese Patent Application No. 201510549823.4, dated Aug. 9, 2018, 7 pages (3 pages of English Translation and 4 pages of Official copy).
Search Report and Opinion received for Netherlands Patent Application No. 2019802, dated Mar. 15, 2018, 9 pages (4 pages of English Translation and 5 pages of Official Copy).
Notice of Acceptance received for Australian Patent Application No. 2015312265, dated Aug. 3, 2018, 3 pages.
Notice of Acceptance received for Australian Patent Application No. 2018204025, dated Jul. 10, 2018, 3 pages.
Office Action received for Chinese Patent Application No. 201510548824.7, dated May 3, 2018, 20 pages (7 pages of English Translation and 13 pages of Official Copy).

\* cited by examiner

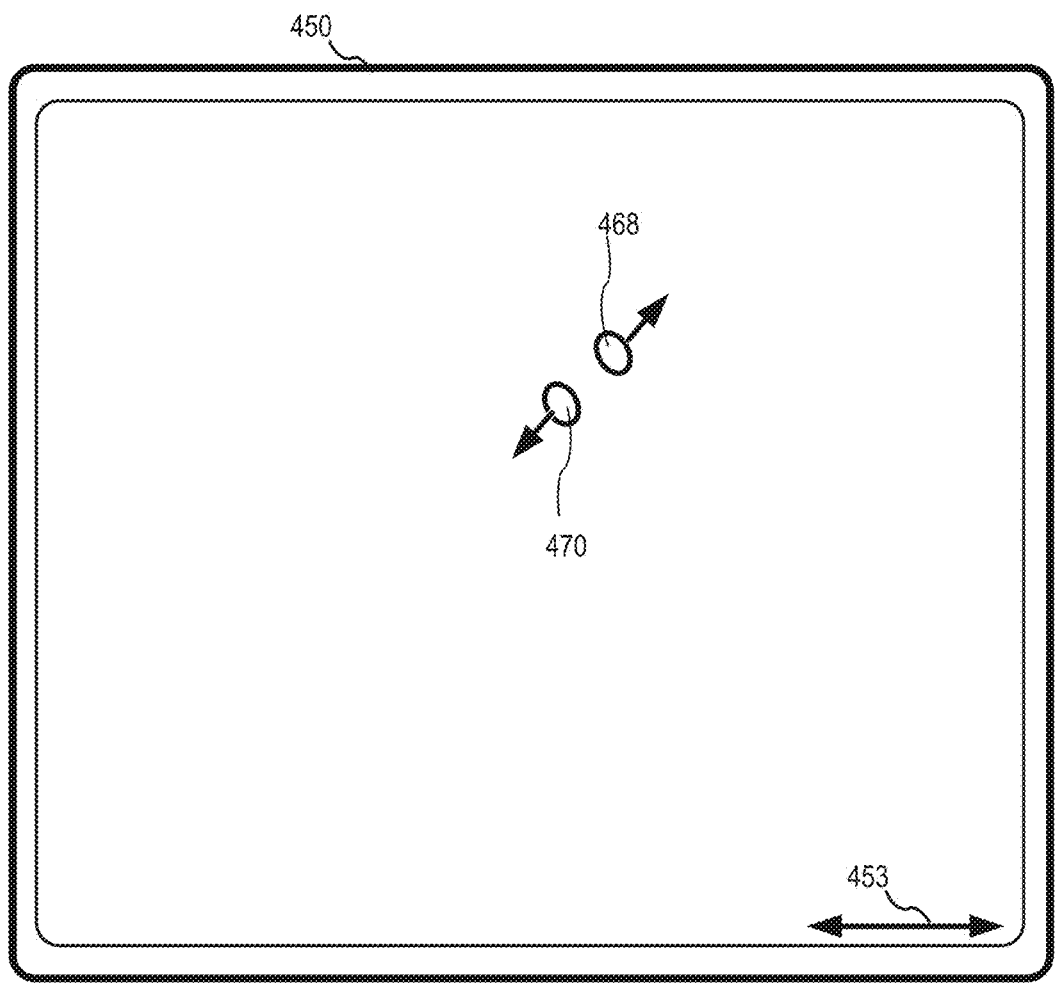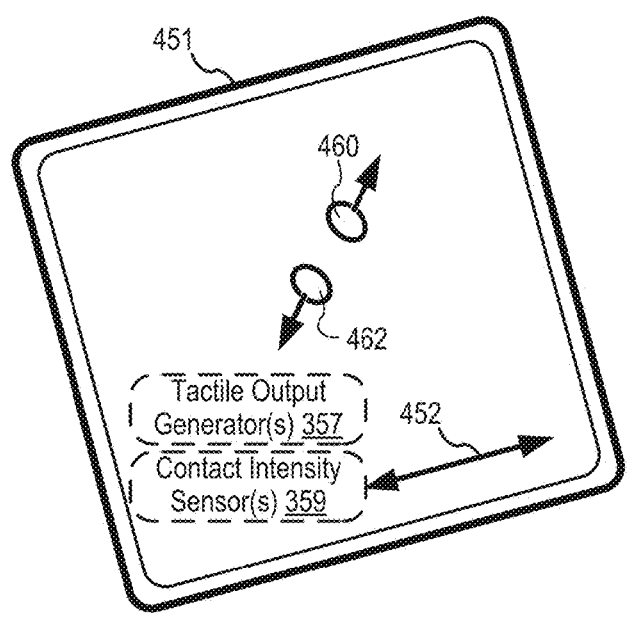
FIG. 4B

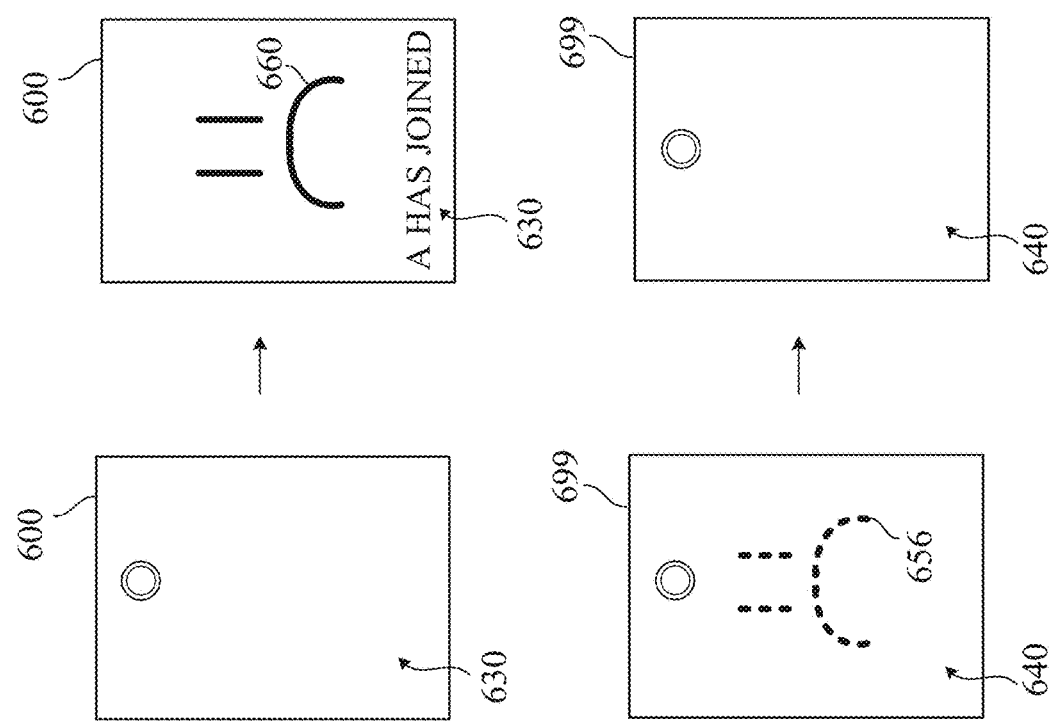

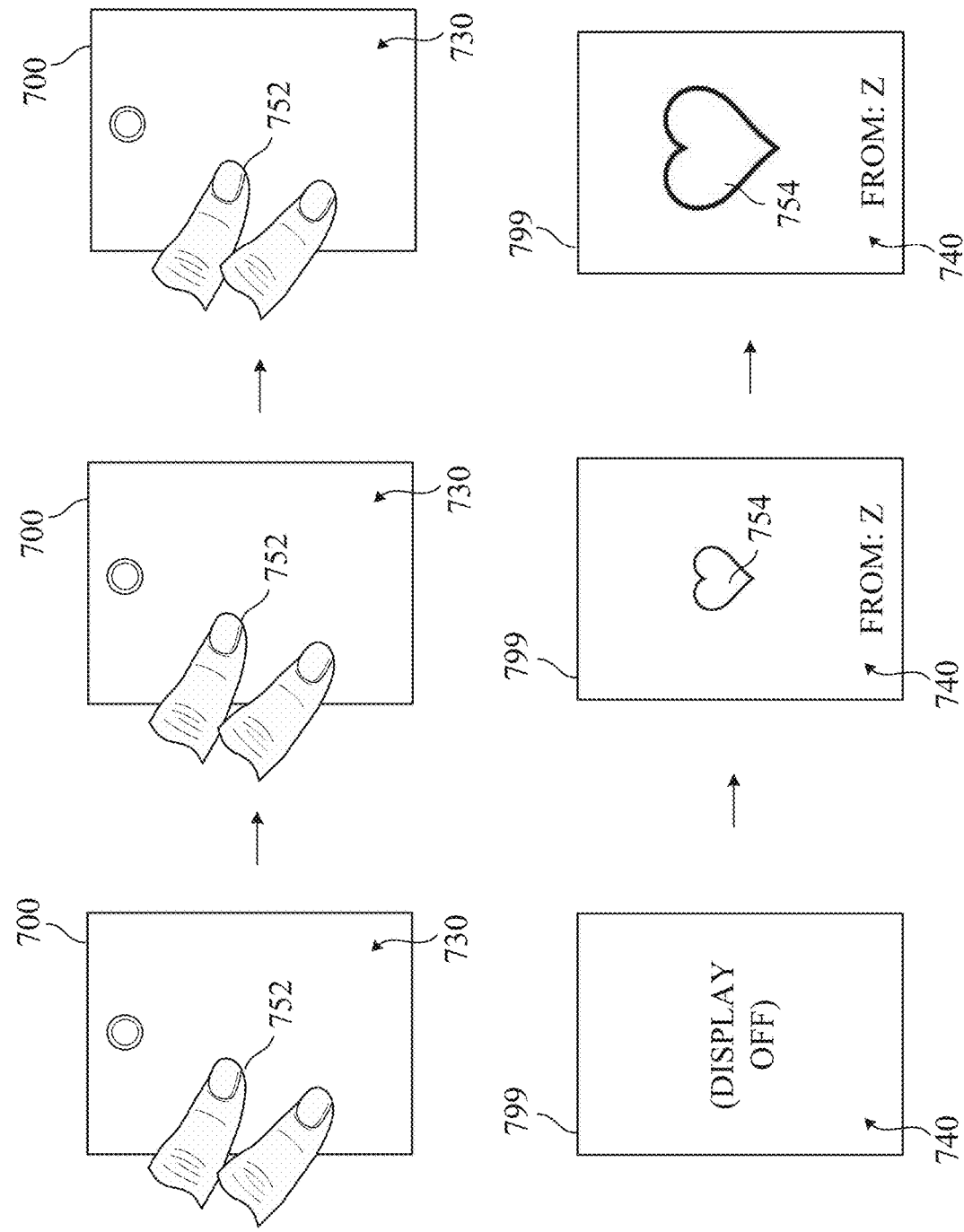

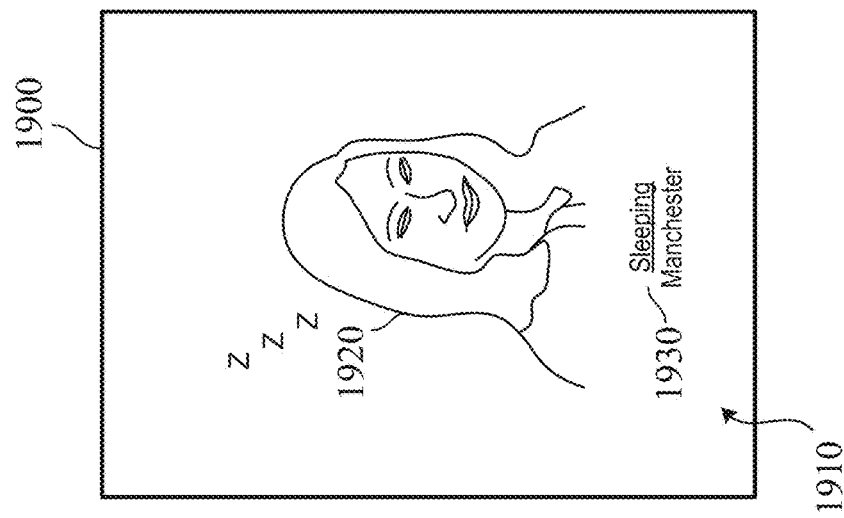
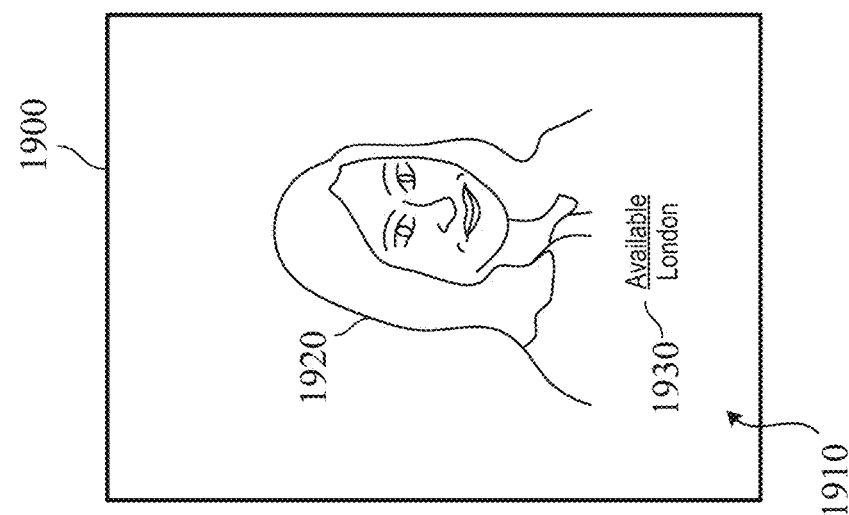
FIG. 19A

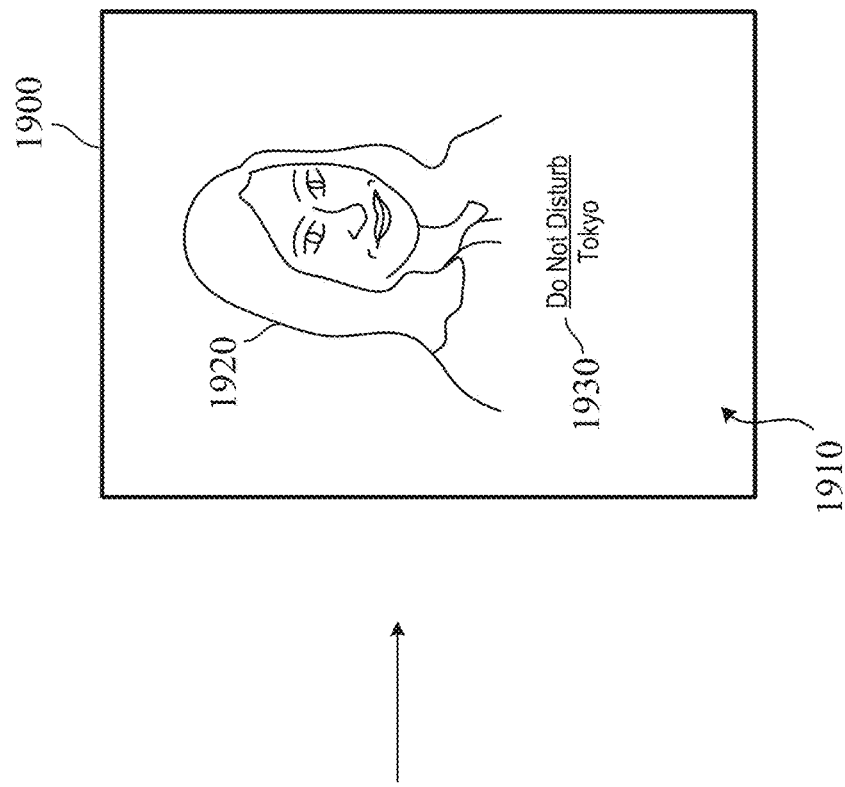
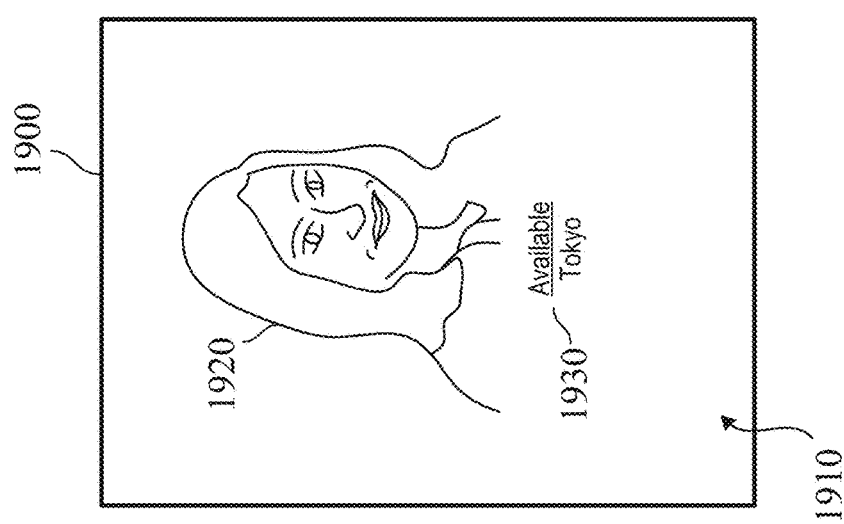
FIG. 19B

2200

2202

Displaying, on the touch-sensitive display, a user interface comprising a plurality of objects each associated with a contact of a plurality of contacts and an affordance having a visual appearance representing a first contact of the plurality of contacts

2204

Receiving a first input corresponding to a rotation of the rotatable input mechanism; and

2206

In response to receiving the input corresponding to the rotation of the rotatable input mechanism, updating the visual appearance of the affordance to represent a second contact among the plurality of contacts

*FIG. 22*

USER INTERFACE INTERACTION USING VARIOUS INPUTS FOR ADDING A CONTACT

CLAIM OF PRIORITY

This application claims priority to the following applications: U.S. Provisional Patent Application Ser. No. 62/044,961, filed Sep. 2, 2014; U.S. Provisional Patent Application Ser. No. 62/129,955, filed Mar. 8, 2015; and International Patent Application No. PCT/US2015/034609, filed Jun. 7, 2015; which are each hereby incorporated by reference in their entirety.

CROSS-REFERENCE TO RELATED APPLICATIONS

This application relates to the following co-pending applications: International Patent Application Serial No. PCT/US2013/040061, entitled "Device, Method, and Graphical User Interface for Displaying User Interface Objects Corresponding to an application," filed May 8, 2013; and International Patent Application Serial No. PCT/US2013/069483, entitled "Device, Method, and Graphical User Interface for Transitioning Between Touch Input to Display Output Relationships," filed Nov. 11, 2013; U.S. Provisional Patent Application Ser. No. 62/026,532, entitled "Raise Gesture Detection in a Device," filed Jul. 18, 2014; and U.S. Patent Provisional Application entitled "REDUCED-SIZE INTERFACES FOR MANAGING ALERTS," filed Sep. 2, 2014, naming Lawrence Yang, et al as inventors. The contents of these applications are hereby incorporated by reference in their entireties.

BACKGROUND

Field

The present disclosure relates generally to computer user interfaces, and more specifically to user interfaces for communicating with other users.

BRIEF SUMMARY

In some embodiments, a method comprises, at an electronic device with a touch-sensitive display: and a rotatable input mechanism: displaying, on the touch-sensitive display, a user interface comprising a plurality of objects each associated with a contact of a plurality of contacts and an affordance having a visual appearance representing a first contact of the plurality of contacts; receiving a first input corresponding to a rotation of the rotatable input mechanism; and in response to receiving the input corresponding to the rotation of the rotatable input mechanism, updating the visual appearance of the affordance to represent a second contact among the plurality of contacts.

In some embodiments, a method comprises, at an electronic device with a touch-sensitive display: at an electronic device with a touch-sensitive display and a rotatable input mechanism: displaying, on the touch-sensitive display, a user interface comprising a plurality of objects each associated with a contact of a plurality of contacts and an affordance having a visual appearance representing a first contact of the plurality of contacts; receiving a first input corresponding to a selection of an object of the plurality of objects that is associated with a second contact of the plurality of contacts; and in response to receiving the input corresponding to the contact on the object of the plurality of objects, updating the visual appearance of the affordance to represent the second contact among the plurality of contacts.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 6A-6E illustrate exemplary user interfaces for electronic touch communication.

FIGS. 7A-7E illustrate exemplary user interfaces for electronic touch communication.

FIGS. 19A-19B illustrate exemplary user interfaces for electronic communication.

FIGS. 22-23 illustrates is a flow diagram illustrating a process for electronic touch communication.

DESCRIPTION OF EMBODIMENTS

Figure 1A:
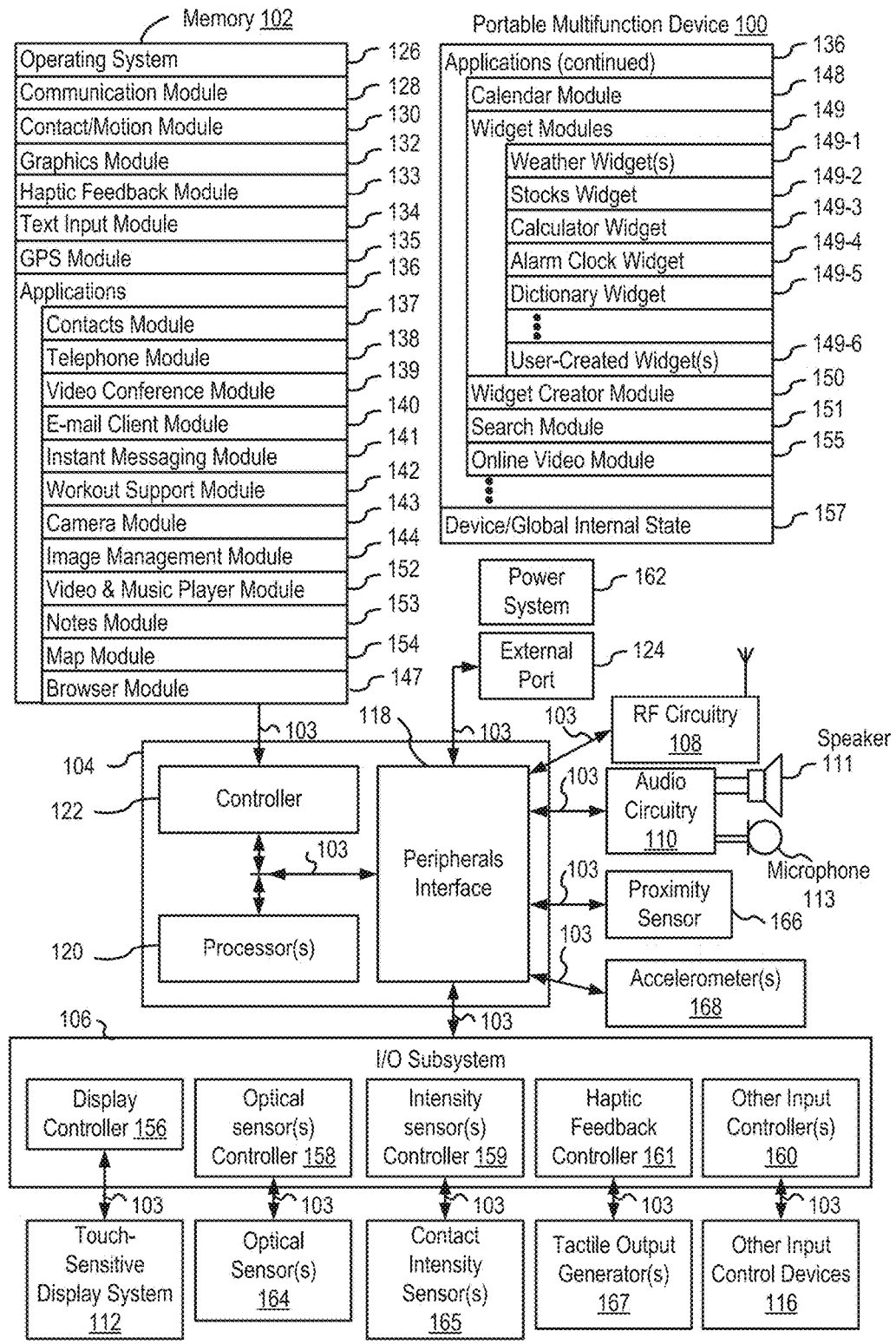
FIG. 1A is a block diagram illustrating a portable multifunction device with a touch-sensitive display in accordance with some embodiments.

The following description sets forth exemplary methods, parameters and the like. It should be recognized, however, that such description is not intended as a limitation on the scope of the present disclosure but is instead provided as a description of exemplary embodiments.

Below, FIGS. 1A-1B, 2, 3, 4A-4B, and 5A-5B provide a description of exemplary devices that may provide such user interfaces for electronic touch communication. FIGS. 6A-6E, 7A-7E, 8, 9A-9C, 18A-18K, 19A-19B, 20, and 21 illustrate exemplary user interfaces for electronic touch communications. The user interfaces in the figures are also used to illustrate the processes described below, including the processes in FIGS. 10A-10C, 11-13, 22, and 23.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device may support a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch sensitive surface, or to a substitute (proxy) for the force or pressure of a contact on the touch sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits.

Memory 102 may include one or more computer readable storage mediums. The computer readable storage mediums may be tangible and non-transitory. Memory 102 may include high-speed random access memory and may also include non-volatile memory, such as one or more magnetic disk storage devices, flash memory devices, or other non-volatile solid-state memory devices. Memory controller 122 may control access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 may be analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch sensitive touchpads do not provide visual output.

A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device so that the touch screen display may be used as a viewfinder for still and/or video image acquisition. In some embodiments, an optical sensor is located on the front of the device so that the user's image may be obtained for video conferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. Proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 may also include one or more accelerometers 168. FIG. 1A shows accelerometer 168 coupled to peripherals interface 118. Alternately, accelerometer 168 may be coupled to an input controller 160 in I/O subsystem 106. Accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
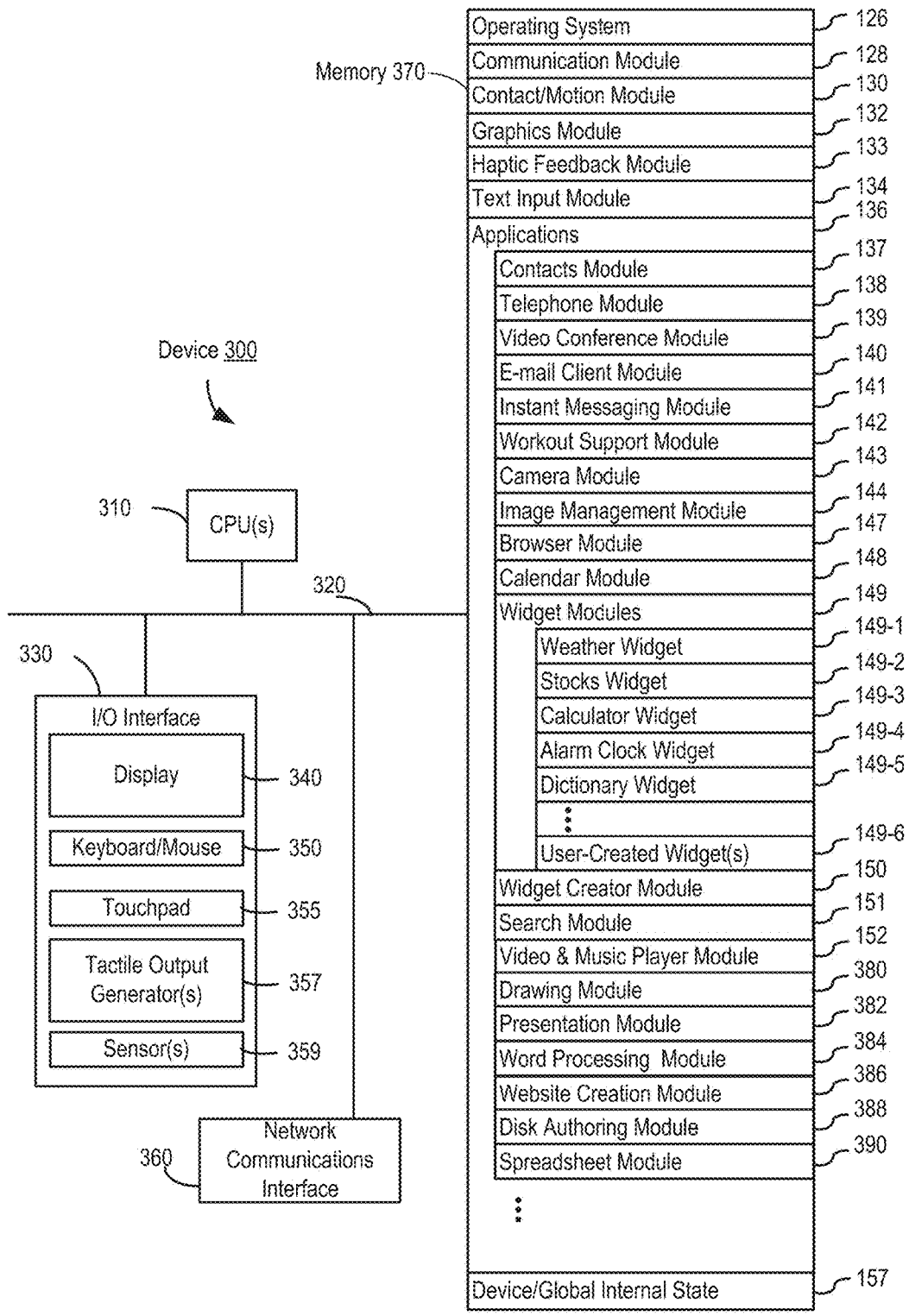
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod® (trademark of Apple Inc.) devices.

Contact/motion module 130 optionally detects contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact) determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 may include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6; widget creator module 150 for making user-created widgets 149-6;
  Search module 151;
  Video and music player module 152, which merges video player module and music player module;
  Notes module 153;
  Map module 154; and/or
  Online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 may be used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication may use any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages may include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 may be used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 may be used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules may be combined or otherwise rearranged in various embodiments. For example, video player module may be combined with music player module into a single module (e.g., video and music player module 152, FIG. 1A). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
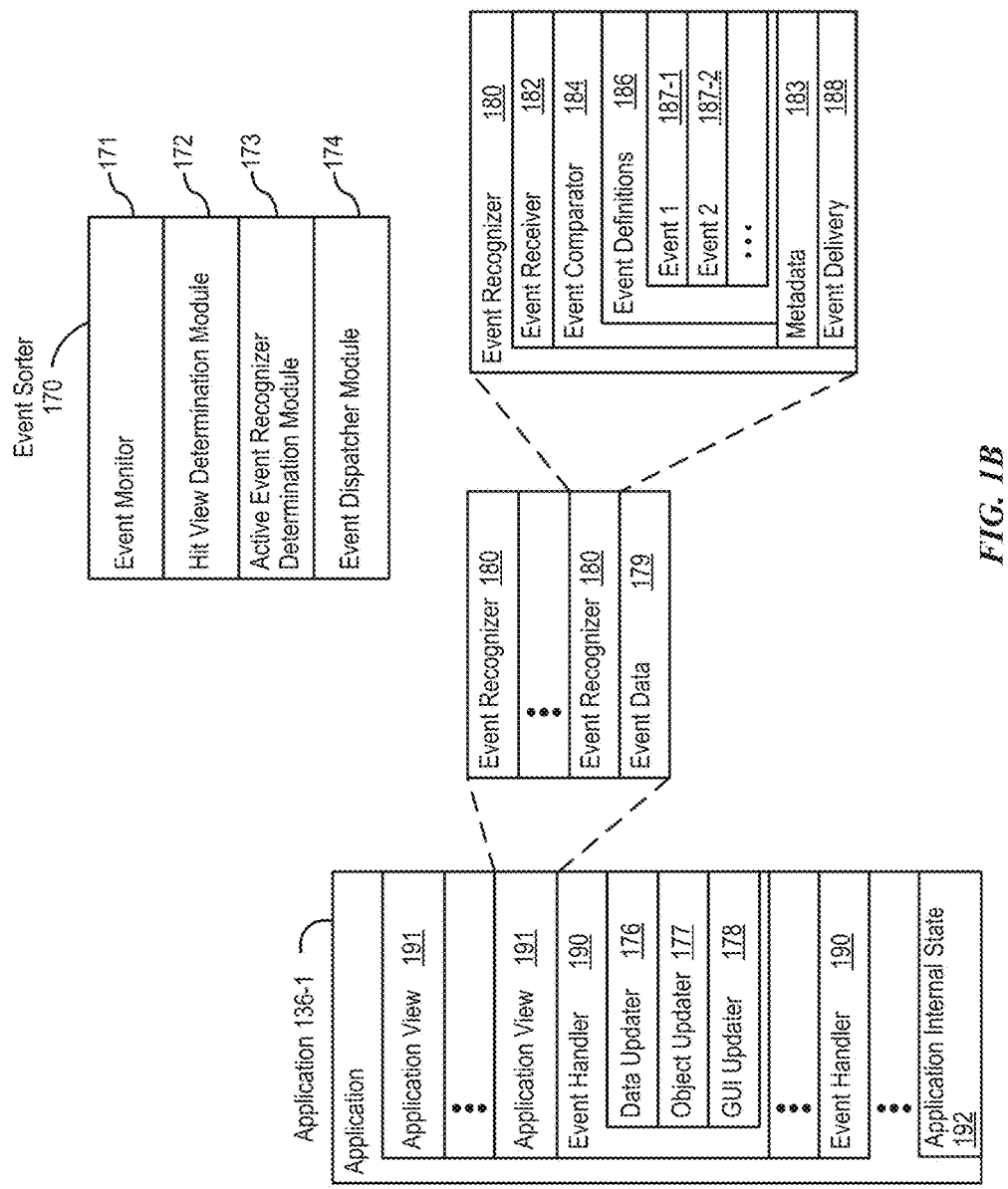
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
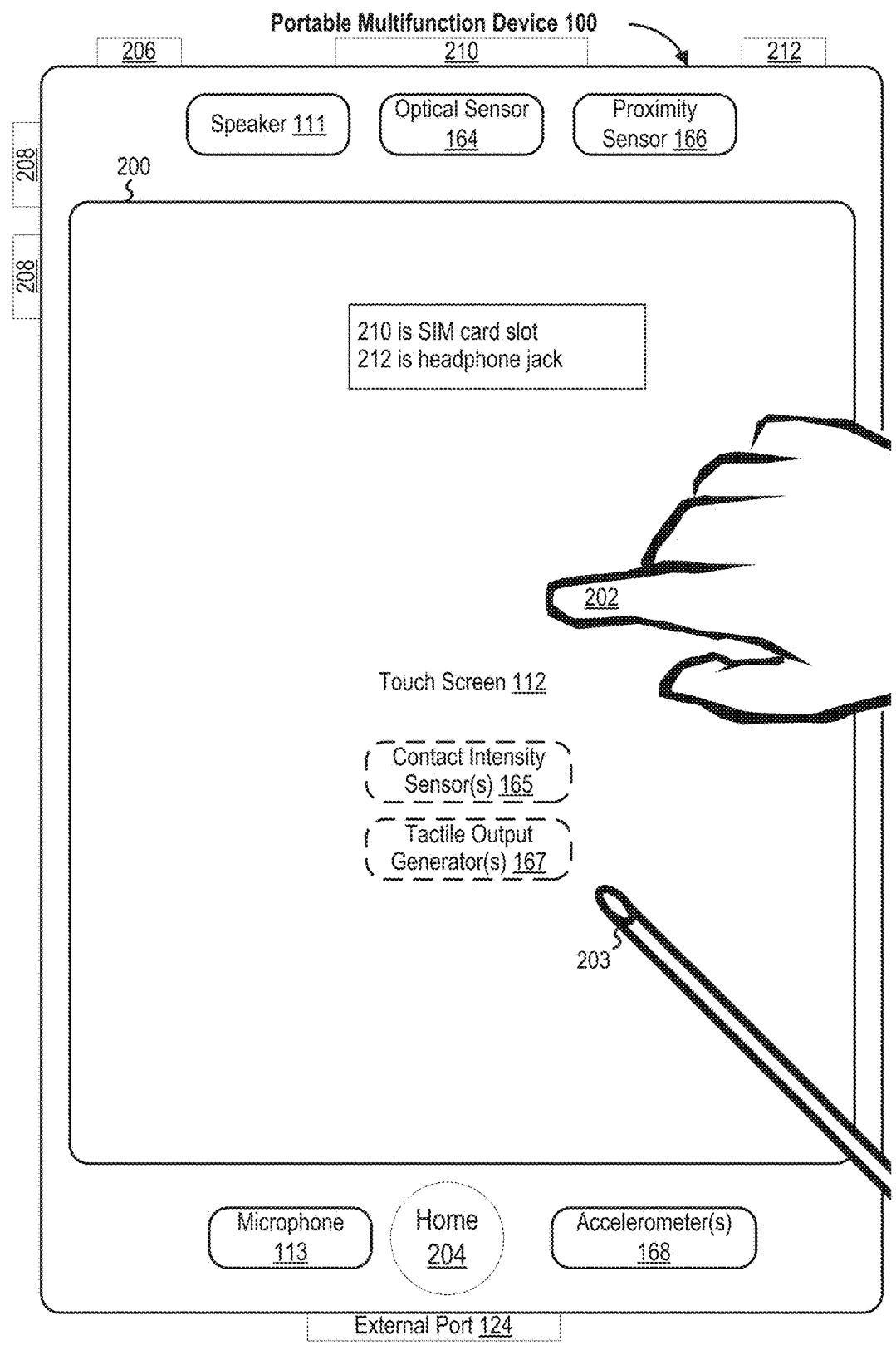
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 may be stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules may be combined or otherwise rearranged in various embodiments. In some embodiments, memory 370 may store a subset of the modules and data structures identified above. Furthermore, memory 370 may store additional modules and data structures not described above.

Attention is now directed towards embodiments of user interfaces that may be implemented on, for example, portable multifunction device 100.

Figure 4A:
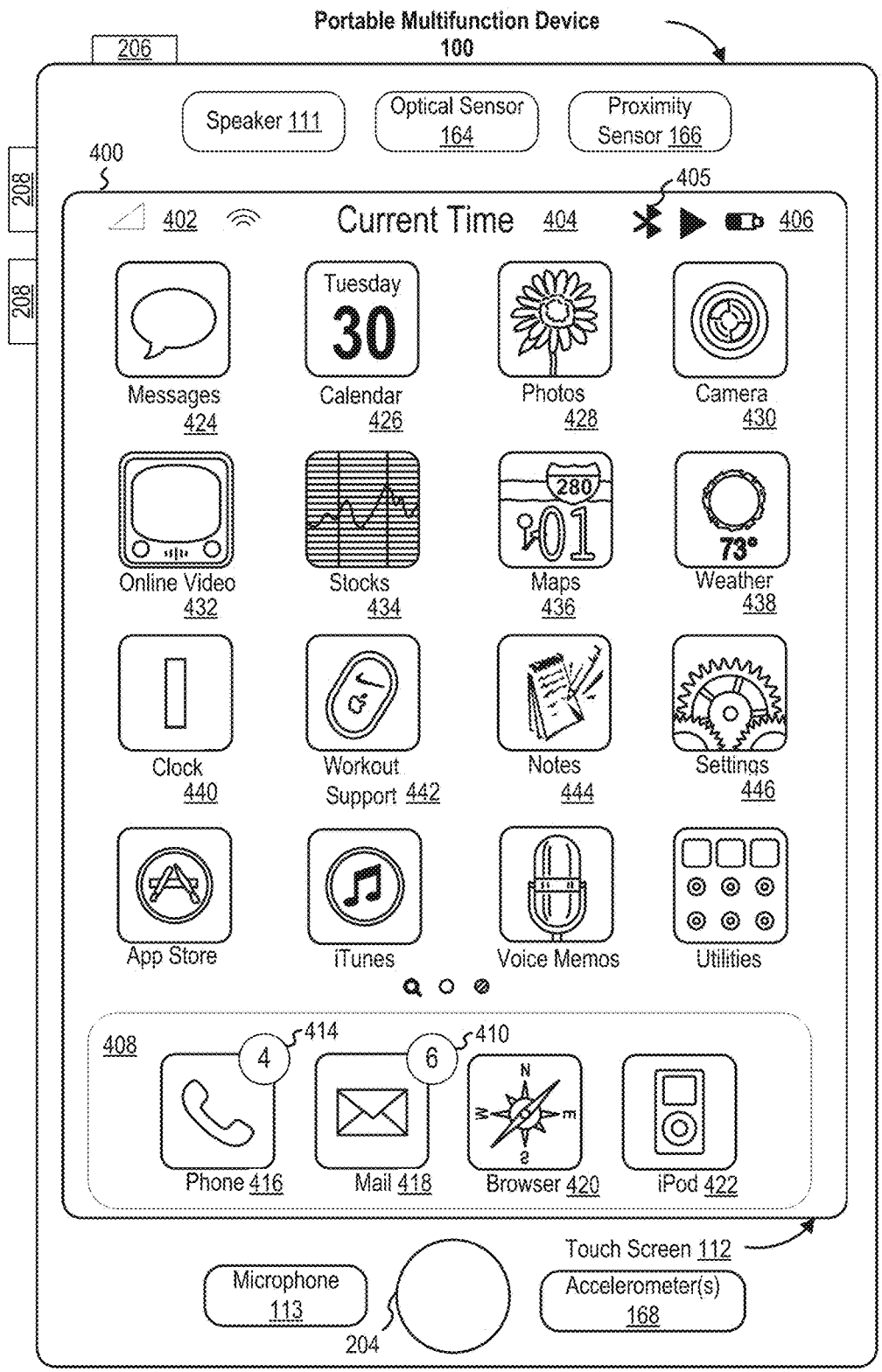
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 may optionally be labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
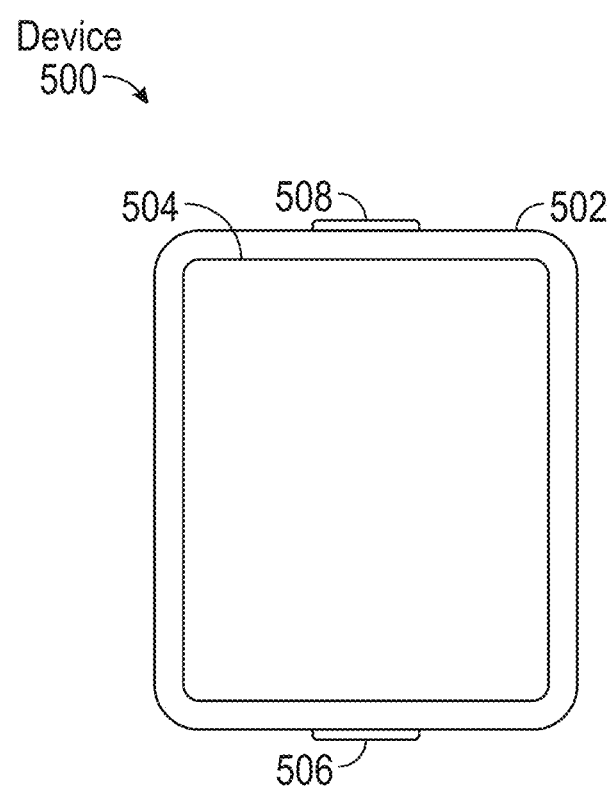
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) may have one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Techniques for detecting and processing touch intensity may be found, for example, in related applications: International Patent Application Serial No. PCT/US2013/040061, titled "Device, Method, and Graphical User Interface for Displaying User Interface Objects Corresponding to an application," filed May 8, 2013, and International Patent Application Serial No. PCT/US2013/069483, titled "Device, Method, and Graphical User Interface for Transitioning Between Touch Input to Display Output Relationships," filed Nov. 11, 2013, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms may permit device 500 to be worn by a user.

Figure 5B:
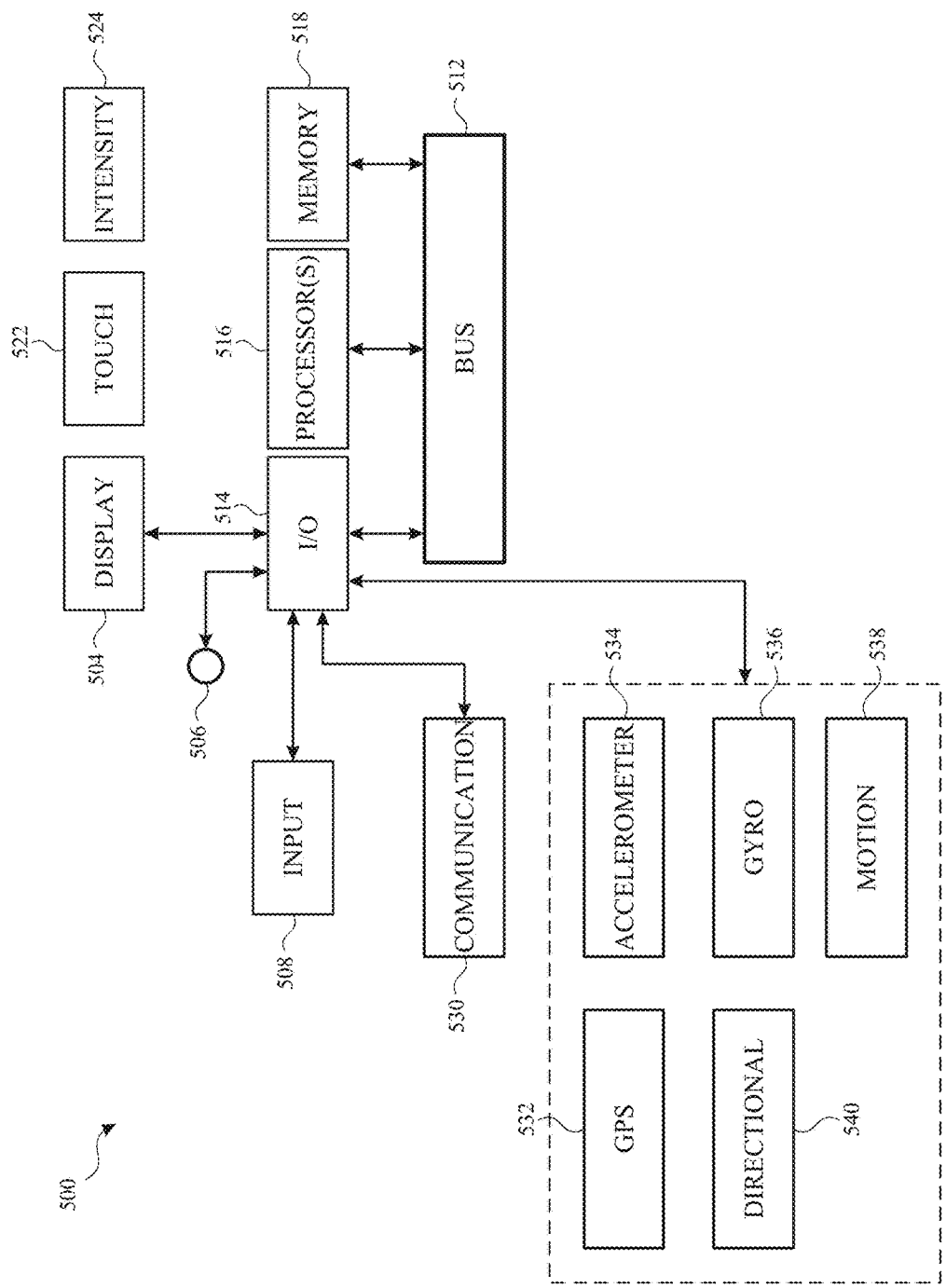
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, touch-intensity sensitive component 524. In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 may be a rotatable input device or a depressible and rotatable input device, for example. Input mechanism 508 may be a button, in some examples.

Input mechanism 508 may be a microphone, in some examples. Personal electronic device 500 can include various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can be a non-transitory computer-readable storage medium, for storing computer-executable instructions, which, when executed by one or more computer processors 516, for example, can cause the computer processors to perform the techniques described above, including processes 1000-1200 (FIGS. 10A-10C, 11, and 12). The computer-executable instructions can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. For purposes of this document, a "non-transitory computer-readable storage medium" can be any medium that can tangibly contain or store computer-executable instructions for use by or in connection with the instruction execution system, apparatus, or device. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that may be displayed on the display screen of devices 100, 300, and/or 500 (FIGS. 1, 3, and 5). For example, an image (e.g., icon), a button, and text (e.g., hyperlink) may each constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location, at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface may be characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments the contact-detection intensity threshold is zero. In some embodiments the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances). For ease of explanation, the description of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the term "open application" or "executing application" refers to a software application with retained state information (e.g., as part of device/global internal state 157 and/or application internal state 192). An open or executing application may be any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application. As used herein, "launching" an application refers to opening a closed application so that it becomes the active open application.

Attention is now directed to towards user interfaces ("UI") and associated processes that may be implemented on a multifunction device with a display and a touch-sensitive surface, such as devices 100, 300, and/or 500 (FIGS. 1, 3, and 5), to provide electronic touch communication functionalities. One or more of the techniques described below may be referred to as "electronic touch" communication.

1. Exemplary Electronic Touch Communications

FIGS. 6A-6D depict exemplary electronic touch communication between the users of computing devices 600 and 699. Each of devices 600 and 699 is device 100, 300, or 500 (FIGS. 1, 3, and 5) in some embodiments. For clarity the top row of illustrations in FIGS. 6A-6C correspond to user interfaces displayed on device 600, and the bottom row of illustrations corresponding to user interfaces displayed on device 699.

As shown, device 600 displays user interface 602 having a plurality of icons for launching various modules on the device, including icon 604. Icon 604 may correspond to a clock application, for example, meaning that when the icon is selected (e.g., touched), device 600 launches a corresponding clock application. Device 600 also has input mechanism 606. Input mechanism 606 is a push button in some embodiments.

When device 600 detects an activation (e.g., a push) of button 606, device 600 displays phonebook contacts user interface (UI) 610. Phonebook contacts UI 610 may have affordances representing the user's friends and family, for example. Contacts that are represented in phonebook contacts UI 610 are obtained from application data accessible to device 600, such as data associated with a phone or a calendar application. Such data may be stored locally on the device, remotely on a companion cellular phone, and/or remotely on the "cloud".

Phonebook contacts UI 610 can be scrolled and/or zoomed to reveal additional affordances representing phonebook contacts. For example, a swipe input can be used to scroll phonebook contacts UI 610 and a pinch/de-pinching input can be used to zoom phonebook contacts UI 610. In some embodiments, device 600 has a rotatable input mechanism and movements of the rotatable input mechanism cause phonebook contacts UI 610 to zoom (or scroll). In some embodiments, contacts that are represented on phonebook contacts UI 610 are a subset of the universe of phonebook contacts accessible to device 600. The displayed subset may represent contacts that have been previously designated by the user, for example, as the user's "favorites", or a user or system defined "whitelist" or "grey-list".

In response to a selection of affordance 611, device 600 displays contact information user interface 616, which provides additional information regarding the selected phonebook contact. In the illustrated example, the phonebook contact's name 617 and image 620 are displayed. In an alternate embodiment, when an image of a contact is unavailable, a system generated monogram may be provided using the contact's name to generate the initials. In addition, contact information UI 616 has affordance 618 for initiating a call (audio and/or video), and affordance 619 for initiating a message (e.g., short messages via services such as SMS and MMS, text messages via services such as iMessage® provided by Apple, Inc. of Cupertino, Calif.) addressed to phonebook contact 617.

In response to a user input that is detected while contact information UI 616 is displayed, device 600 transitions to the display of drawing area 630 (also referred to as a canvas). Drawing area 630 provides an area for touch-based drawing. In some embodiments the user input to invoke drawing area 630 is a touch on phonebook contact name 617 or contact image 620. In some embodiments the user input needed to invoke drawing area 630 is a touch on contact information UI 616 away from affordances 618 and 619.

Figure 6A:
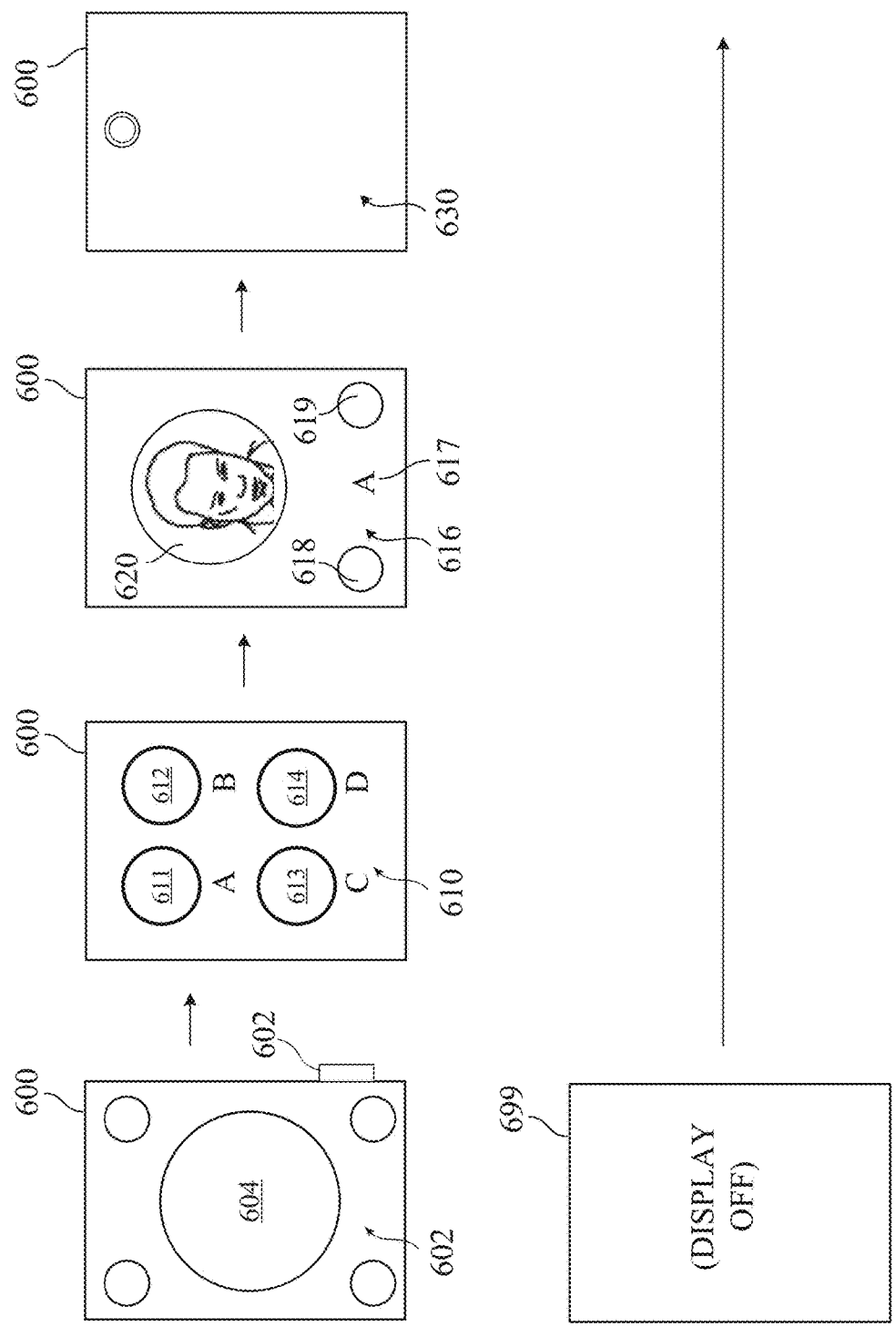
Figure 6B:
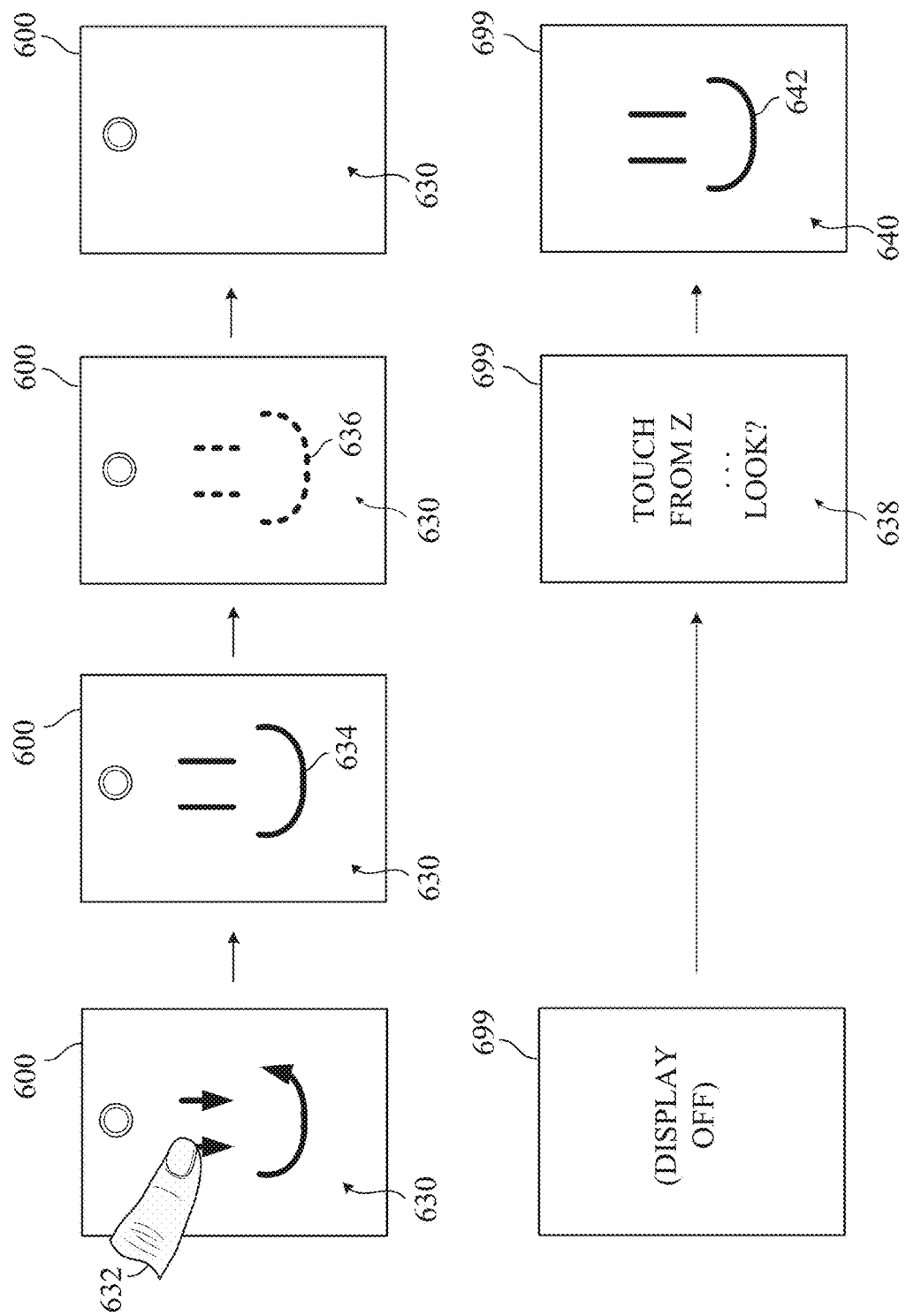

Turning to FIG. 6B, device 600 detects user input 632 in drawing area 630. User input 632 includes swipe movements that resemble a smiley face. Device 600 displays visual representation 634 corresponding to user input 632. Visual representation 634 fades away after it has been displayed for some amount of time, as indicated by dotted lines 636.

Device 600 sends data representing input 632 to device 699. In some embodiments, device 600 sends the data after a predetermined amount of time has elapsed since input 632. When input 632 comprises multiple swipes, device 600 may wait until a predetermined amount of time has elapsed after the last swipe, before sending the data. In some embodiments, the sending of the data is coordinated with the fading of visual representation 634. In this way, the fading of visual representation 634 also serves to inform the user that the touch communication is being sent to device 699.

At external device 699, which is associated with phonebook contact 617, the incoming data is received, and an output notifying the user of the incoming communication is provided. In some embodiments, device 699 displays alert 638 to indicate an incoming communication. In some embodiments, device 699 produces audible and/or haptic output initially, and upon detecting movement of the device (e.g., such as a user raising or picking up the device), alert 638 becomes displayed. In some embodiments, device 699 produces audible and/or haptic output while alert 638 is displayed. The use of haptic output in this situation is particularly effective because of the close proximity between wearable electronic device 699 and its user—it is likely that the user will feel the haptic vibration.

Upon viewing alert 638, the user may accept or decline to view the incoming communication. In some embodiments, a tap input on alert 638, or an input (e.g., accelerometer input or camera input) associated with the user looking at alert 638 for a duration of time that exceeds a threshold duration of time indicates acceptance. Upon acceptance, device 699 displays a visual representation of the received communication. In some embodiments, upon acceptance to view the communication, device 699 launches a corresponding electronic touch communication application, and displays a drawing area to show the incoming drawing. In some embodiments, upon acceptance to view the communication, device 699 displays the communication without additionally launching an electronic touch communication application. In some embodiments, a swipe (e.g., upward or downward) on alert 638 indicates dismissal, and in response, device 699 does not show the incoming communication.

Techniques for determining when a device such as device 699 has been raised or picked up into viewing position is described in co-pending U.S. Provisional Patent Application Ser. No. 62/026,532, entitled "Raise Gesture Detection in a Device," filed Jul. 18, 2014. Techniques for determining whether a user has been looking at an alert for a duration of time exceeding a threshold is described in co-pending U.S. Provisional Patent Application entitled "REDUCED-SIZE INTERFACES FOR MANAGING ALERTS," filed Sep. 2, 2014, naming Lawrence Yang, et al as inventors. The contents of these applications are hereby incorporated by reference in their entireties.

Figure 6C:
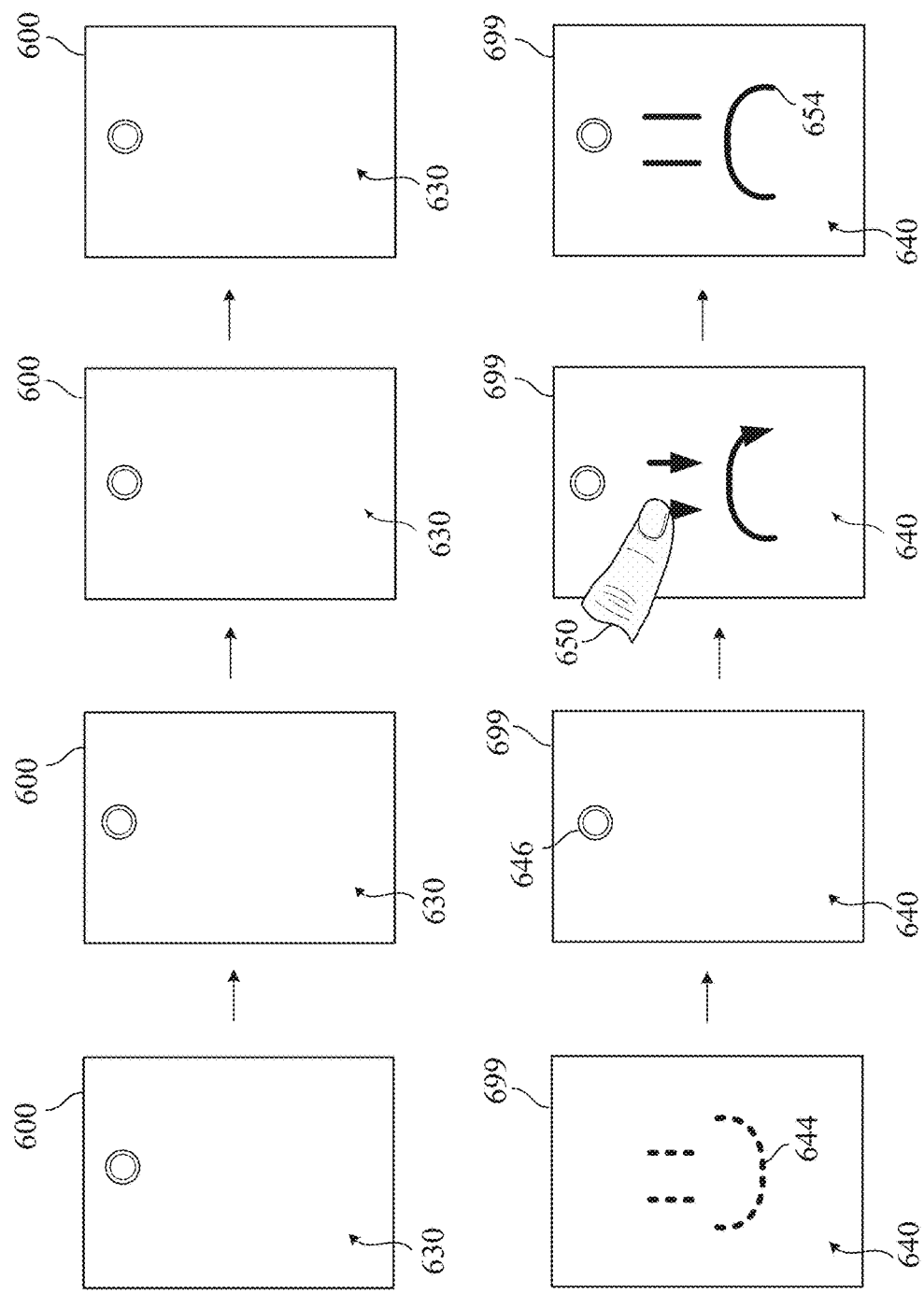

In the illustrated example, device 699 detects user acceptance to view the communication, and in response, launches an electronic touch communication application to display drawing area 640. Drawing area 640 has visual representation 642 of touch input 632. Turning to FIG. 6C, visual representation 642 fades away after being displayed for some threshold duration of time, as depicted by dotted lines 644.

While displaying drawing area 640, device 699 may detect user input 650 having swipes that resemble a frowning face. In response, device 699 displays visual representation 654 of the detected input 650. Turning to FIG. 6D, after some time, device 699 sends data to device 600 informing device 600 of the detected input 650. Device 699 also fades out visual representation 654 (as indicated by dotted lines 656). Because device 600 is already displaying drawing area 630, upon receiving the data representing input 650 from device 699, device 600 displays visual representation 660 of input 650 (e.g., the frowning face). In this way, the users of devices 600 and 699 can communicate with each other using touch-based electronic communication.

In some embodiments, the visual representation of a displayed stroke is removed by an on-screen animation that fades-out the displayed visual representation. In some embodiment, the fading occurs from one end of the visual representation to the other, in correspondence with the beginning and end of the represented stroke. For example, visual representation 660 (resembling a frowning face) may fade out from left eye, to right eye, and to the mouth, as it was drawn in that order.

In some embodiments, the kinematics of a swipe input is reflected in its visual representation. For example, if the initial swipe movements in input 650 were fast but the later movements in swipe input 650 were slow, then, as device 600 renders visual representation 660 (and as device 699 renders visual representation 654), strokes are displayed quickly at first and slowly towards the end, in accordance with kinematics information indicating the way in which the strokes were drawn. As another example, jerkiness in the movement of swipe input 650 is also represented during the display of visual representation 654 and 660. Kinematics information may be included in data sent between devices 600 and 699.

In some embodiments, a pause between parts of a swipe input is reflected as the visual representation of the swipe input is displayed on-screen. For example, if the eyes in the frowning face of swipe input 650 are drawn with an intervening pause, then, the eyes are drawn with the same intervening amount of pause (or a proportional amount of pause) as they are displayed on devices 600 and 699.

Figure 6E:
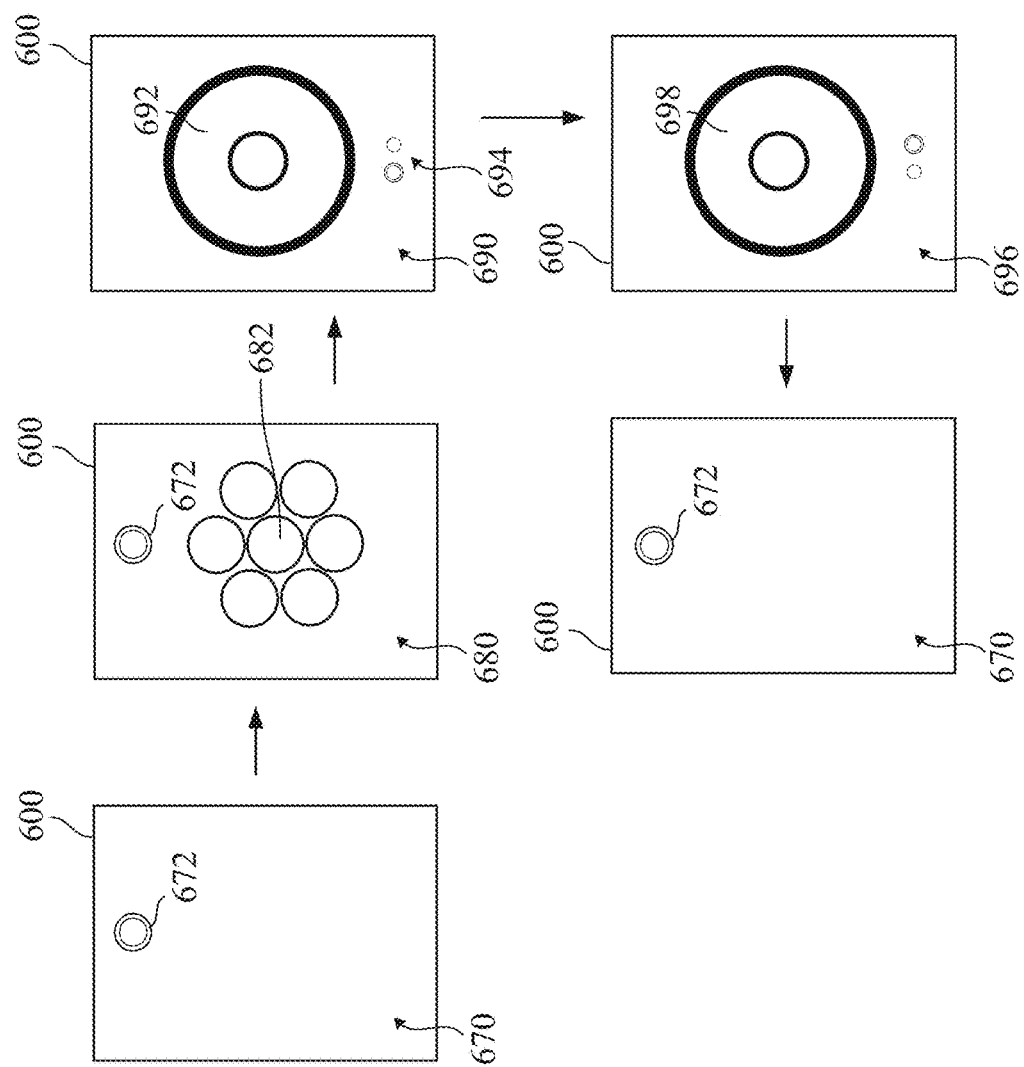

In some embodiments, a drawing area includes a color selection mechanism for selecting a color that is to be used in displaying visual representations of swipe inputs. FIG. 6E illustrates an exemplary color selection mechanism, referred to as a color picker. As shown, device 600 is displaying drawing area 670 having color picker affordance 672. Although not shown, color picker affordance 672 is displayed in the current color, meaning that strokes drawn by the user of device 600 are displayed on both devices 600 and 699 in the color of affordance 672.

A user may select color picker affordance 672 to display color selection user interface 680. Color selection UI 680 has affordances representing previously (e.g., recently) used colors. A user can select one of the displayed affordances to select a represented color as the current drawing color. Color selection UI 680 also includes affordance 682 for invoking a color palette. In response to a user selection of affordance 682, device 600 displays color palette user interface 690 which provides a spectrum of colors for user selection. A user may select a portion of color palette 692 to select a corresponding color as the current drawing color.

In some embodiments, device 600 has more than one color palette user interface. For example, pastel colors may be grouped for presentation via an additional color palette user interface. As shown in FIG. 6E, color palette user interface 690 can have paging indicators 694 to indicate the number of pages of colors available as well as to indicate the order of the current page within the set of pages. In the illustrated example, device 600 displays an additional color palette user interface 696 in response to swipe input in a first or second direction (e.g., horizontal swipe) while UI 690 is displayed.

The ordering of the colors on the pages may be based on frequency of use of the color, recency of use of the color or a combination of the two. A user may select a portion of color palette 698 to select a corresponding color as the current drawing color. Upon the selection of a color from a color palette UI, device 600 returns to drawing area 670. Color picker affordance 672 is updated to reflect the currently selected color.

Returning briefly to FIGS. 6B-6D, in some embodiments, the color picker affordance provides an additional user interface function. As depicted in FIG. 6C, device 699 sometimes displays color picker affordance 646 in drawing area 640, but hides color picker affordance 646 at other times. For example, in some embodiments, device 699 does not show color picker affordance 646 when an incoming communication (e.g., visual representation 642) is displayed. Instead, color picker affordance 646 is shown after visual representation 642 has faded away (as illustrated via dotted lines 644). In these embodiments, the presence of a color picker affordance in the drawing area signals to the user that touch-inputs are being accepted. Restated, in these embodiments, while an incoming communication (e.g., visual representation 642) is displayed, the device briefly stops receiving drawing inputs so that the incoming communication can be displayed uninterrupted. The color picker affordance (e.g., 646) is hidden at these times to indicate that drawing inputs are being ignored at least with respect to displaying representations in the drawing area (e.g., 640).

As another example, in some embodiments, when a user is presently drawing, incoming communications are queued to be displayed after the current drawing is sent. In these embodiments, after the drawing is sent the queued drawings are displayed, during which time the user is unable to draw themselves. The color picker affordance (e.g., 646) is hidden at these times to indicate that drawing inputs are being ignored at least with respect to displaying representations in the drawing area (e.g., 640).

2. Additional Exemplary Communication Techniques

FIGS. 7A-7E illustrate additional exemplary touch communication techniques between the users of electronic devices 700 and 799. Devices 700 and 799 are devices 100, 300, and/or 500 (FIGS. 1, 3, and 5) in some embodiments.

Figure 7A:
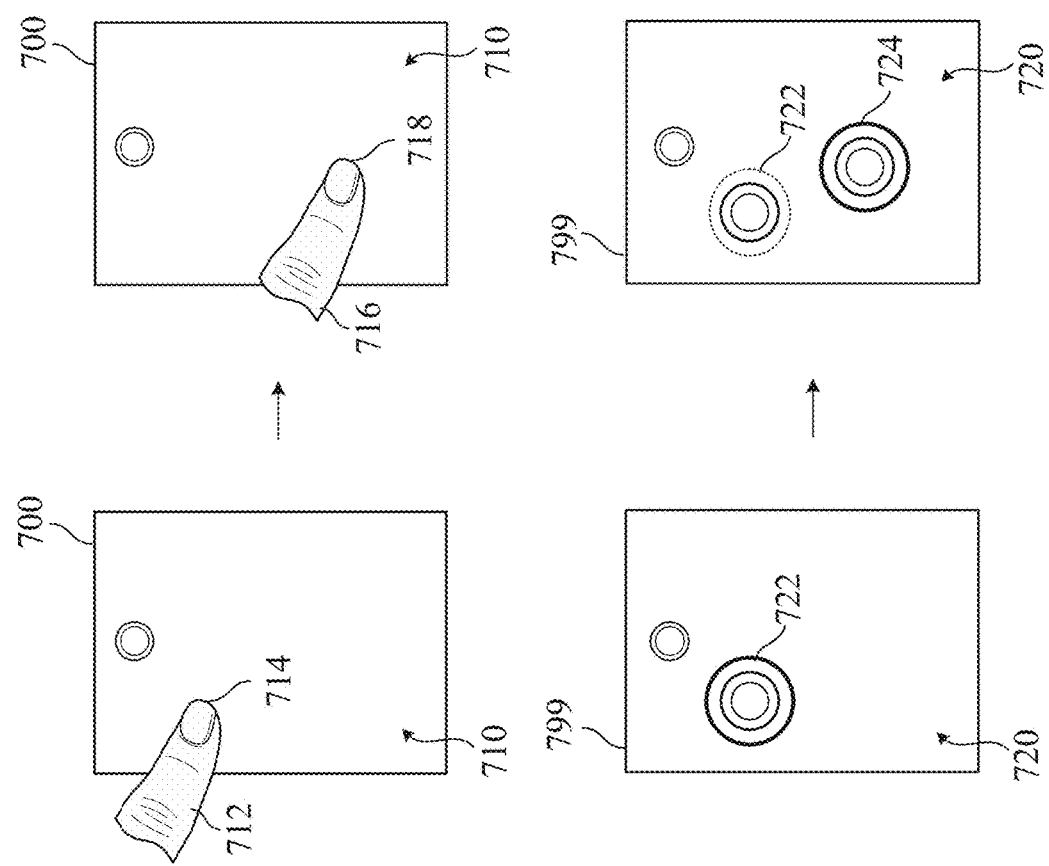

Attention is now directed to how device 700 may translate discrete taps on its touch screen into electronic touch communication. In FIG. 7A, devices 700 and 799 are participating in a communication session. Device 700 receives user input 712 at location 714 in drawing area 710. Data representing user input 712 at location 714 is sent by device 700 to device 799. Upon receiving this data, device 799 displays, in drawing area 720, visual representation 722 of the input. Device 799 draws visual representation on-screen at a position corresponding to location 714. Subsequent to input 712, device 700 can receive additional user input 716 at a different location 718. Data representing user input 716 at location 718 is sent by device 700 to device 799. Upon receiving this data, device 799 displays visual representation 724 of input 716. As before, the on-screen position of visual representation 724 corresponds to location 718 of touch input 716.

The detection and display of touch contacts (e.g., drawing strokes, single-finger taps, multiple-finger touches) such as touch contacts 712 and 716 may be implemented by event sorter 170, event recognizer 180, and event handler 190 (FIG. 1B). Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as a single-finger contact, multiple-finger touch contact or swipe. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application.

In some embodiments, visual representation 722 is displayed for the duration of touch input 714, meaning that visual representation 722 remains displayed until touch input 714 is released. In some embodiments, visual representation 722 is displayed for a certain duration of time, meaning that visual representation 722 is removed from display after it has been displayed for some duration, regardless of whether touch input 714 has been released or not. In some embodiments, visual representation 722 is removed from display by fading out.

While visual representation 722 may be any on-screen graphical output such as an image, an animation image, a line-drawing, and the like, it is noted that visual representation 722 is representative of a touch input (that has been received on an external electronic device). "Representation" in the context of visual representation 722 means that the visual information communicates at least some information regarding the touch input. Examples of information that can be communicated include the position, duration, intensity, contact size of the touch, and the number of touch objects (e.g., fingers) constituting the touch. Thus, the following exemplary visual representations of a touch are representative:

an image that is located at a position corresponding to the location of a detected touch;
an image that is displayed for a duration corresponding to the duration of a detected touch;
an image (e.g., ellipse) sized according to the size of the touch contact; or
a color scheme (e.g., heat map) corresponding to the intensity of a detected touch;

In contrast, however, a generic image that is displayed simply because some touch input was detected, without more, should not be considered representative, even if its display results from the touch input.

In some embodiments, visual representation 722 is circular, elliptical, or oval. The size of visual representation 722 may be indicative of the contact size of touch input 714, e.g., the size of the user's finger. In some embodiments, visual representation 722 includes multiple circles, ellipses, or ovals. The shapes may be displayed concentrically. When visual representation 722 comprises multiple geometric shapes, the number of shape may provide a visual representation suggestive or corresponding to the intensity of a touch. Also, when visual representation 722 comprises multiple shapes, the shapes may fade progressively as visual representation 722 is retired from on-screen display, similar to ripples in water, which provides an indication of time.

In some embodiments, the touch input (e.g., 712 and 716) required to cause a display of visual representations 722 and 724 on device 799 is a single finger tap, meaning that a multiple-finger touch on device 700 would not produce the same visual representations on device 799, and a single-finger swipe on device 700 also would not produce the same visual representations. In some embodiments, the display of visual representations 722 and 724 is accompanied by an audible and/or haptic output.

In some embodiments, device 799 is able to display visual representations 722 and/or 724 regardless of whether it is current displaying a drawing area. That is, device 799 may be able to display the representations even if it is not actively running an electronic touch communication application. Rather, device 799 may simply begin to vibrate and/or display visual representations 722 and/or 724 in response to incoming data about single-finger tap 712 and/or 716. In some embodiments, the display of visual representations is accompanied by haptic output. In some embodiments, haptic output is first provided, and display of visual representations occur after a user has moved the device into viewing position, as determined by input such as accelerometer input or camera input associated with the user looking at the device.

Attention is now directed to how device 700 may translate repeated discrete taps into electronic touch communication.

Figure 7B:
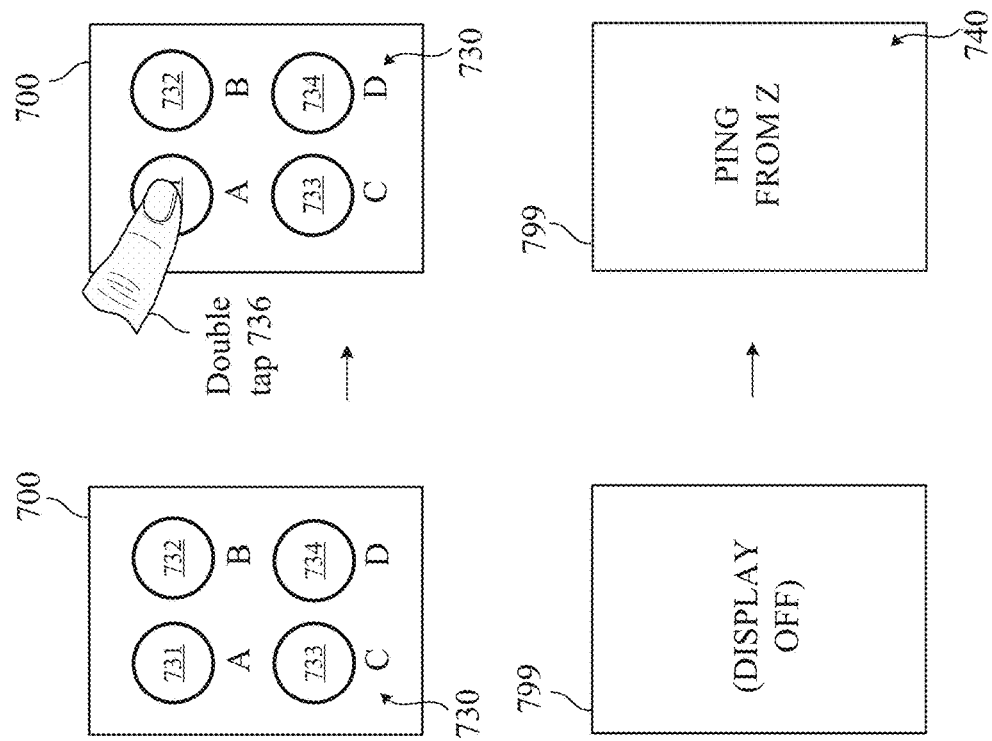

In FIG. 7B, device 700 is displaying phonebook contacts user interface 730, which is contacts user interface 610 (FIG. 6A) in some embodiments. Phonebook contacts UI 730 has affordances 731-734 that represent phonebook contacts. When device 700 receives user input 736, which is a double-tap touch input, device 700 sends data corresponding to the detected double-tap to device 799. In response, device 799 transitions from an inactive state to the display of alert 740, indicating that the user of device 700 has sent a communication. In some embodiments, alert 740 is accompanied by audible and/or haptic output. The audible and/or haptic output may correspond to the number of double-taps detected by device 700. For example, device 799 may produce a discrete (i.e., distinct) vibration in response to each double-tap detected at device 700.

Attention is now directed to how device 700 may translate sustained touch contacts on its touch screen into electronic touch communication. In FIG. 7C, device 700 detects user input 752, which is a two-finger touch contact in drawing area 710. In response, device 700 sends to device 799 data representing the multiple-finger input. Upon receiving this data, device 799 displays on drawing area 740 an image 754. In some embodiments, image 754 is heart-shaped image. Device 799 continues to display image 754 until two-finger touch 752 is released from device 700.

The detection and display of touch contacts (e.g., drawing strokes, single-finger taps, multiple-finger touches) such as touch contact 752 may be implemented by event sorter 170, event recognizer 180, and event handler 190 (FIG. 1B). Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as a single-finger contact, multiple-finger touch contact, or a swipe. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application.

In some embodiments, image 754 pulsates such that, as shown in FIG. 7C, its size varies over time. In some embodiments, the pulsating of image 754 is joined by haptic and/or audio output from device 799. In some embodiments, device 700 has a galvanic skin response (GSR) sensor that senses its user's heart rate, and sends the heart rate information to device 799, such that device 799 can pulsate image 754 in correspondence with the detected biometric information. The pulsating of image 754 also may be accompanied by audible and/or haptic outputs. For example, device 799 may vibrate in sync with each visual pulse.

In some embodiments, device 799 is able to display image 754 regardless of whether it is currently displaying a drawing area. That is, device 799 may be able to display image 754 even if it is not actively running an electronic touch communication application. Rather, device 799 may simply begin to vibrate and/or display image 754 in response to incoming data about multiple-finger touch 752. In some embodiments, the display of images is accompanied by haptic output. In some embodiments, haptic output is first provided, and image display occurs after a user has moved the device into viewing position, as determined by input such as accelerometer input or camera input associated with the user looking at the device.

Figure 7D:
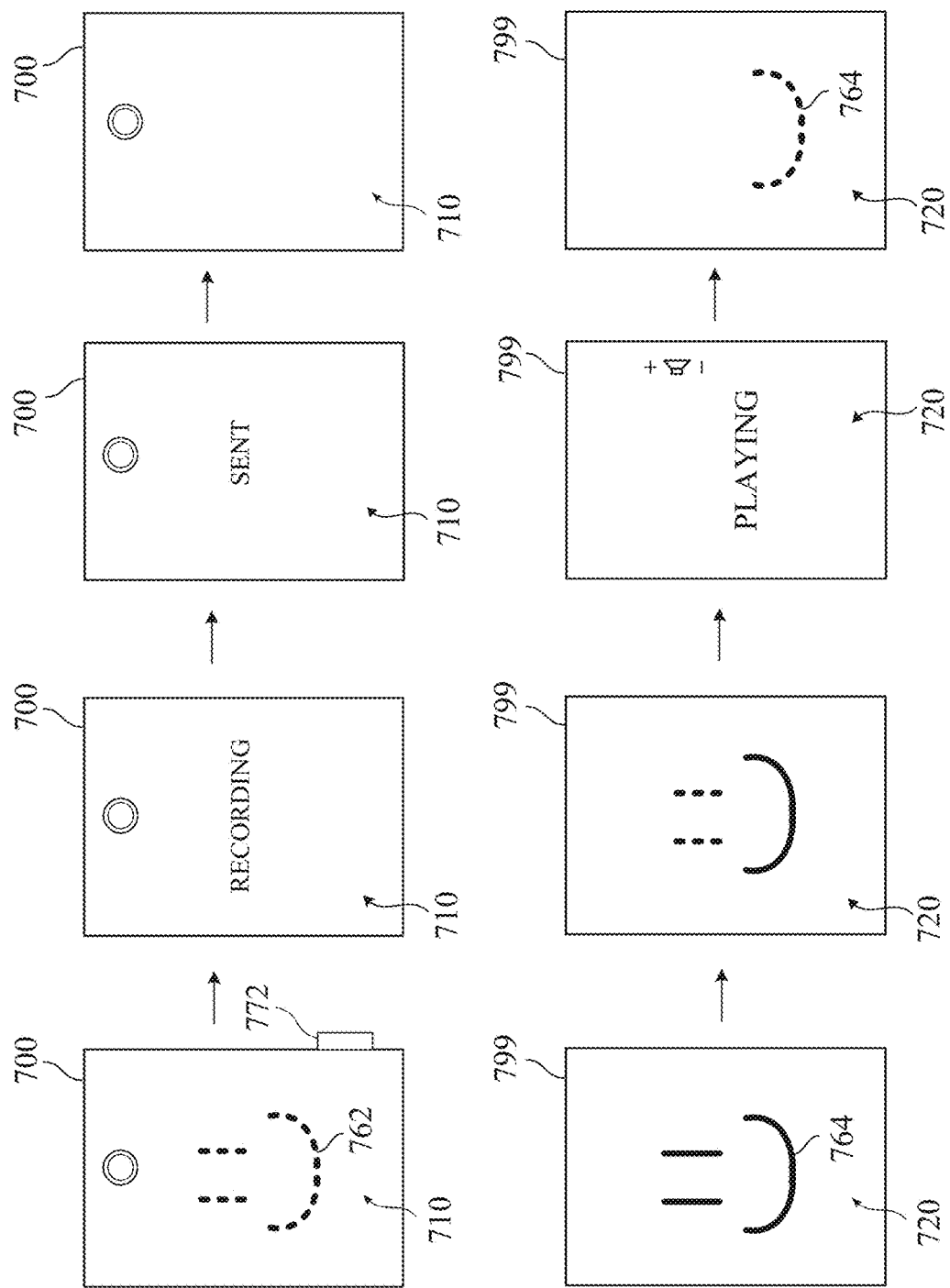

Attention is now directed to how device 700 may accommodate verbal input during an electronic touch communication session. In FIG. 7D, device 700 is displaying drawing area 710 while device 799 is displaying drawing area 720. Drawing areas 710 and 720 have visual representations 762 and 764 of brush strokes representing earlier communication in the ongoing electronic touch communication session. While drawing area 710 is displayed, device 700 detects activation of input mechanism 772. In some embodiments input mechanism 772 is a mechanical button. For the duration of the activation, device 700 records audio input provided to the device. That is, a user of device 700 may provide a verbal message that is then recorded. On release of input mechanism 772, device 700 sends the audio recording to device 799, where the recording is played back. As depicted in FIG. 7D, while device 700 is recording, device 799 continues to display drawing area 720 such that the user of device 799 can continue to participate in the communication session.

Figure 7E:
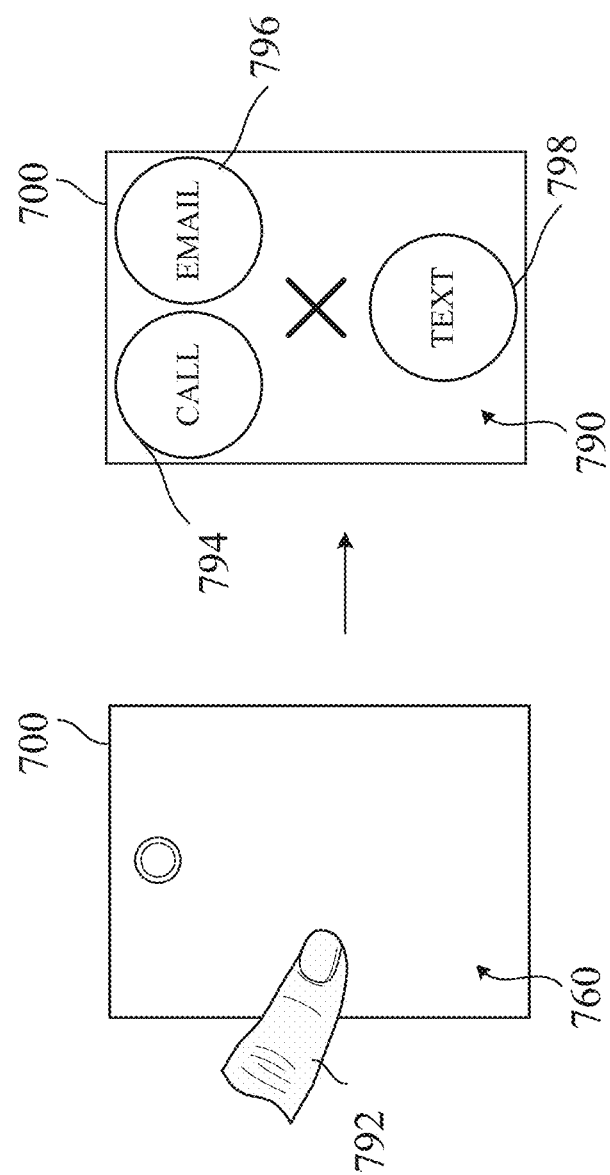

Attention is now directed to how device 700 may permit alternative methods of contact between participants of an electronic touch communication session. FIG. 7E illustrates contextual user interface 790 which can be invoked from drawing area 710 in some embodiments. As shown, device 700 is displaying drawing area 710 and receives touch input 792. Touch input 792 has a high characteristic touch intensity, meaning that it is a deep touch. In some embodiments, a touch having a characteristic intensity higher than a threshold intensity is considered a high-intensity touch. In response to detecting high-intensity touch 792 while drawing area 710 is displayed, device 700 displays contextual user interface 790, which has affordances for initiating other forms of communication with the participant(s) of the electronic touch communication session (e.g., contact A; FIG. 6A). It is noted that touches below the threshold are interpreted as single-finger contacts such as taps and swipes, and/or multiple-finger touches, as discussed above with reference to FIGS. 7A-7C.

For example, contextual user interface 790 has affordance 794, which when selected, initiates a phone call (audio and/or video) to contact A. Contextual user interface 790 also has affordance 796, which when selected, initiates a draft e-mail addressed to contact A. Contextual user interface 790 also has affordance 798, which when selected, initiates a message (e.g., short messages via services such as SMS and MMS, text messages via services such as iMessage® by Apple, Inc. of Cupertino, Calif.) addressed to contact A.

3. Alternate Communication Models

Figure 8:
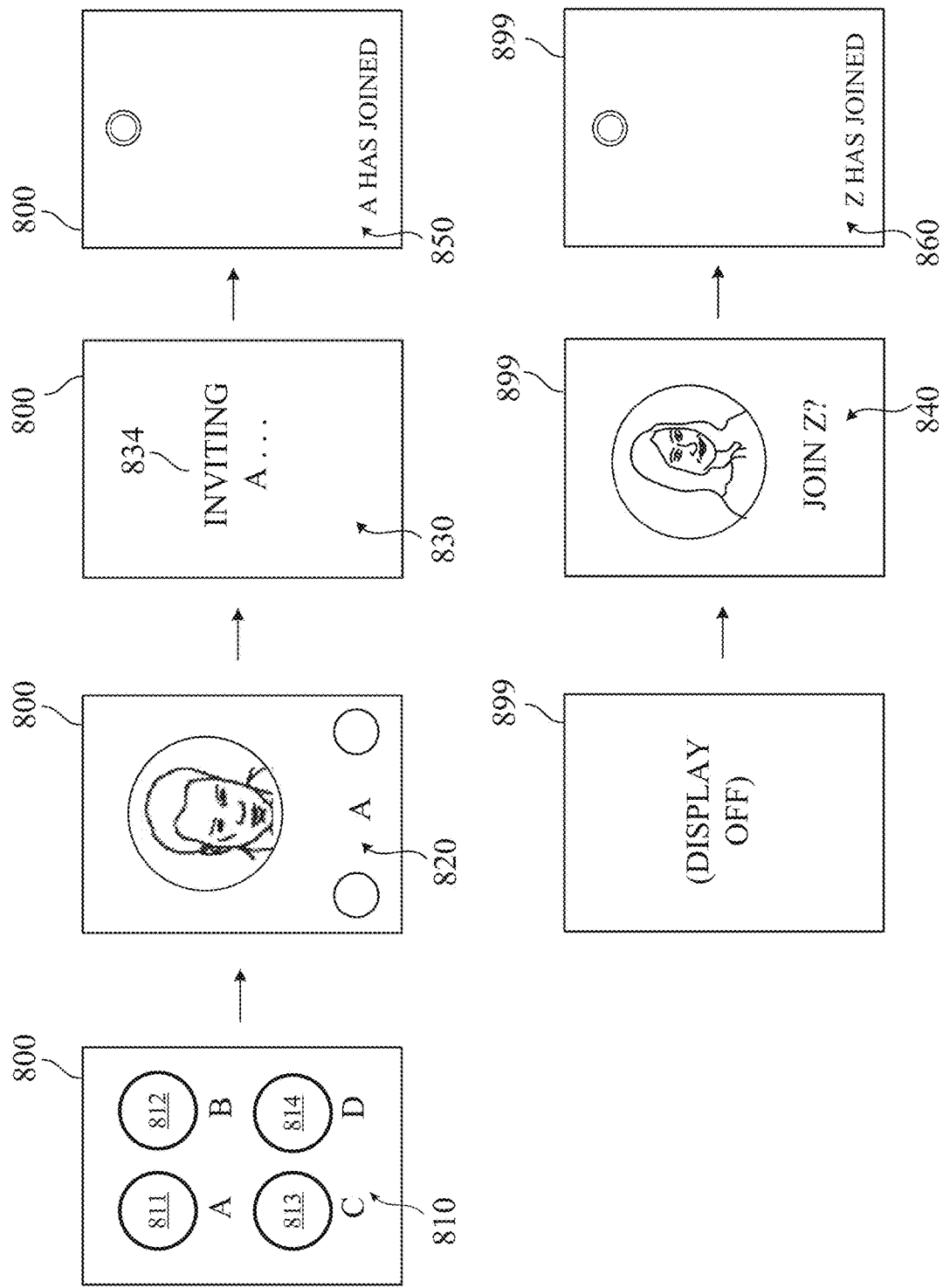
FIG. 8 illustrate exemplary user interfaces for electronic touch communication.
Figure 9A:
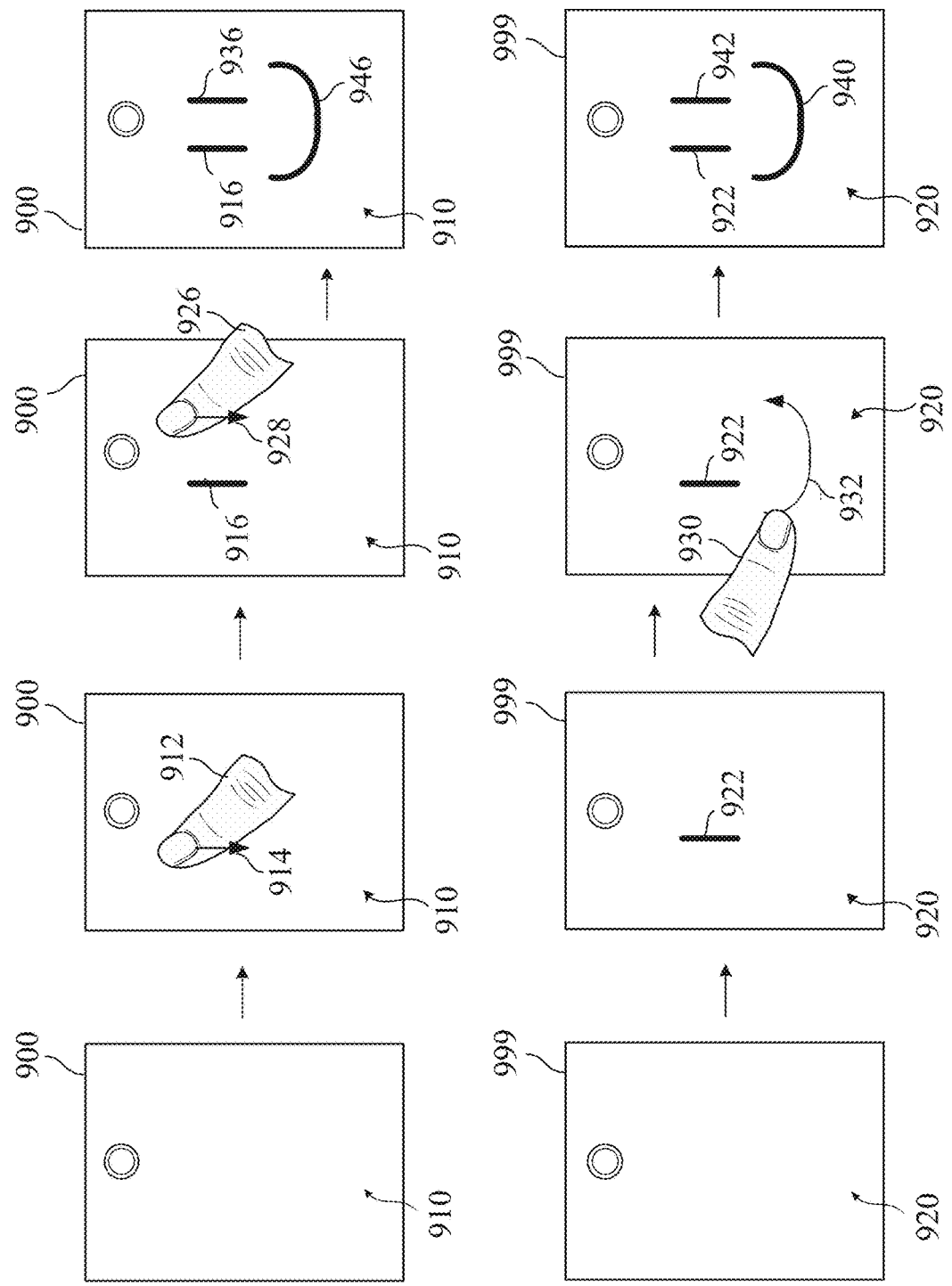
FIGS. 9A-9C illustrate exemplary user interfaces for electronic touch communication.
Figure 9B:
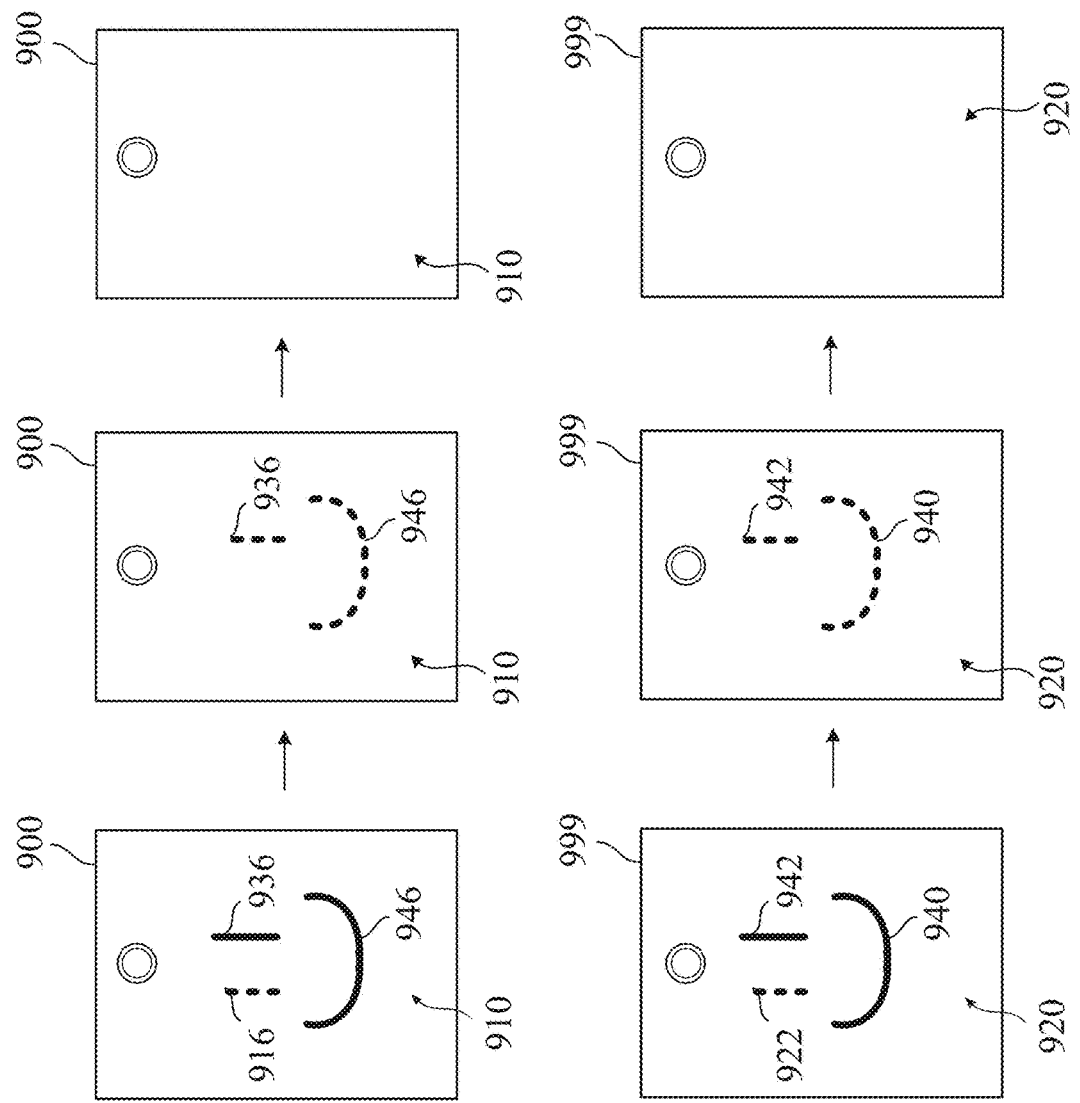

Attention is now directed to other models of electronic touch communications between devices used in some embodiments, with reference to FIGS. 8 and 9A-9B.

In some embodiments, electronic touch communication occurs after a session is initiated by one participant and accepted by the receiving participant. This aspect is discussed with reference to FIG. 8. In FIG. 8, device 800, which is device 100, 300, or 500 (FIGS. 1, 3, and 5) in some embodiments, is displaying phonebook contacts user interface 810. In response to a user's selection of one of the displayed affordances 811-814, device 800 displays contact information user interface 820, in this case, for contact "A" which is represented by affordance 811. The user proceeds to invite contact "A" to a communication session by touching user interface 820. In response, device 800 sends a request to device 899 inviting contact "A" to communicate, and displays use interface 830 having indication 834 indicating that contact "A" is being invited. In the meantime, device 899 associated with contact "A" transitions from its inactive state to the display of alert 840, which shows that the user of device 800 (in this case contact "Z") is requesting electronic touch communication.

In some embodiments, the user of device 800 can cancel the invitation by navigating away from user interface 830, such as by a swipe input or activation of another input mechanism on the device. In some embodiments, the user of device 899 can accept a pending invitation by touching alert 840. The user also can decline the invitation by swiping away alert 840 (e.g., in a upward or downward direction). If the invitation is accepted, devices 800 and 899 proceed to display drawing areas 850 and 860 respectively, and thereby establish a two-way communication session. Thus, as used here, a two-way communication "session" is established after (i) one user sends another user an invitation to communication and (ii) the receiving user accepts. If the invitation is declined (not shown), device 800 returns to contact information user interface 820 and device 899 returns to its previous (inactive) state.

Attention is now directed to embodiments in which electronic touch communications can participate collaboratively in a communication session, with reference to FIGS. 9A-9B. In FIG. 9, device 900, which is device 100, 300, or 500 (FIGS. 1, 3, and 5) in some embodiments, is displaying drawing area 910. Device 999, which is device 100, 300, or 500 (FIGS. 1, 3, and 5) in some embodiments, is displaying drawing area 920. As shown, device 900 detects swipe input 912, which represents a downward stroke 914, on drawing area 910. In response, device 900 displays visual representation 916 of the detected stroke. Visual representation 916 may have the appearance of a brush stroke. In the meantime, device 900 sends data representing the stroke 914 (e.g., swipe input 912) to device 999. Device 999, after receiving this information, displays visual representation 922 of the stroke in its drawing area 920.

Both users may continue to draw. As shown, device 900 detects additional swipe input 926 representing stroke 928, while device 999 detects swipe input 930 representing stroke 932. Device 900 displays visual representation 936 of swipe input 926, and device 999 displays visual representation 940 of swipe input 930. Data representing both strokes 928 (swipe input 926) and 932 (swipe input 930) are exchanged by the devices, meaning that device 900 sends data representing stroke 928 (e.g., swipe input 926) to device 999, and device 999 sends data representing stroke 932 (e.g., swipe input 930) to device 900. After this exchange of information, both devices display visual representations corresponding to the received information. In the case of device 900, visual representations 946 is displayed in addition to visual representations 916 and 936. On device 999, visual representation 942 is displayed in addition to visual representations 922 and 940. In some embodiments, displayed visual representations have the appearance of brush strokes. As can be seen, in this way, the users of devices 900 and 999 have mutually participated in a drawing session, in particular the drawing of a smiley-face.

To make room in drawing areas 640 and 642 for additional drawings, in some embodiments, displayed visual representations are removed after a given duration of time. The duration may be predetermined, for example, 1, 2, or 3 seconds. As shown in FIG. 9B, visual representations 916 and 930 are first removed because they result from earlier user input. Visual representations 936 and 946, as well as 942 and 940, are subsequently removed from the drawing areas, as they represent later user input.

Figure 9C:
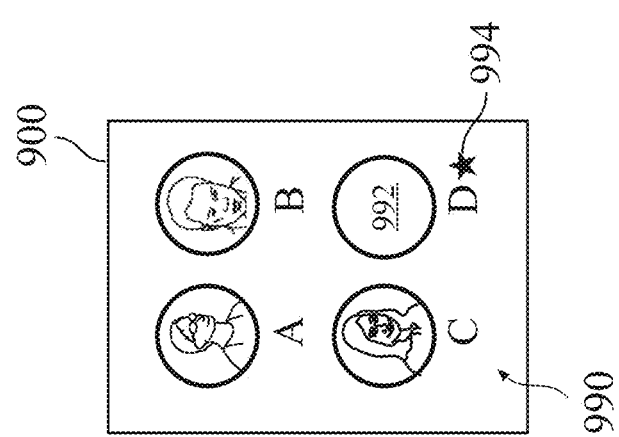

It is possible for a user to miss an incoming electronic touch communication (e.g., powered down or no network connectivity). It is also possible for a user to ignore the haptic and/or visual outputs associated with an incoming communication. In some embodiments, device 900 displays missed communication indicators that identify missed communications. This aspect is discussed with respect to FIG. 9C. FIG. 9C depicts phonebook contacts user interface 990 which is phonebook contacts user interface 610 (FIG. 6A) in some embodiments. Phonebook contacts UI 990 includes a plurality of affordances representing phonebook contacts, including affordance 992 representing contact "D". Indicator 994 is displayed adjacent affordance 992 (meaning that indicator 994 is closet to affordance 992 out of all displayed affordances). Indicator 994 indicates to the user of device 900 that an incoming electronic touch communication from contact "D" was missed. Optionally, the visual appearance of indicator 994 conveys additional information regarding the missed electronic touch communication. For example, indicator 994 can take on a particular shape to indicate a missed alert (alert 638; FIG. 6A), a missed request for communication (alert 840; FIG. 8), a missed single-tap (FIG. 7A), a missed double-tap (FIG. 7B), a missed multiple-finger touch (FIG. 7C), so forth. As another example, the size of indicator 904 may reflect the number of missed communications. In some embodiments, multiple indicators may be displayed adjacent to a contact affordance to indicate that multiple types of communications have been missed.

In some embodiments it is possible for phonebook contacts user interface 990 to display information regarding parties in electronic touch communications that are not currently registered as contacts with respect to device 900. For example, phonebook contacts UI 990 may show the phone number of a person previously unbeknownst to device 990. In this example, phonebook contact UI 990 may provide an add affordance for registering the previously unbeknownst person as a contact.

In some embodiments, phonebook contacts user interface 990 is configured to display a subset of user-designated and/or system-defined contacts. In these embodiments it is possible for phonebook contacts user interface 990 to display information regarding parties to electronic touch communications who are not user-designated or system-defined contacts. For example, device 990 may have recently received an incoming communication from a user's regular contact (who is not one of user's favorite contacts). In this example, phonebook contacts UI 990 may provide an add affordance for designating the contact as a favorite contact. As another example, device 990 may have recently received an incoming communication from a person previously unbeknownst to device 990. In this example, phonebook contact UI 990 may provide an add affordance for registering the previously unbeknownst person as a contact (and optionally designating the newly added contact as a user favorite).

4. Exemplary Electronic Touch Communication Processes

Attention is now directed to processes which may be implemented on devices 100, 300, and/or 500 (FIGS. 1, 3, 5) to carry out the techniques described above with reference to FIGS. 6A-6E, 7A-7E, 8, and 9A-9C.

Figure 10A:
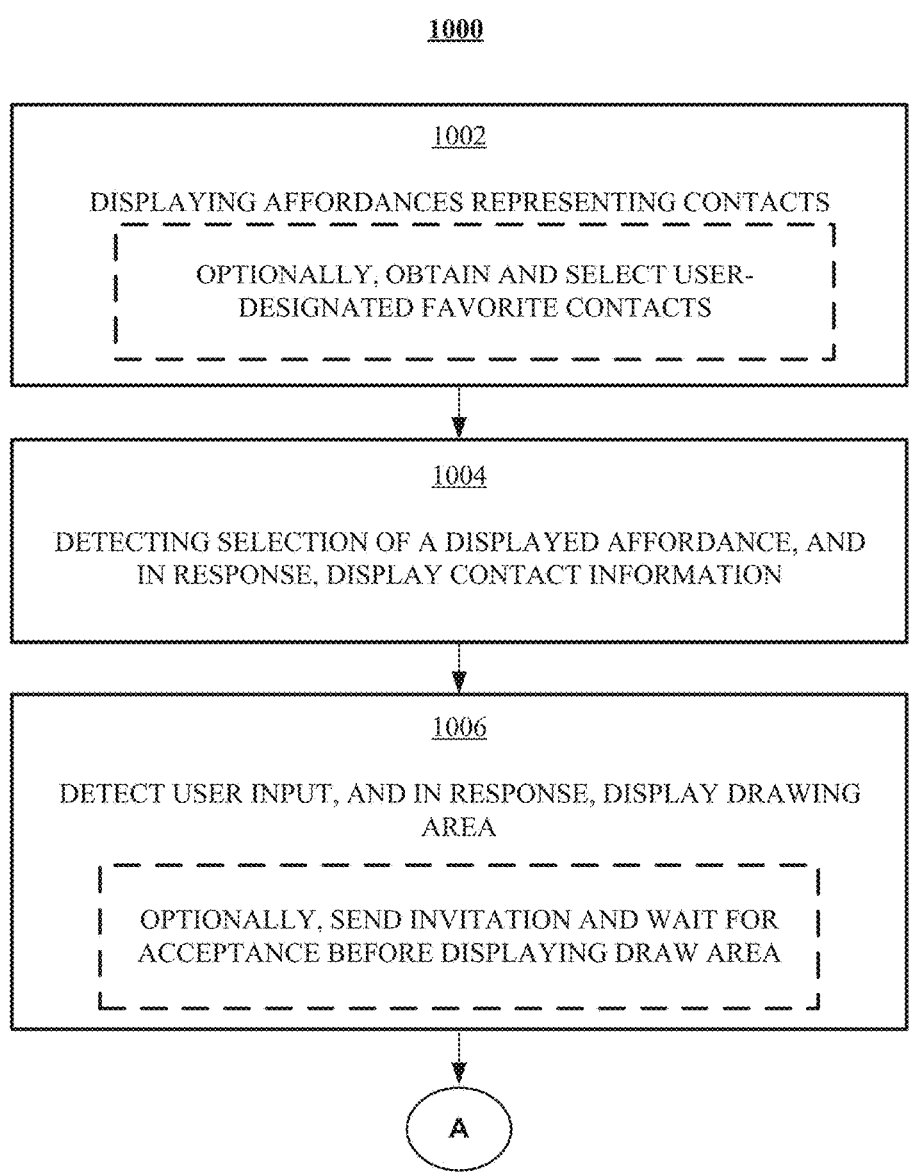
FIG. 10A-10C depict a flow diagram illustrating a process for electronic touch communication.
Figure 10B:
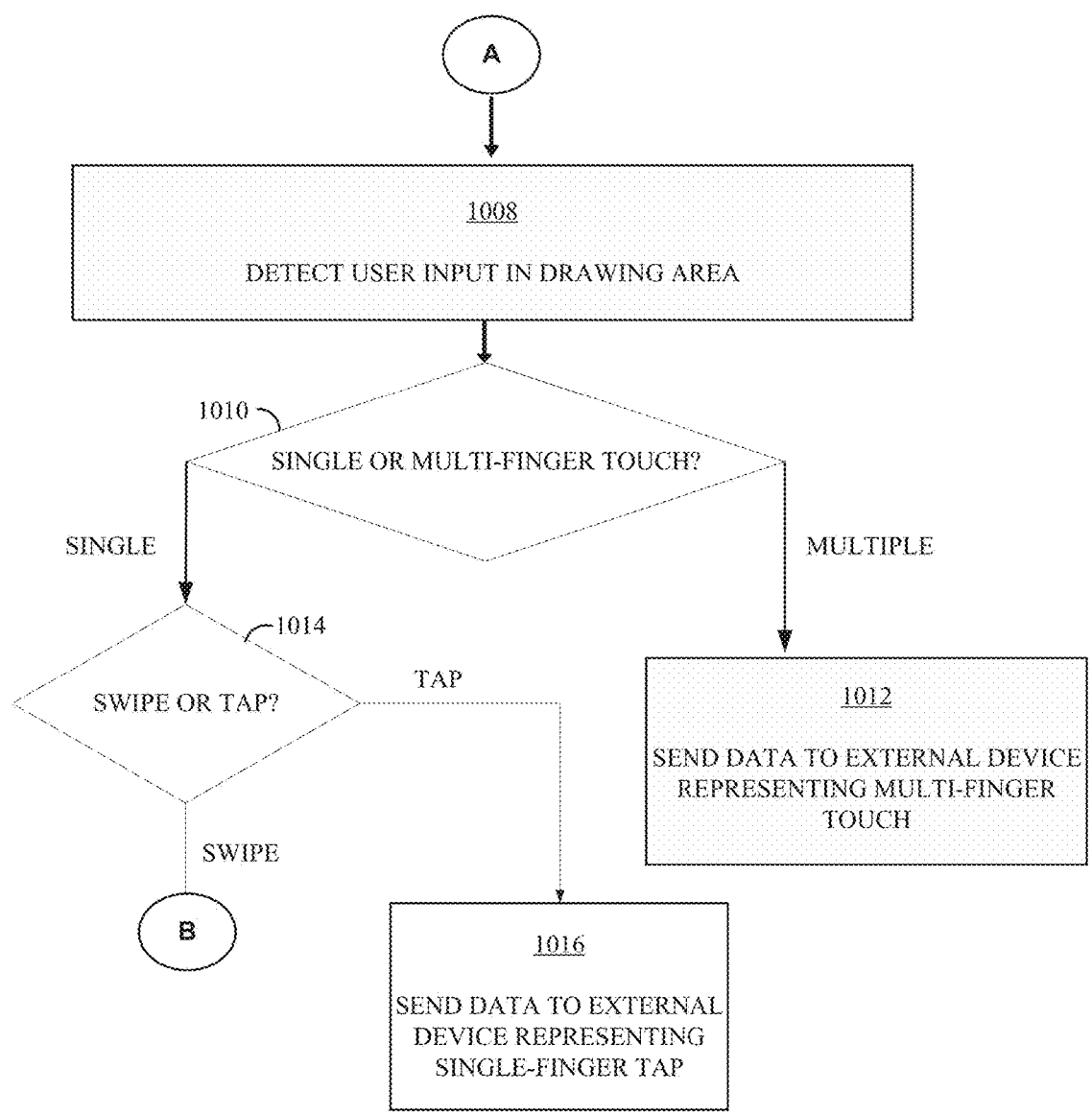
Figure 10C:
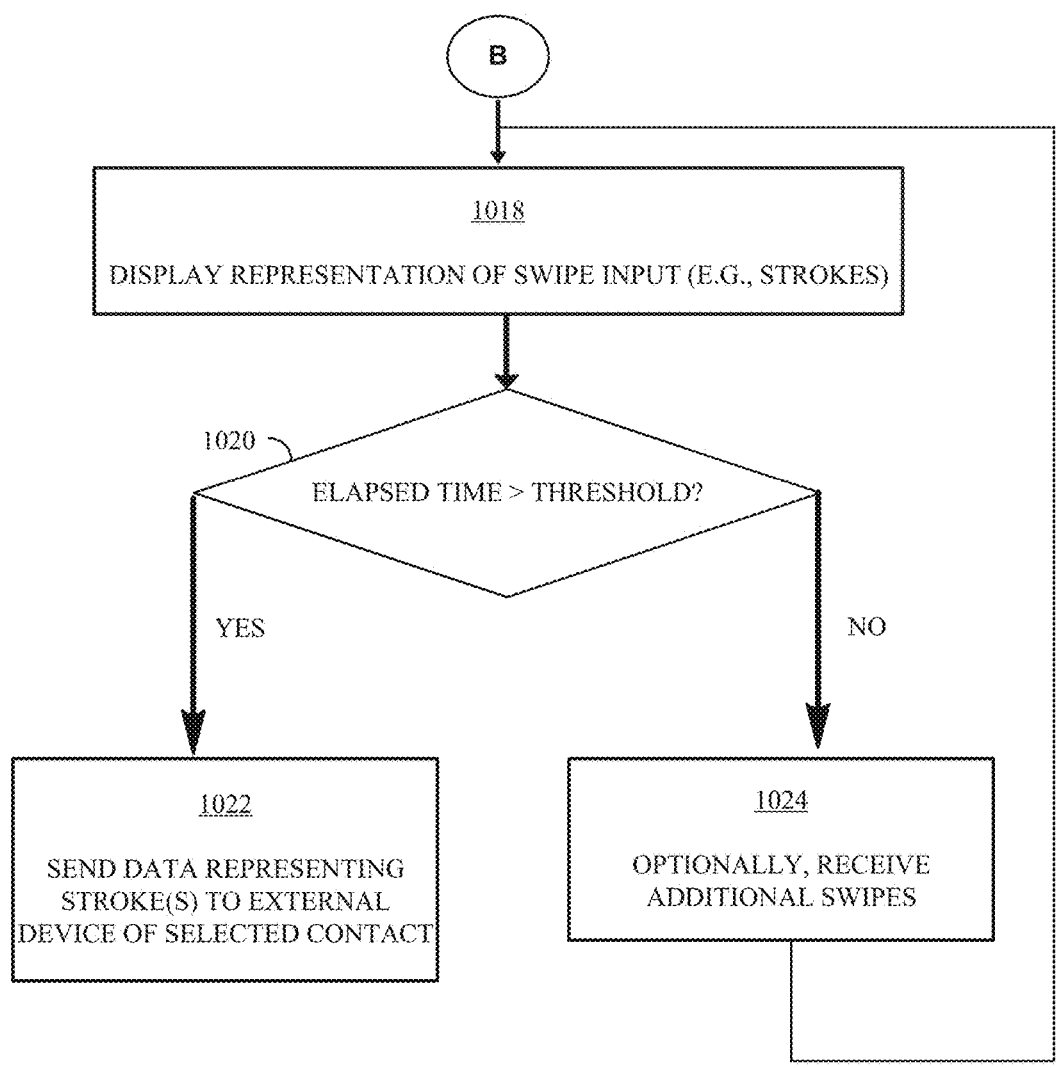

FIGS. 10A-10C depict a flow diagram illustrating process 1000 for electronic touch communications. Process 1000 may be carried out by electronic devices such as devices 100, 300, and/or 500 (FIGS. 1, 3, and 5) in various embodiments. At block 1002, a plurality of affordances representing contacts is displayed. The display may be triggered by user input. Optionally, the represented contacts may be a user-designated subset of available phonebook contacts, such as a user's "favorite" contacts, or a system defined "whitelist" or "grey-list". An exemplary display of affordances representing contacts is user interface 610 depicted in FIG. 6A. At block 1004, the device detects user selection of a displayed affordance, and in response, displays contact information identifying the selected contact. This information may include the contact's name, image, number, so forth. FIG. 6A provides exemplary contact information user interface 616.

At block 1006, responsive to user selection of a displayed affordance, a canvas such as drawing area 630 (FIG. 6A) is displayed. In some embodiments, optionally, an invitation is sent to (electronic device associated with) the selected contact, inviting the contact to electronic touch communication. In some embodiments, optionally, the device waits for acceptance of the invitation before displaying a drawing area.

While the drawing area is displayed, at block 1008 user input in the form of a swipe is detected. Upon detecting user input, processing proceeds to decision block 1010, where a determination is made as to whether the input is a single or multiple-finger touch input. If the input is a multiple-finger contact, processing proceeds to 1012, where the device sends data representing the multiple-finger contact to an external device. The transmitted data provides an indication to the external device to generate an image such as image 754 in FIG. 7C. If the input is a single-finger contact, processing proceeds to decision block 1014, where a determination is made as to whether the single-finger input is a swipe or a tap. If the single-finger input is a tap, processing proceeds to block 1016 where data representing the single-finger tap is sent to an external device. The transmitted data allows a visual representation such as visual representation 722 in FIG. 7A to be generated on the external device. The transmitted data may thus have the effect of triggering the display of various visual representations on the external device.

If the single-finger input is a swipe, processing proceeds to block 1018 where the device displays a visual representation of the swipe input, such as one of the eyes in the smiley face represented by visual representation 634 in FIG. 6B. At block 1020, a determination is made as to whether a threshold amount of time has elapsed after the last detected swipe. If the threshold amount of time has passed, processing proceeds to block 1022 where the device sends to the external device data indicative of the received swipe input(s). The transmitted data allows a visual representation such as visual representation 642 (FIG. 6B) to be generated on the external device. If the threshold amount of time has not passed, processing proceeds to block 1024 where additional swipes may be detected in the drawing area. After block 1024, processing returns to block 1018 so that any additionally received input is displayed on-screen. The operations of blocks 1018, 1020, and 1024 may be repeated as necessary until there is some finality to the input, e.g., the user is done drawing as indicated by a stoppage in the drawing input exceeding the threshold duration of time. When this occurs, processing proceeds to block 1022 where the device sends to the external device data indicative of the received swipe inputs. The transmitted data may thus have the effect of triggering the display of various visual representations on the external device.

Figure 11:
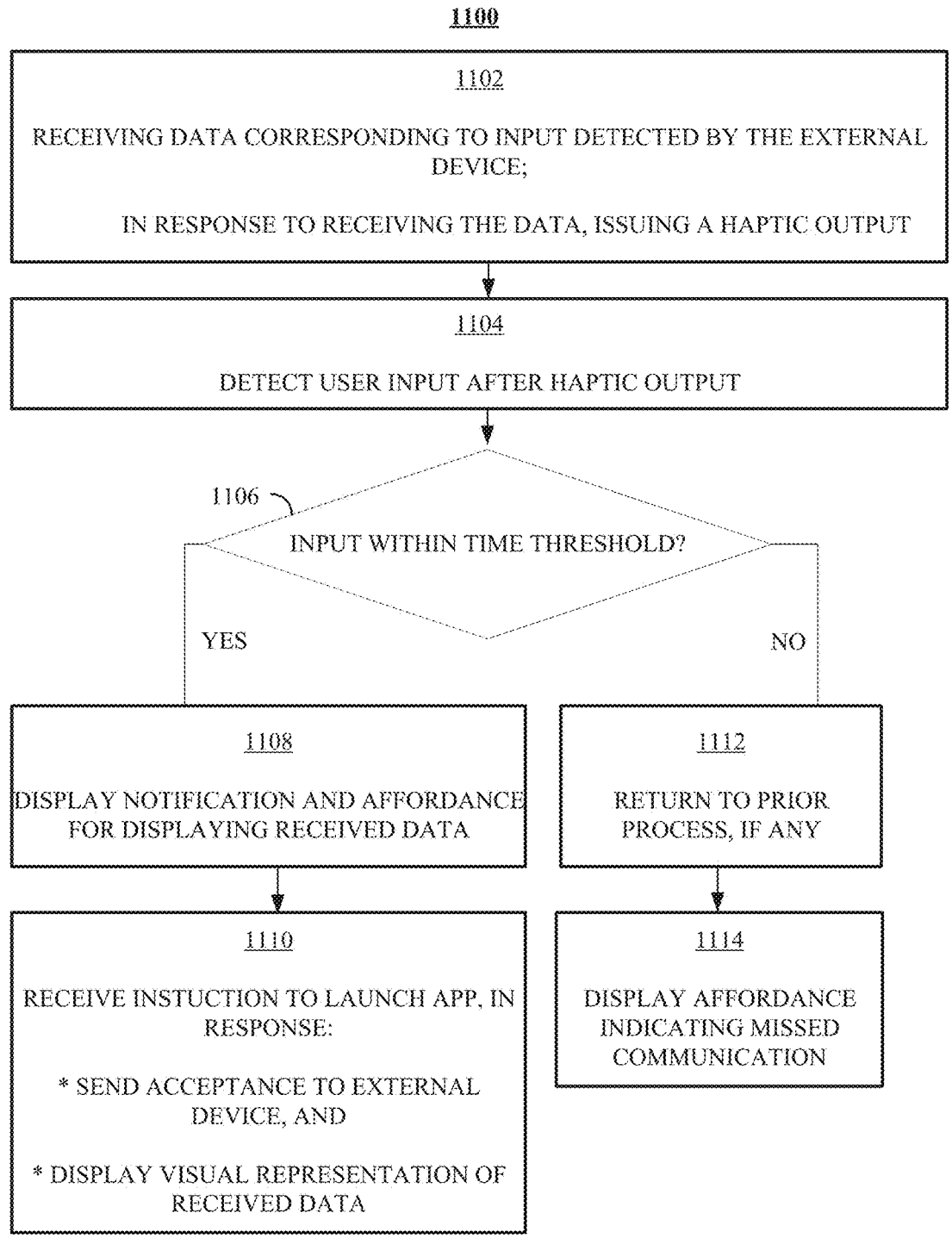
FIG. 11 is a flow diagram illustrating a process for electronic touch communication.

FIG. 11 depicts a flow diagram illustrating process 1100 for electronic touch communications. Process 1100 may be carried out by electronic devices such as devices 100, 300, and/or 500 (FIGS. 1, 3, and 5) in various embodiments. At block 1102, data corresponding to an input detected by an external device is received at the electronic device that is performing process 1100. The received data may represent an incoming electronic touch communication. In response to receiving the data, the electronic device produces a haptic output. At block 1106, a determination is made as to whether a user input is received within a predetermined time threshold after issuing the haptic output.

If the user provided input within the time threshold, processing proceeds to block 1108 where a notification (e.g., alert 638 in FIG. 6A, 840 in FIG. 8) regarding the incoming data is displayed. At block 1110, user input on the displayed alert is received, and in response, the electronic device launches an appropriate application for electronic touch communication and displays a visual representation of the incoming data.

In an alternate embodiment (not shown in FIG. 11), at block 1110, responsive to user input while the alert is displayed, the electronic device displays a visual representation of the incoming data without opening an additional application. In this alternative embodiment, the user will need to take additional steps to launch an appropriate electronic touch communication before a drawing canvas is displayed for electronic touch communication with the sender. However, by bypass the opening of an application, the electronic device may be able to present the received information more quickly, which may be useful in instances where the recipient is only able to briefly glance at the incoming communication.

If the user did not provide input within the time threshold, processing proceeds to block 1112 where the electronic device returns to its prior process (or an inactive state). At a later time, at block 1114, the electronic device displays an indication of the missed incoming communication. The indication may be indicator 994 depicted in FIG. 9C.

Figure 12:
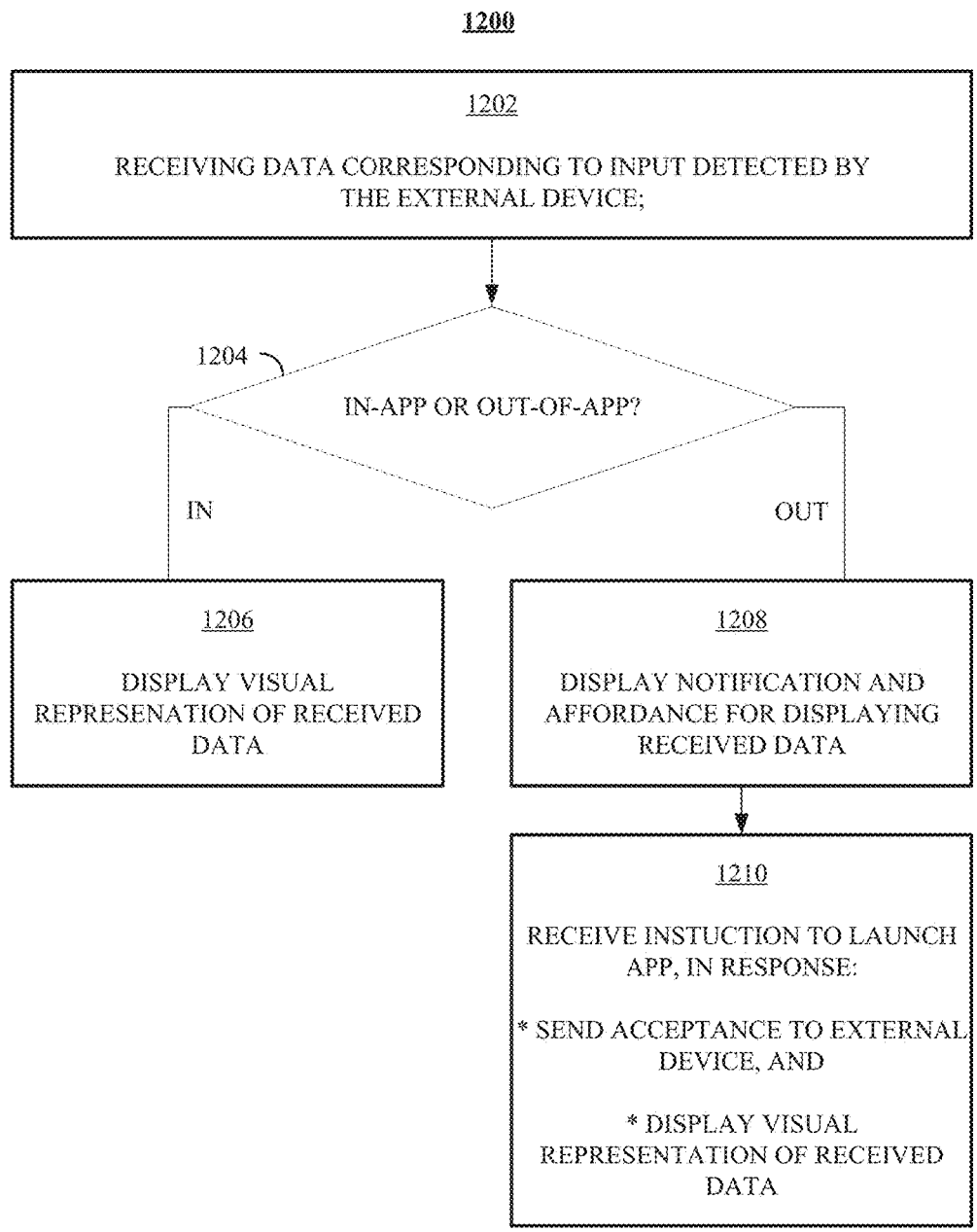
FIG. 12 is a flow diagram illustrating a process for electronic touch communication.

FIG. 12 depicts a flow diagram illustrating process 1200 for electronic touch communications. Process 1200 may be carried out by electronic devices such as devices 100, 300, and/or 500 (FIGS. 1, 3, and 5) in various embodiments. At block 1202, corresponding to an input detected by an external device is received at the electronic device that is performing process 1200. The received data may represent an incoming electronic touch communication. At block 1204, in response to receiving the data, the electronic device determines whether it is actively running an open application that is appropriate for handling electronic touch communications. If an appropriate application is open, processing proceeds to block 1206 where a visual representation of the incoming data is displayed. For example, FIG. 6D illustrates the handling of incoming data in this manner, particularly with respect to the display of visual representations 660 while both devices 600 and 699 are displaying drawing areas. If an appropriate application is not open, processing proceeds to block 1208, where a notification (e.g., alert 638 in FIG. 6B, alert 840 in FIG. 8) regarding the incoming data is displayed. At block 1210, user input on the displayed alert is received, and in response, the electronic device launches an appropriate application for electronic touch communication and displays a visual representation of the incoming data (e.g., the display of visual representation 642 in drawing area 640 in FIG. 6B).

Figure 13:
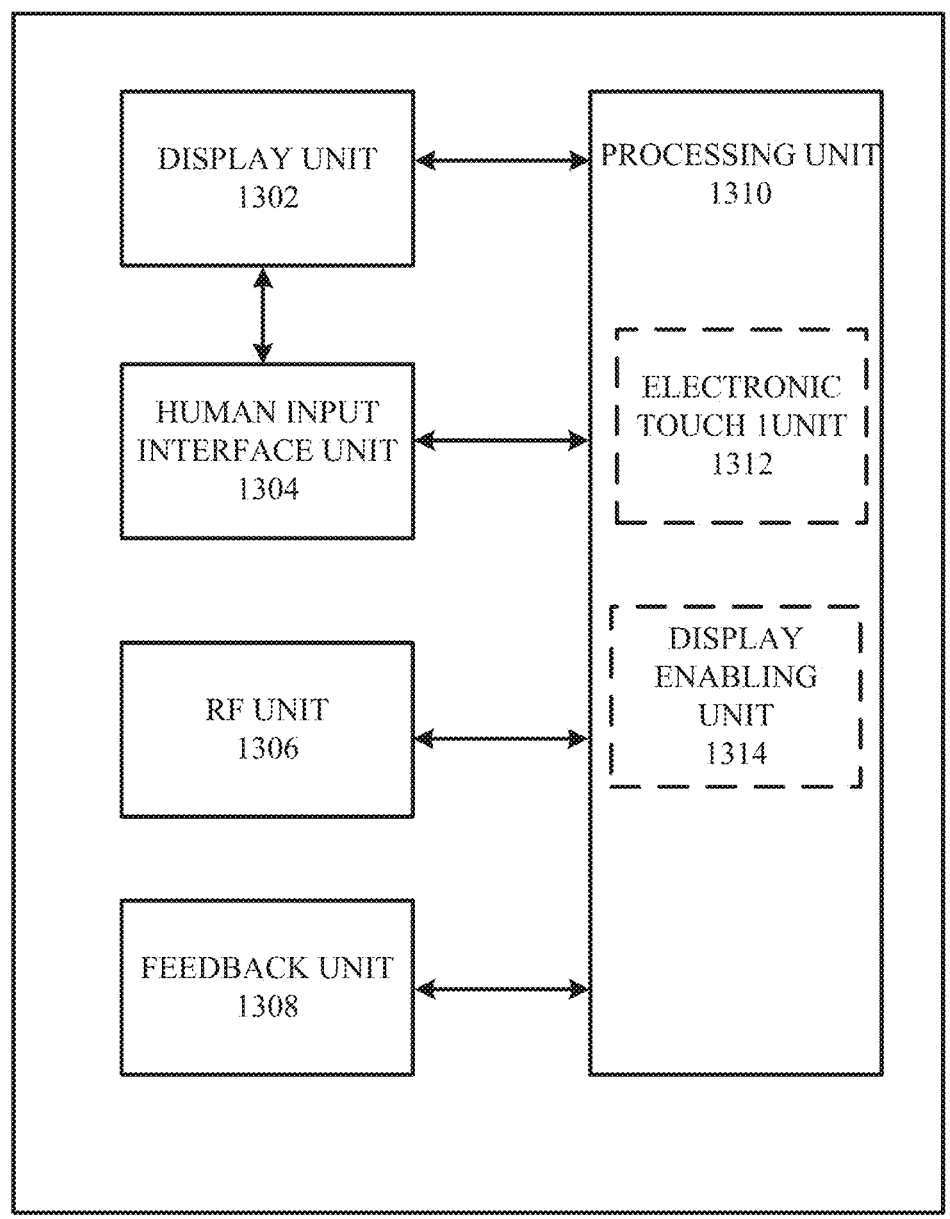
FIG. 13 is a functional block diagram of an electronic device in accordance with some embodiments.

FIG. 13 shows exemplary functional blocks of an electronic device 1300 that, in some embodiments, performs the above-described features. As shown in FIG. 13, an electronic device 1300 may include display unit 1302 configured to display graphical objects; human input interface unit 1304 configured to receive user input; one or more RF units 1306 configured to detect and communicate with external electronic devices; one or more feedback unit configured to provide user with haptic, audio, and/or visual feedback; and processing unit 1310 coupled to display unit 1302, human input interface unit 1304, RF unit(s) 1306, and feedback unit 1308. In some embodiments, processing unit 1312 is configured to support an electronic touch communication processing unit 1312 and a display enabling unit 1314.

In some embodiments, display enabling unit 1314 is configured to cause a display of a user interface (or portions of a user interface) in conjunction with the display unit 1302. For example, the display enabling unit 1314 may be used for display one or more of the user interface screens described with reference to FIGS. 6A-6E, 7A-7E, 8, and 9A-9C.

In some embodiments, electronic touch communication processing unit 1312 is configured to handle touch communications according to examples discussed above with respect to FIGS. 6A-6E, 7A-7E, 8, and 9A-9C. Electronic touch communication processing unit 1312 may also determine when outgoing data representing electronic touch communications are to be sent (e.g., whether the necessary time threshold since receiving an input has elapsed), when on-screen visual representations are to be removed (e.g., whether necessary display time threshold has elapsed), as discussed with respect to FIGS. 10A-10C, 11, and 12.

The units of FIG. 13 may be used to implement the various techniques and methods described above with respect to FIGS. 6-12. The units of device 1300 are, optionally, implemented by hardware, software, or a combination of hardware and software to carry out the principles of the various described examples. It is understood by persons of skill in the art that the functional blocks described in FIG. 13 are, optionally, combined or separated into sub-blocks to implement the principles of the various described examples. Therefore, the description herein optionally supports any possible combination or separation or further definition of the functional blocks described herein.

Figure 14:
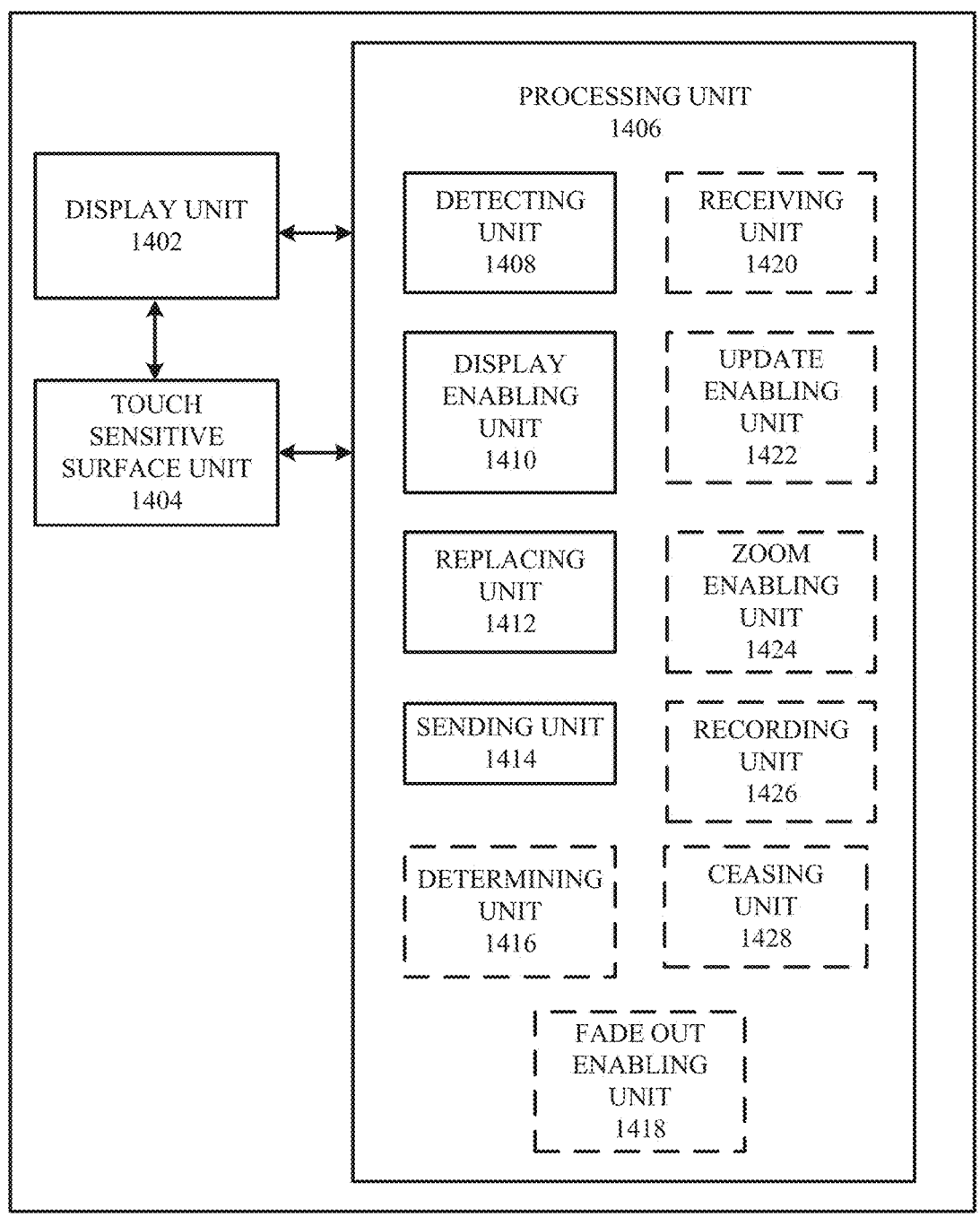
FIG. 14 is a functional block diagram of an electronic device in accordance with some embodiments.

In accordance with some embodiments, FIG. 14 shows a functional block diagram of an electronic device 1400 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 14 are, optionally, combined or separated into sub-blocks to implement the principles of the various described embodiments. Therefore, the description herein optionally supports any possible combination or separation or further definition of the functional blocks described herein.

As shown in FIG. 14, an electronic device 1400 includes a display unit 1402 configured to display a graphic user interface, a touch sensitive surface unit 1404 configured to receive contacts, and a processing unit 1406 coupled to the display unit 1402 and the touch-sensitive surface unit 1404. In some embodiments, the processing unit 1406 includes a detecting unit 1408, a display enabling unit 1410, a replacing unit 1412, a sending unit 1414, a determining unit 1416, a fade out enabling unit 1418, a receiving unit 1420, an update enabling unit 1422, a zoom enabling unit 1424, a recording unit 1426, and a ceasing unit 1428.

The processing unit 1406 is configured to detect (e.g., with the detecting unit 1408) a user input and in response to detecting the user input, enable display (e.g., with the display enabling unit 1410) of a plurality of affordances representing contacts. The processing unit 1406 is configured to detect (e.g., with the detecting unit 1408) user selection of a displayed affordance representing a contact; in response to detecting user selection of the displayed affordance, replace (e.g., replacing unit 1412) the display of the plurality of affordances with a display of contact information identifying a selected contact, the selected contact represented by the selected affordance; detect (e.g., with the detecting unit 1408) a touch on the touch-sensitive display while displaying the contact information; and in response to detecting the touch: enable display (e.g., with the display enabling unit 1410) of a drawing area, where the drawing area is responsive to touch input. The processing unit 1406 is further configured to detect (e.g., with the detecting unit 1408) a first touch input in the drawing area representing a first stroke; enable display (e.g., with display enabling unit 1410) of a visual representation, in the drawing area, of the first stroke; and send (e.g., with the sending unit 1414) data representing the first stroke to an external device associated with the selected contact.

In some embodiments, the processing unit 1406 is further configured to determine (e.g., with the determining unit 1416) whether a first predetermined duration of time has passed after the first touch input, where sending data representing the first stroke comprises sending the data in response to determining that the first predetermined duration has passed.

In some embodiments, the processing unit 1406 is further configured to: before the first predetermined duration has passed, detect (e.g., with the detecting unit 1408) a second touch input in the on-screen drawing area representing a second stroke, where the first and second strokes are separated by an intervening amount of time; and send (e.g., with the sending unit 1414) data to the external device associated with the second stroke and the intervening amount of time.

In some embodiments, the first stroke has characteristic kinematics, and sending data representing the first stroke comprises sending data to the external device indicating the characteristic kinematics.

In some embodiments, the processing unit 1406 is further configured to enable fading out (e.g., with the fade out enabling unit 1418) of the displayed visual representation of the first stroke after the first stroke has been received for a second predetermined duration of time.

In some embodiments, sending the data triggers the external device to: display an indication of the receiving of the data, and display of affordance, where the affordance when selected causes the external device to display a visual representation of the first stroke.

In some embodiments, sending the data triggers the external device to display a visual representation of the first stroke.

In some embodiments, sending the data triggers the external device to display a visual representation of the first stroke, followed by a pause of the intervening amount of time, and then display a visual representation of the second stroke.

In some embodiments, sending the data triggers the external device to display a visual representation of the first stroke with the characteristic kinematics.

In some embodiments, the processing unit 1406 is further configured to enable fading out (e.g., with the fade out enabling unit 1418) of the visual representation of a stroke after determining the visual representation has been displayed for a third predetermined duration of time.

In some embodiments, the processing unit 1406 is further configured to receive (e.g., with the receiving unit 1420) data from the external device, the data representing a third touch input detected by the external device, the third touch input representing a third stroke; and enable display (e.g., with the display enabling unit 1410) of a visual representation of the third stroke in the drawing area at the electronic device.

In some embodiments, the processing unit 1406 is further configured to enable fading out (e.g., with the fade out enabling unit 1418) of the visual representation of the third stroke after a fourth predetermined duration of time.

In some embodiments, the second, third, and fourth predetermined durations of time are the same duration.

In some embodiments, a stroke has a beginning and an end, and fading out the visual representation of a stroke comprises fading out a corresponding beginning of the visual representation before fading out a corresponding end of the visual representation.

In some embodiments, the processing unit 1406 is further configured to: enable display (e.g., with the display enabling unit 1410) of a color-picker affordance in the drawing area, where the color-picker affordance has a color indicating a currently selected color, where displaying the visual representation of the first stroke comprises displaying the visual representation in the currently selected color; and in response to detecting a selection of the color-picker affordance, enable display (e.g., with the display enabling unit 1410) of a plurality of color affordances representing colors.

In some embodiments, the plurality of color affordances includes affordances representing previously-selected colors.

In some embodiments, the processing unit 1406 is further configured to, in response to detecting a selection of a color affordance of the displayed plurality of color affordances, enable display (e.g., with the display enabling unit 1410) of a color palette.

In some embodiments, the color palette comprises a plurality of portions having different colors, and the processing unit 1406 is further configured to, in response to detecting a selection of a portion of the color palette corresponding to a selected color: enable display (e.g., with the display enabling unit 1410) of the drawing area; and enable updating (e.g., with the update enabling unit 1422) of the color-picker affordance displayed in the drawing area such that the color-picker affordance is displayed with the selected color.

In some embodiments, sending data representing the first stroke to the external device comprises sending data representing the selected color.

In some embodiments, the electronic device comprises a rotatable input mechanism, and the processing unit 1406 is further configured to: while enabling display of the plurality of affordances representing contacts, detect (e.g., with the detecting unit 1408) user input representing movement of the rotatable input mechanism; and in response to detecting the user input: enable zoom (e.g., with the zoom enabling unit 1424) of the display of the plurality of user-designated contacts, where zooming the display comprises changing the size of contacts being displayed.

In some embodiments, enabling zoom of the display comprises enabling a change of the number of contacts being displayed.

In some embodiments, the touch-sensitive display comprises one or more sensors to detect the intensity of touches on the touch-sensitive display, and the processing unit 1406 is further configured to, while enabling display of the drawing area, detect (e.g., with the detecting unit 1408) a touch on the touch-sensitive display, where the touch has a characteristic intensity; determine (e.g., with the determining unit 1416) whether the characteristic intensity exceeds a predetermined threshold intensity; in response to a determination that the characteristic intensity exceeds the predetermined threshold intensity: enable display (e.g., with the display enabling unit 1410) of a call affordance, where the call affordance, when selected, causes the processing unit to initiate a call to the external device associated with the contact; and in response to a determination that the characteristic intensity does not exceed the predetermined threshold intensity, send (e.g., with the sending unit 1414) data representing the touch to the external device.

In some embodiments, the touch-sensitive display comprises one or more sensors to detect the intensity of touches on the touch-sensitive display, and the processing unit 1406 is further configured to, while enabling display of the drawing area, detect (e.g., with the detecting unit 1408) a touch on the touch-sensitive display, where the touch has a characteristic intensity; determine (e.g., with the determining unit 1416) whether the characteristic intensity exceeds a predetermined threshold intensity; in response to a determination that the characteristic intensity exceeds the predetermined threshold intensity: enable display (e.g., with the display enabling unit 1410) of a text affordance, where the text affordance, when selected, causes the processor to initiate a message addressed to the external device associated with the contact; and in response to a determination that the characteristic intensity does not exceed the predetermined threshold intensity, send (e.g., with the sending unit 1414) data representing the touch to the external device.

In some embodiments, the processing unit 1406 is further configured to, while enabling display of a contact information identifying the selected contact, enable display (e.g., with the display enabling unit 1410) of a call affordance, where the call affordance, when selected, causes the processing unit 1406 to initiate a call to the external device associated with the selected contact.

In some embodiments, the processing unit 1406 is further configured to: while enabling display of a contact information identifying the selected contact, enable display (e.g., with the display enabling unit 1410) of a text affordance, where the text affordance, when selected, causes the processing unit to initiate a message addressed to the external device associated with the selected contact.

In some embodiments, enabling display of the plurality of affordances representing contacts comprises enabling display of a plurality of affordances representing user-designated contacts, user-designated contacts being a subset of contacts accessible to the electronic device.

In some embodiments, the electronic device comprises a depressible input mechanism separate from the touch-sensitive display, and detecting user input comprises detecting activation of the depressible input mechanism.

In some embodiments, the electronic device comprises a depressible input mechanism and a microphone, the processing unit further configured to, while enabling display of the drawing area, detect (e.g., with the detecting unit 1408) an activation of the depressible input mechanism; in response to detecting the activation: record (e.g., with the recording unit 1426) an audio message based on input received from the microphone while the depressible input mechanism remains depressed; detect (e.g., with the detecting unit 1408) a release of the depressible input mechanism; and in response to detecting the release: cease (e.g., with the ceasing unit 1428) recording the audio message and send the recorded audio message to the external device associated with the selected contact.

The operations described above with reference to FIGS. 10A-10C are, optionally, implemented by components depicted in FIGS. 1A-1B or FIG. 14. For example, displaying operations 1002 and 1018; detecting operations 1004, 1006, and 1008, determining operations 1010, 1014, and 1020; sending operations 1012, 1016, and 1022, and optionally, receiving operation 1024 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 15:
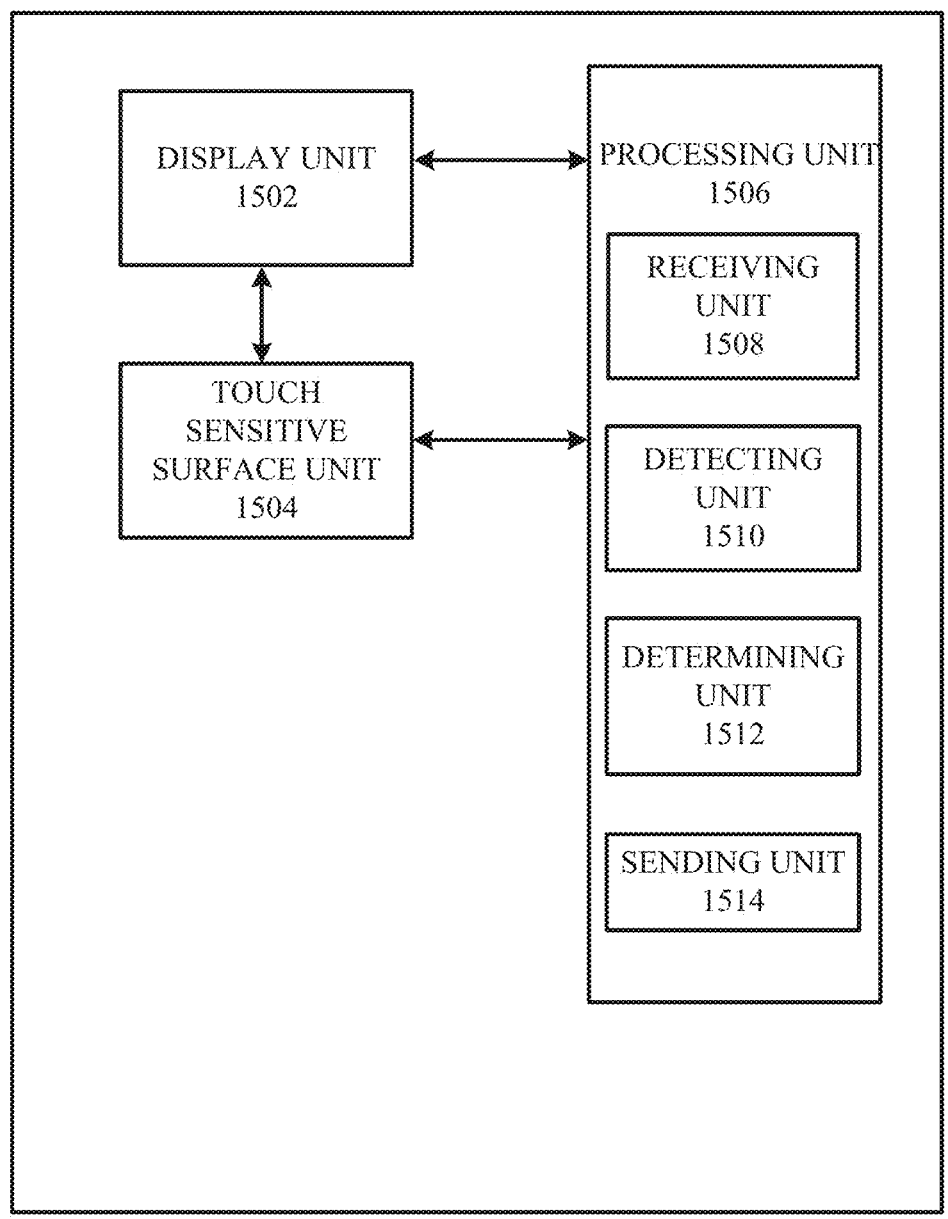
FIG. 15 is a functional block diagram of an electronic device in accordance with some embodiments.

In accordance with some embodiments, FIG. 15 shows a functional block diagram of an electronic device 1500 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 15 are, optionally, combined or separated into sub-blocks to implement the principles of the various described embodiments. Therefore, the description herein optionally supports any possible combination or separation or further definition of the functional blocks described herein.

As shown in FIG. 15, an electronic device 1500 includes a display unit 1502 configured to display a graphic user interface, a touch sensitive surface unit 1504 configured to receive contacts, and a processing unit 1506 coupled to the display unit 1502 and the touch-sensitive surface unit 1504. In some embodiments, the processing unit 1506 includes a receiving unit 1508, a detecting unit 1510, a determining unit 1512, and a sending unit 1514. The electronic device, optionally, is configured to communication with an external device associated with a contact.

The processing unit 1506 is configured to receive (e.g., with the receiving unit 1508) user selection of a displayed affordance representing the contact; after receiving the selection, detect (e.g., with the detecting unit 1510) user input on the touch-sensitive display; determine (e.g., with the determining unit 1512) whether the touch input is a single-finger touch input or a multiple-finger touch input; and in accordance with a determination that the touch is a single-finger touch input, send (e.g., with the sending unit 1514) data to the external device, the data representing the single-finger touch input.

In some embodiments, sending the data triggers the external device to provide an output corresponding to the single-finger touch input.

In some embodiments, sending the data triggers the external device to display a notification of receiving the data, and an affordance which, when selected, causes the external device to display a visual representation of the single-finger touch input.

In some embodiments, detecting user input on the touch-sensitive display of the electronic device comprises detecting the single-finger touch input at a position on the touch-sensitive display, and the visual representation of the single-finger touch input, when displayed, is displayed on a screen of the external device at a location corresponding to the position where the single-finger touch input was detected.

In some embodiments, the visual indication comprises one or more circles, ellipses, and/or ovals.

In some embodiments, the visual indication comprises two or more concentric circles, ellipses, and/or ovals.

In some embodiments, the visual indication on the external device fades out after being displayed for a predetermined amount of time.

In some embodiments, the single-finger touch input is a single-finger tap.

In some embodiments, the processing unit 1506 is further configured to, in accordance with a determination that the detected user input represents a multiple-finger touch input, send (e.g., with the sending unit 1514) data to the external device, where sending the data triggers the external device to display a visual indicator for the duration of the multiple-finger touch input.

In some embodiments, the output comprises a notification of the receiving of the data, and an affordance which, when selected, causes the processing unit to enable display of a visual indicator for the duration of the multiple-finger touch input.

In some embodiments, the visual indicator is an image.

In some embodiments, the visual indicator is an animated image.

In some embodiments, the visual indicator is an animated image of a pulsing heart.

In some embodiments, the electronic device further comprises a biometric sensor configured to detect the rate of a heartbeat, where a rate of pulsing of the pulsing heart is based on the detected rate of heartbeat.

In some embodiments, the electronic device further comprises a biometric sensor configured to detect the rate of a heartbeat, where sending the data triggers the external device to provide a haptic output corresponding to the detected rate of heartbeat.

In some embodiments, sending the data triggers the external device to provide a haptic output.

In some embodiments, the electronic device comprises a rotatable input mechanism, where receiving user selection of the contact comprises enabling display of a plurality of affordances representing contacts; detecting user input representing movement of the rotatable input mechanism; and in response to detecting the user input: enabling zoom of the display of the plurality of user-designated contacts, where zooming the display comprises changing the size of contacts being displayed.

In some embodiments, enabling zoom of the display comprises enabling a change of the number of contacts being displayed.

In some embodiments, the processing unit 1506 is further configured to while enabling display of the plurality of affordances representing contacts, detect (e.g., with the detecting unit 1510) a touch input on a displayed affordance; and in response to detecting the touch input, send (e.g., with the sending unit 1514) data to the external device associated with the contact, where sending the data triggers the external device to provide haptic output.

In some embodiments, detecting the touch input on the displayed affordance comprises detecting a first touch and release on the displayed affordance followed by a second touch and release on the displayed affordance within a predetermined duration of time.

The operations described above with reference to FIGS. 10A-10C are, optionally, implemented by components depicted in FIGS. 1A-1B or FIG. 15. For example, displaying operations 1002 and 1018; detecting operations 1004, 1006, and 1008, determining operations 1010, 1014, and 1020; sending operations 1012, 1016, and 1022, and optionally, receiving operation 1024 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 16:
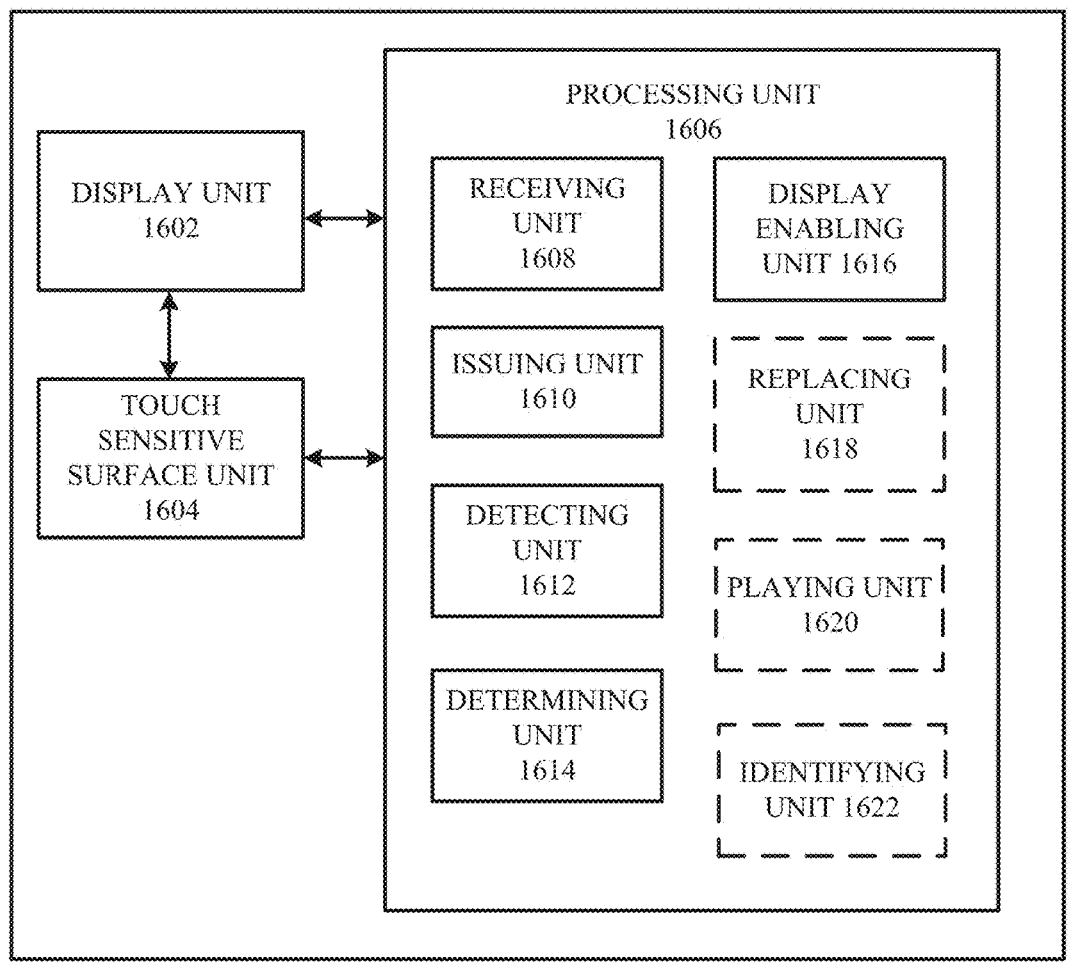
FIG. 16 is a functional block diagram of an electronic device in accordance with some embodiments.

In accordance with some embodiments, FIG. 16 shows a functional block diagram of an electronic device 1600 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 16 are, optionally, combined or separated into sub-blocks to implement the principles of the various described embodiments. Therefore, the description herein optionally supports any possible combination or separation or further definition of the functional blocks described herein.

As shown in FIG. 16, an electronic device 1600 includes a display unit 1602 configured to display a graphic user interface, a touch sensitive surface unit 1604 configured to receive contacts, and a processing unit 1606 coupled to the display unit 1602 and the touch-sensitive surface unit 1604. In some embodiments, the processing unit 1606 includes a receiving unit 1608, an issuing unit 1610, a detecting unit 1612, a determining unit 1614, a display enabling unit 1616, a replacing unit 1618, a playing unit 1620, and an identifying unit 1622. The electronic device, optionally, is configured to communication with an external device.

The processing unit 1606 is configured to receive (e.g., with the receiving unit 1608) data corresponding to input detected by the external device; in response to receiving the data, issue (e.g., with the issuing unit 1610) a haptic output; after issuing the haptic output, detect (e.g., with the detecting unit 1612) a user input; determine (e.g., with the determining unit 1614) whether the user input was detected within a predetermined time interval after the haptic output; and in accordance with a determination that the user input was detected within the predetermined time interval, enable display (e.g., with the display enabling unit 1616) of a notification on the display, where the notification indicates the availability of information for playback.

In some embodiments, the processing unit 1606 is further configured to, while enabling display of the notification, detect (e.g., with the detecting unit 1612) a second user input; determine (e.g., with the determining unit 1614) whether the received data comprises visual information; and in accordance with a determination that the received data comprises visual information: replace (e.g., with the replacing unit 1618) the displayed notification with a display of the visual information.

In some embodiments, the processing unit 1606 is further configured to determine (e.g., with the determining unit 1614) whether the received data comprises audio information; and in accordance with a determination that the received data comprises audio information: play (e.g., with the playing unit 1620) the audio information through a speaker operatively connected to the electronic device.

In some embodiments, the processing unit 1606 is further configured to identify (e.g., with the identifying unit 1622) a user associated with the external device; and in accordance with a determination that the user input was detected after the predetermined time interval: enable display (e.g., with the display enabling unit 1616) of a plurality of affordances representing user-designated contacts, and an affordance representing the user associated with the external device; and enable display (e.g., with the display enabling unit 1616) of an indicator corresponding to the affordance representing the user associated with the external device, the indicator indicating the availability of information for playback received from the user associated with the external device.

In some embodiments, the processing unit 1606 is further configured to identify (e.g., with the identifying unit 1622) a plurality of contacts accessible to the electronic device; determine (e.g., with the determining unit 1614) whether the external device is associated with a contact of the plurality of contacts accessible to the electronic device; in accordance with a determination that the external device is not associated with a contact of the plurality of contacts accessible to the electronic device: enable display (e.g., with the display enabling unit 1616) of an add-contact affordance, where the add-contact affordance, when selected, causes the processing unit to enable display of a user interface screen for registering a contact and associating the external device with the contact.

In some embodiments, the processing unit 1606 is further configured to identify (e.g., with the identifying unit 1622) a subset of the plurality of contacts accessible to the electronic device, as a plurality of user-designated contacts; determine (e.g., with the determining unit 1614) whether the external device is associated with a user-designated contact of the plurality of user-designated contacts; and in accordance with a determination that the external device is associated with a contact of the plurality of contacts accessible to the electronic device, but not associated with a user-designated contact of the plurality of user-designated contacts: enable display (e.g., with the display enabling unit 1616) of a designate affordance, where the designate affordance, when selected, causes the processing unit to enable display of a user interface screen for designating the contact that is associated with the external device as a user-designated contact.

In some embodiments, the processing unit 1606 is further configured to identify (e.g., with the identifying unit 1622) a contact name associated with the external device, where enabling display of a notification on the display comprises enabling display of the identification of the contact name.

In some embodiments, the processing unit 1606 is further configured to identify (e.g., with the identifying unit 1622) an image associated with the contact name, where enabling display of a notification on the display comprises enabling display of the image.

In some embodiments, detecting a user input comprises detecting a movement of the electronic device.

In some embodiments, detecting a user input comprises detecting a raise of the electronic device.

The operations described above with reference to FIG. 11 are, optionally, implemented by components depicted in FIGS. 1A-1B or FIG. 16. For example, receiving operations 1101 and 1110, detecting operation 1104, determining operation 1106, displaying operations 1108 and 1114, and returning operation 1112 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 17:
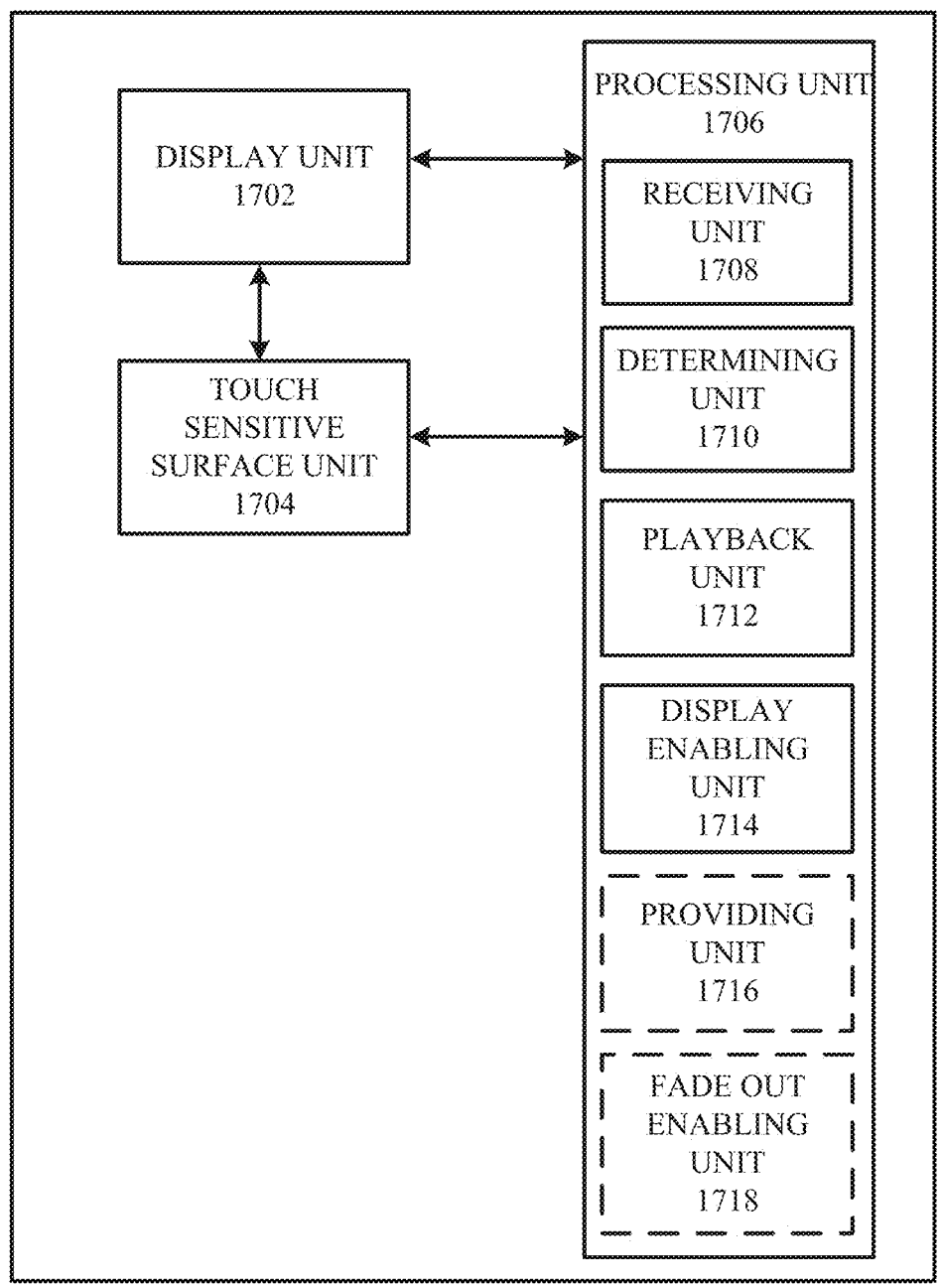
FIG. 17 is a functional block diagram of an electronic device in accordance with some embodiments.

In accordance with some embodiments, FIG. 17 shows a functional block diagram of an electronic device 1700 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 17 are, optionally, combined or separated into sub-blocks to implement the principles of the various described embodiments. Therefore, the description herein optionally supports any possible combination or separation or further definition of the functional blocks described herein.

As shown in FIG. 17, an electronic device 1700 includes a display unit 1702 configured to display a graphic user interface, a touch sensitive surface unit 1704 configured to receive contacts, and a processing unit 1706 coupled to the display unit 1702 and the touch-sensitive surface unit 1704. In some embodiments, the processing unit 1706 includes a receiving unit 1708, a determining unit 1710, a playback unit 1712, a display enabling unit 1714, a providing unit 1716, and a fade out enabling unit 1718. The electronic device, optionally, is configured to communication with an external device.

The processing unit 1706 is configured to receive (e.g., with the receiving unit 1708) data from the external device representing user input received at the external device; determine (e.g., with the determining unit 1710) whether the electronic device is actively executing an application for playback; in accordance with a determination that the electronic device is actively executing an application for playback, play-back (e.g., with the playback unit 1712) the received data; and in accordance with a determination that the electronic device is not actively executing an application for playback: enable display (e.g., with the display enabling unit 1714) of an indication of the receiving of the data; and enable display (e.g., with the display enabling unit 1714) of an affordance, where the affordance when selected launches the application for playback and causes the electronic device to playback the received data.

In some embodiments, the processing unit is further configured to, in accordance with a determination that the electronic device is not actively executing the application for playback, provide (e.g., with the providing unit 1716) haptic output in response to receiving the data.

In some embodiments, playing back the received data further comprises, in accordance with a determination that the user input is a single-finger touch input on the external device, enabling display of a visual representation of the single-finger touch input on a screen of the electronic device corresponding to the position on the external device where the single-finger touch input was detected.

In some embodiments, the visual indication comprises one or more circles, ellipses, and/or ovals.

In some embodiments, the visual indication comprises two or more concentric circles, ellipses, and/or ovals.

In some embodiments, the processing unit 1706 is further configured to enable fade out (e.g., with the fade out enabling unit 1718) of the visual indication after a predetermined amount of time.

In some embodiments, playing back the received data further comprises: in accordance with a determination that the user input is a multiple-finger touch input on the external device, enabling display of a visual indicator for the duration of the multiple-finger touch input.

In some embodiments, the visual indicator is an image.

In some embodiments, the visual indicator is an animated image.

In some embodiments, the visual indicator is an animated image of a pulsing heart.

In some embodiments, the processing unit 1706 is further configured to: provide (e.g., with the providing unit 1716) haptic output while enabling display of the visual indicator.

In some embodiments, playing back the received data further comprises: in accordance with a determination that the user input is a double-tap on the external device, enabling display of an identification of a user associated with the external device, and providing a haptic output while displaying the identification.

In some embodiments, playing back the received data further comprises: in accordance with a determination that the user input is an audio recording recorded using a microphone of the external device, playing the audio recording.

In some embodiments, playing back the received data further comprises: in accordance with a determination that the user input is a swipe contact on the external device representing a stroke, enabling display of a visual representation of the stroke.

In some embodiments, the processing unit 1706 is further configured to enable fade out the stroke after a predetermined duration of time.

The operations described above with reference to FIG. 12 are, optionally, implemented by components depicted in FIGS. 1A-1B or FIG. 17. For example, receiving operations 1202 and 1210, determining operation 1204, and display operations 1206 and 1208 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 18A:
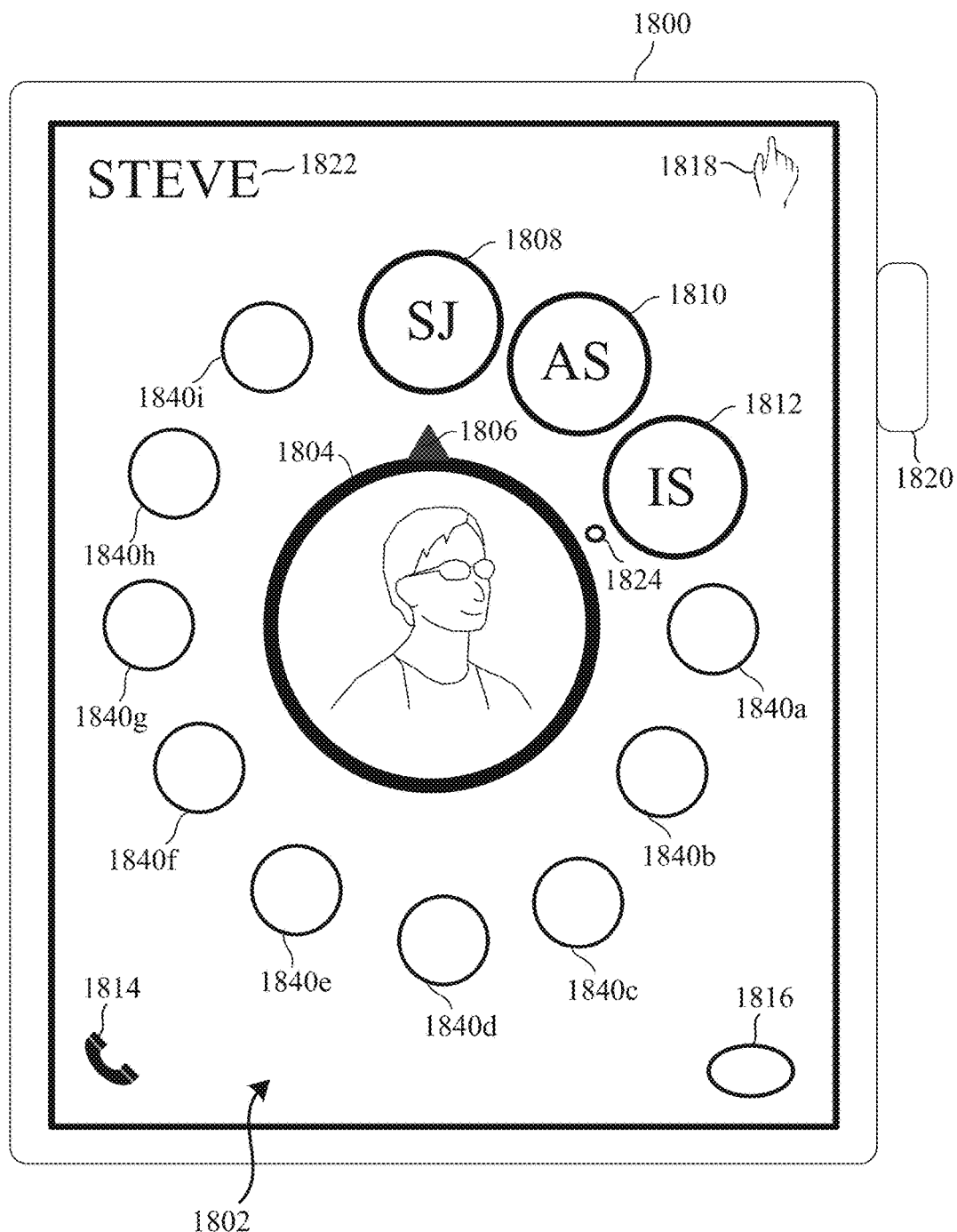
FIGS. 18A-18K illustrate exemplary user interfaces for electronic communication.
Figure 18B:
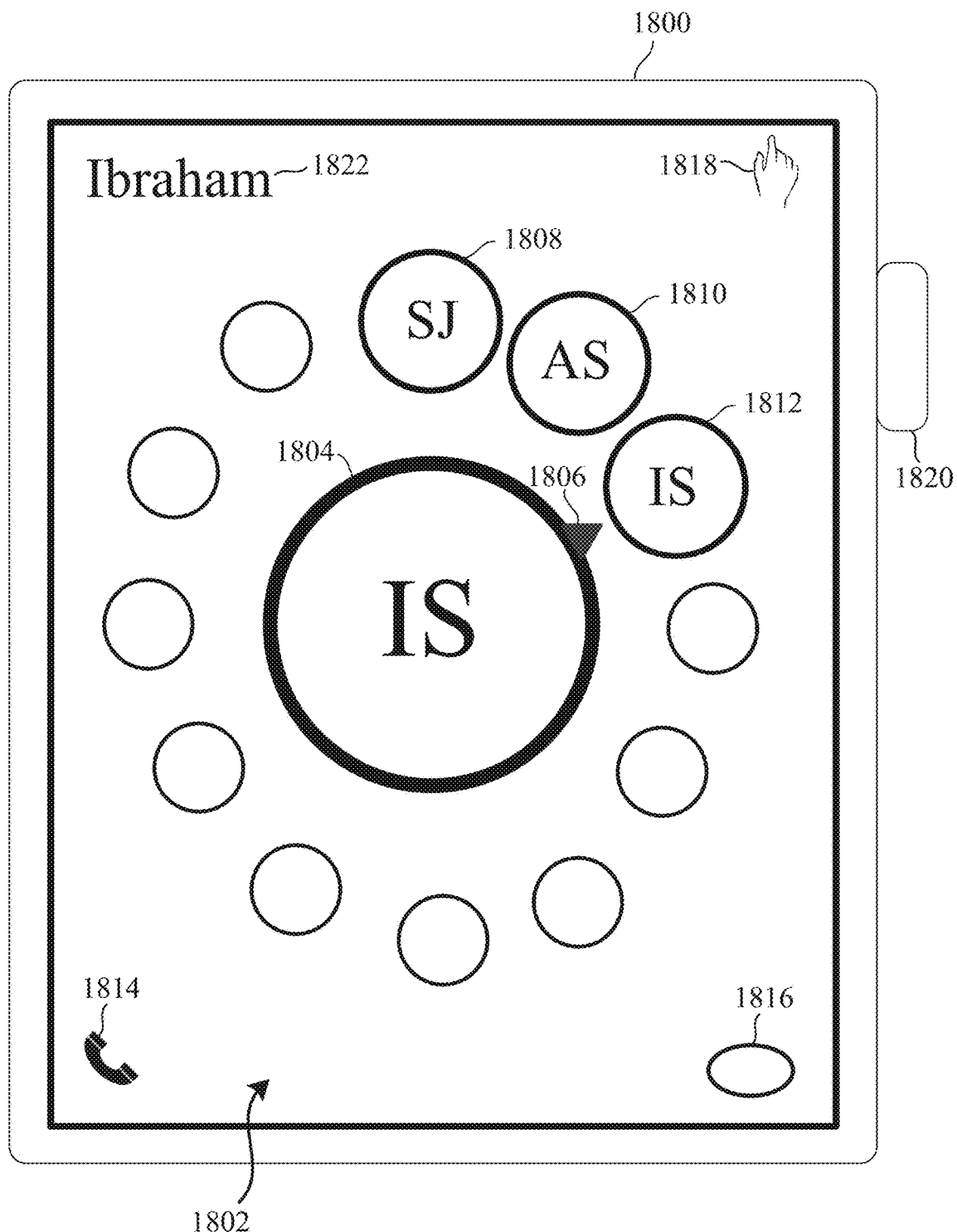

FIGS. 18A-18B illustrate example embodiments of a touch-sensitive display including user interface 1802 at electronic device 1800. User interface 1802, and the methods described below, allow a user to communicate with one or more contacts whose information is stored on electronic device 1800. In some embodiments, the user may have stored on electronic device 1800 a large number of contacts and therefore require an efficient method for identifying and communicating with a particular contact. Further, in some cases, the user may engage with only a subset of the stored contacts on a regular basis. As such, it would be inconvenient to scroll through a contact list each time the user desires to communicate with a specific contact. Hence, in order to enhance the user experience and improve efficient communication, it may be desirable for electronic device 1800 to display a user interface including a limited number of one or more contacts as selected by the user.

Electronic device 1800 may be the same as or similar to portable multifunction device 100 and/or device 500. Further, electronic device 1800 may include rotatable input mechanism 1820, which may be the same as or similar to rotatable input mechanism 506. Electronic device 1800 may include a touch-sensitive display, which may include a user interface 1802, and may be the same as or similar to touch-sensitive display system 112 and/or display 504.

As illustrated at FIG. 18A, electronic device 1800 may be configured to display, on touch-sensitive display including user interface 1802, a plurality of objects (e.g., first object 1808, second object 1810, third object 1812, and objects 1840a-1840i) arranged or otherwise positioned around affordance 1804. In some embodiments, one or more objects of the plurality of objects may be associated with a contact of a plurality of contacts. For example, first object 1808 may be associated with contact Steve Jones. Accordingly, first object 1808 may include a set of initials (e.g., "SJ"), which may be displayed within first object 1808. In some embodiments, the set of initials may be a monogram, such as, but not limited to, a set of stylized, inter-woven, or overlapping initials. Similarly, second object 1810 may include initials "AS" and third object 1812 may include initials "IS". In some embodiments, the user interface may include 12 objects, each arranged in a position corresponding to an hour in a standard clock or watch face (e.g., an object at one o'clock, two o'clock, three o'clock, and so forth). In other embodiments, there may be six objects arranged at positions corresponding to every two hours in a standard clock or 24 objects corresponding to every 30 minutes.

User interface 1802 may also include affordance 1804, which may display a visual appearance in accordance with a position of a visual indicator 1806 with respect to an object of the plurality of objects. For example, the visual appearance of the affordance may be a set of initials representing a contact of the plurality of contacts or an image representing a contact of the plurality of contacts. As shown in FIG. 18A, the visual appearance of affordance 1804 may be an image of a contact associated with the first object 1808.

In some embodiments, electronic device 1800 may be configured to receive a first input corresponding to a rotation of the rotatable input mechanism 1820. Further, as shown in FIG. 18B, electronic device 1800 may be configured to update the visual appearance of the affordance 1804 to represent a second contact (e.g., "IS") among the plurality of contacts in response to receiving the input corresponding to the rotation of the rotatable input mechanism 1820. Further, user interface 1802 may include a visual indicator 1806 associated with a first object 1808 of the plurality of objects, the first object associated with the first contact (e.g., "Steve") of the plurality of contacts.

As an example, electronic device 1800 may be configured to receive an input from a user desiring to communicate or otherwise dwell on another contact from the plurality of contacts. Based on a rotation of rotatable input mechanism 1820, the visual appearance of affordance 1804 may change from first object 1808, to third object 1812, as shown in FIG. 18B. Additionally, the position or movement of visual indicator 1806 may correspond to a rotation of rotatable input mechanism 1820. As such, as rotatable input mechanism is rotated, visual indicator 1806 may move in a circular manner about affordance 1804 from one object to another.

Specifically, for example, in response to receiving the first input corresponding to the rotation of the rotatable input mechanism 1820, electronic device 1800 may be configured to cease association of the visual indicator 1806 with the first object 1808 of the plurality of objects and associate the visual indicator 1806 with an object of the plurality of objects that is associated with the second contact (e.g., contact associated with second object 1810) of the plurality of contacts.

In some embodiments, electronic device 1800 may be configured to display, as part of the user interface 1802, a visual indicator 1806 in accordance with a position value. For example, the value may be within a range of position values, where each of the objects of the plurality of objects may be associated with a position within the range of position values. Further, electronic device 1800 may be configured to determine whether the first input is a request to update the position value of the visual indicator 1806 to a second position value that is not associated with an object of the plurality of objects.

As such, electronic device 1800 may be configured to snap the visual indicator to a nearest or closest object of the plurality of objects. Specifically, electronic device may be configured to update the position value of the visual indicator 1806 to a third position value that corresponds to the position value of the object of the plurality of objects that is nearest to the second position value within the range of position values and update display of the visual indicator in accordance with the third position value. For example, the foregoing display update may be performed based on a determination that the first input is a request to update the position value of the visual indicator 1806 to a second position value that is not associated with an object of the plurality of objects.

Electronic device 1800 may also snap to or otherwise move to a nearest or another object based on a received input in order to enhance the user experience. For example, to ensure that visual indicator 1806 is proximate to or otherwise associated with an object, electronic device 1800 may be configured to initially determine that the rotation of the rotatable input mechanism did not result in the association of the visual indicator 1806 with the second contact (e.g., second object 1810) of the plurality of contacts. Further, electronic device may be configured to determine whether a position of the visual indicator 1806 is in an object transition region in accordance with a determination that the rotation of the rotatable input mechanism did not result in the association of the visual indicator with the second contact of the plurality of contacts. In some embodiments, the object transition region may be a region located after the first object 1808 and before a second object 1810 associated with the second contact.

Figure 18C:
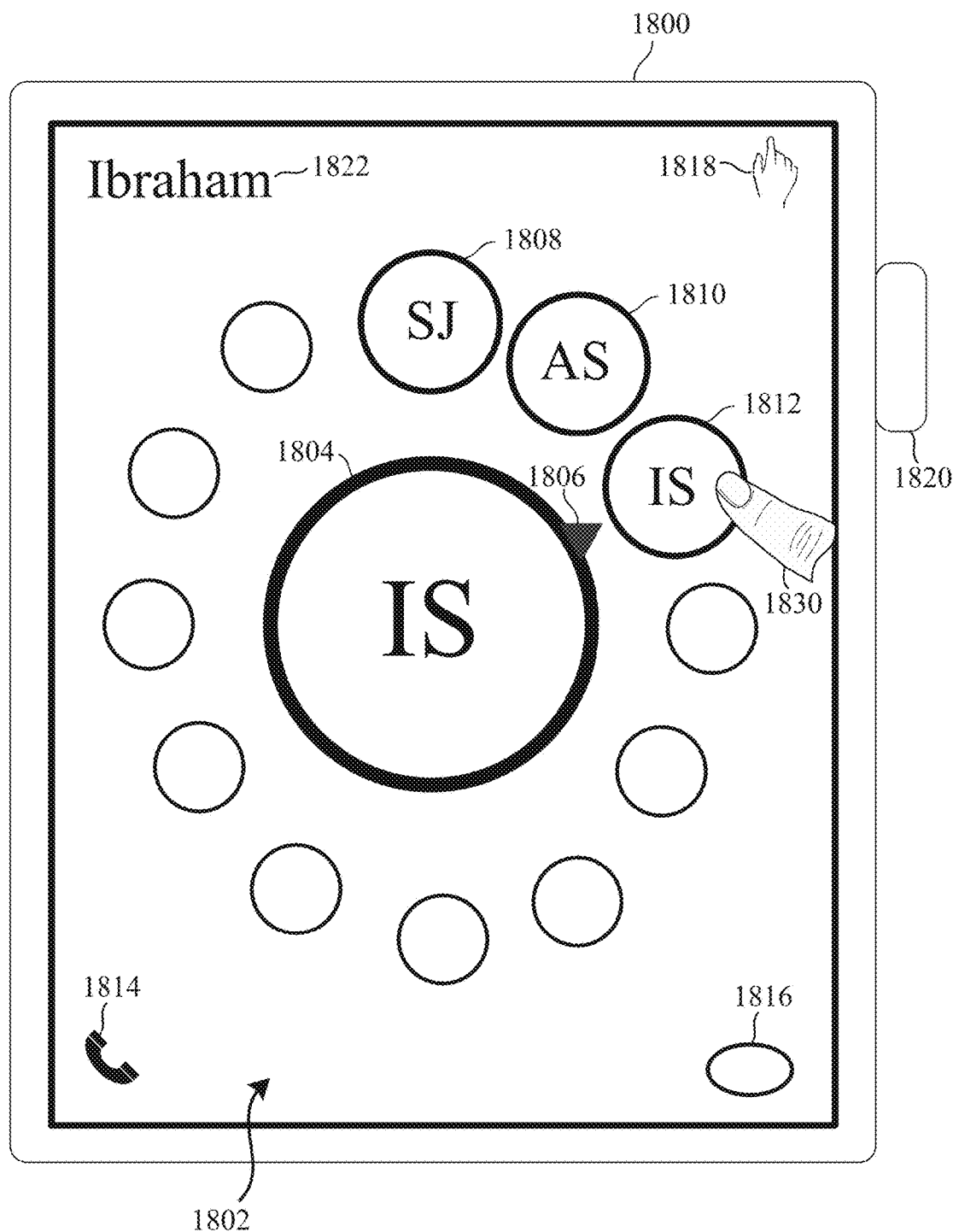
Figure 18D:
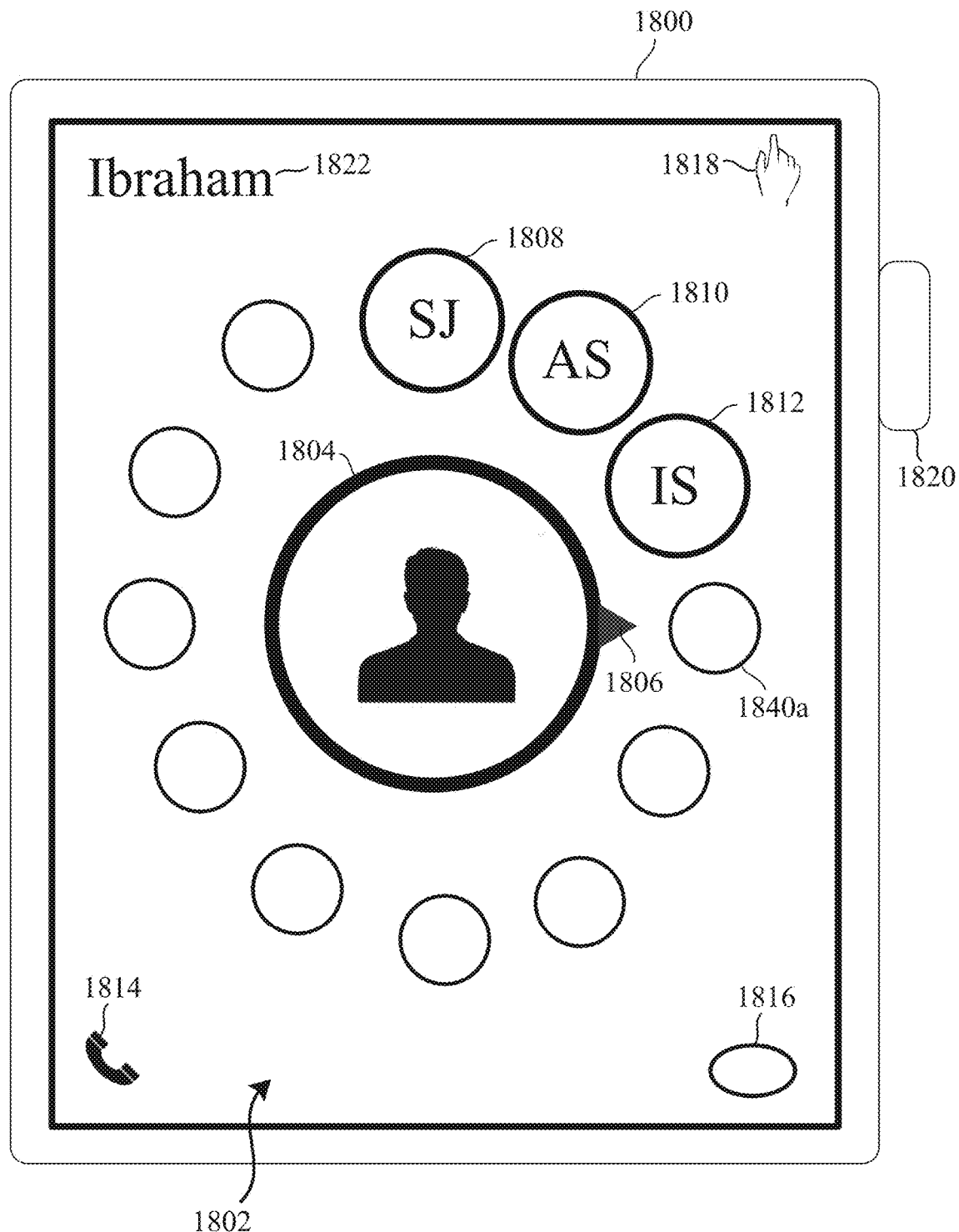

Additionally, electronic device 1800 may be configured to associate the visual indicator 1806 with the second contact of the plurality of contacts in accordance with a determination that the position of the visual indicator 1806 is in the object transition region. Further, electronic device 1800 may be configured to maintain association of the visual indicator 1806 with the first object 1808 of the plurality of objects in accordance with a determination that the position of the visual indicator 1806 is not in the object transition region, In other embodiments, as illustrated in FIG. 18C, electronic device 1800 may be configured to receive a first input corresponding to a contact at a location of an object (e.g., third object 1812) on the touch-sensitive display including the user interface 1802. For example, the input may be representative of a touch/contact via finger 1830 on touch-sensitive display including user interface 1802. Further, electronic device 1800 may be configured to update the visual appearance of the affordance 1804 to represent a second contact (e.g., "IS") among the plurality of contacts in response to receiving the input corresponding to a contact at a location of an object (e.g., third object 1812) on the touch-sensitive display including the user interface 1802.

In some embodiments, each object of the plurality of objects may not be associated with a contact. For example, objects 1840a-1840i, each of which may not be associated with a respective contact, may be displayed differently from objects that are associated with a contact (e.g., first object 1808, second object 1810, and third object 1812), As such, the distinct size, shape, and/or pattern may indicate an available or empty object location.

Further, in some embodiments, each of the plurality of objects may be associated with and/or include a unique color scheme. For instance, first object 1808 may be of a first color, second object 1810 may be of a second color, third object 1812 may be of a third color, and each of objects 1840a-1840i may be another color. In such embodiments, a color of each object may be different from another color. As such, in a non-limiting example, FIG. 18A may include twelve different colors, each color associated with a single object.

In some embodiments, the visual indicator 1806 may be a discrete area in which one or more displayed colors of the affordance 1804 are altered. For example, electronic device 1800 may be configured to alter a color of the visual indicator from a first color based on a color of the first object 1808 of the plurality of objects to a second color based on a color of a second object 1810 of the plurality of objects. In addition, electronic device 1800 may be configured to alter the color of the visual indicator 1806 from the first color associated with the first object 1808 of the plurality of objects to the second color associated with the second contact (e.g., and second object 1810) of the plurality of contacts. Specifically, electronic device 1800 may be configured to blend the first color and the second color as the visual indicator 1806 moves from a first position associated with the first object 1808 to a second position preceding a position of a second object 1810 associated with the contact.

In further embodiments, the visual indicator 1806 may be associated with the first object 1808 of the plurality of objects when the visual indicator 1806 is at a first position that overlaps with at least a portion of the first object 1808 and one or more displayed colors of the first object 1808 are altered. Electronic device 1800 may be configured to display a movement of visual indicator 1806. In particular, electronic device 1800 may be configured to translate the visual indicator 1806 from the first position to a second position that overlaps with at least a portion of the second object 1810 and one or more displayed colors of the second object 1810 are altered.

In some embodiments, electronic device 1800 may be configured to update the visual appearance of the affordance 1804. Additionally, after updating the visual appearance of the affordance, electronic device 1800 may be configured to receive a second input corresponding to selection of a third object 1812 of the plurality of objects, where the third object different than the first object 1808 and the second object 1810. Accordingly, electronic device 1800 may be configured to update the visual appearance of the affordance 1806 to represent a third contact among the plurality of contacts.

Figure 18E:
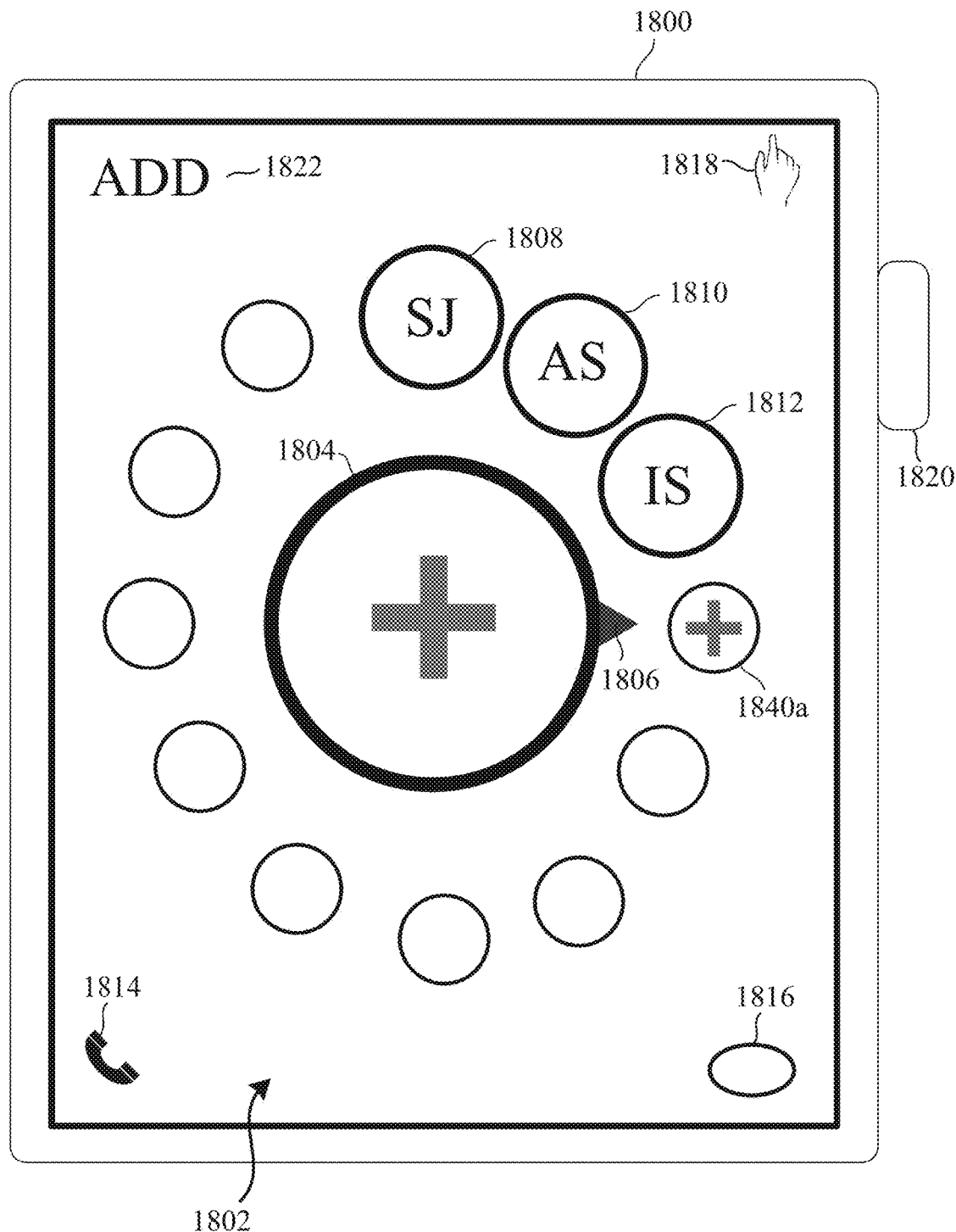
Figure 18F:
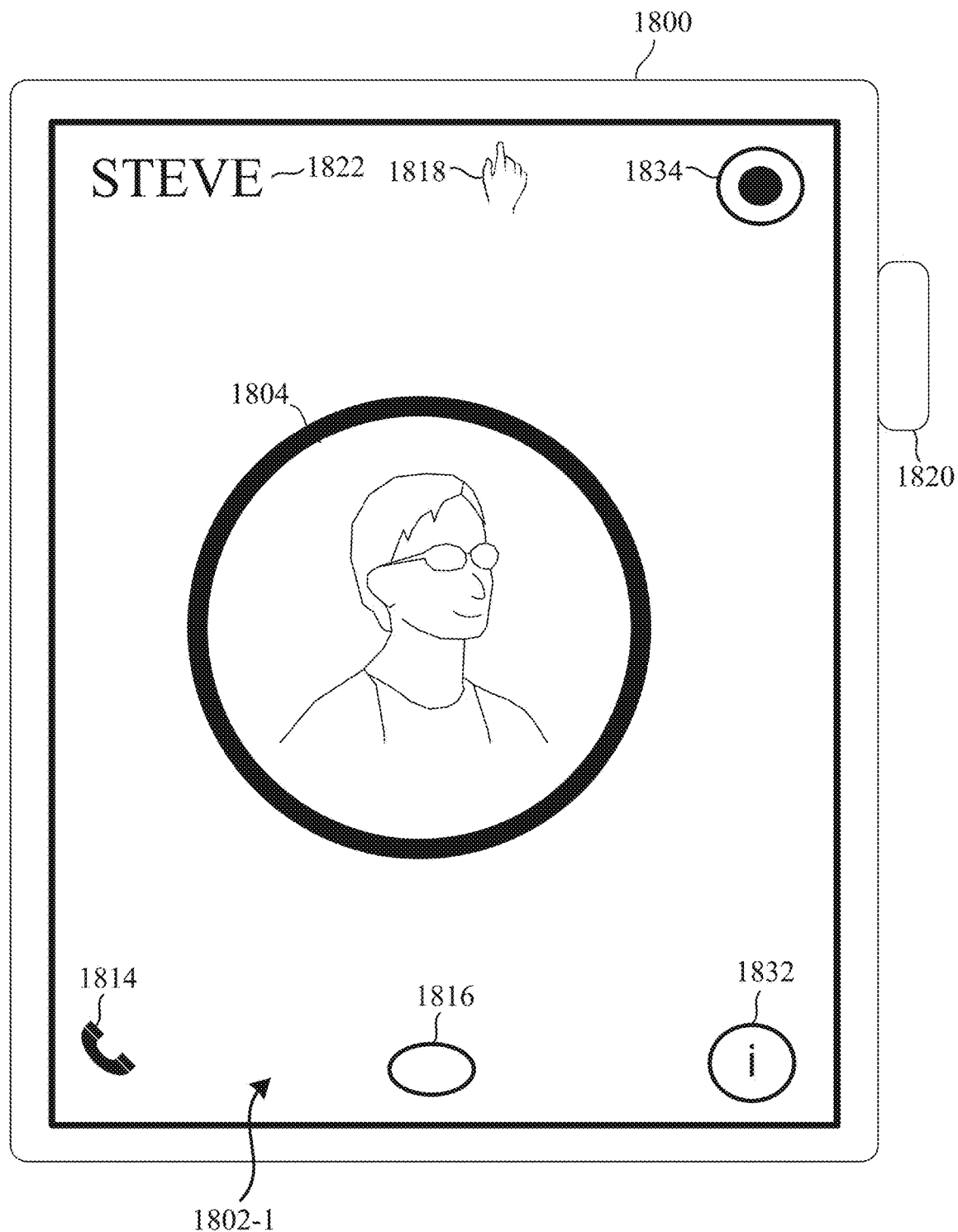

In a further embodiment as shown in FIG. 18F, electronic device 1800 may be configured to display user interface screen 1802-1 for interaction with a selected contact (e.g., Steve as shown in FIG. 18F) represented by, and associated with, affordance 1804. In some embodiments, device 1800 displays contact screen 1802-1 after receiving an appropriate input or meeting a certain condition while displaying one of the interfaces described with respect to FIGS. 18A-18D. For example, electronic device 1800 may enter the contact-specific screen 1802-1 after a pre-determined amount of time has elapsed without further rotation of mechanism 1820. Specifically, electronic device 1800 may be configured to determine that no input has been received for a period of time after updating the visual appearance of the affordance 1804. In some embodiments, electronic device 1800 may cease display of the plurality of objects in response to determining that no input has been received for the period of time. Electronic device may also display one or more second affordances (e.g., affordance 1834) in response to determining that no input has been received for the period of time.

In another embodiment, electronic device may enter the contact-specific screen based on detecting a third input corresponding to a selection of the affordance after updating the visual appearance of the affordance 1806. Accordingly, electronic device 1800 may forgo display of the plurality of objects in response to detecting the third input. Electronic device 1800 may display a second affordance in response to detecting the third input.

In some embodiments, the second affordance within the contact-specific screen (e.g., FIG. 18F may include one or more affordances such as, but not limited to a call affordance 1814, a message affordance 1816, a tutorial affordance 1832, an affordance to restore the user interface comprising a plurality of objects including affordance 1834, and a drawing affordance 1818, each described in further detail below. In some embodiments, affordance 1834 functions as a "back" button to restore a previous screen or a pre-selected screen (e.g., a user interface of FIGS. 18A to 18D). For example, electronic device may detect a selection of tutorial affordance 1832. Specifically, electronic device may detect a fourth input corresponding to a selection of the tutorial affordance 1832. In response to the fourth input, electronic device 1800 may display a user interface including one or more instructions for operating the electronic device (e.g., instructions for how to draw an image or send a touch). In some aspects, tutorial affordance 1832 may disappear after it has been accessed a set number of times. User interface screen 1802-1 provides a user with one or more affordances for contacting the contact represented by affordance 1804 (i.e., the represented contact), while simultaneously reducing cognitive dissonance by omitting or ceasing to display objects not associated with the currently selected contact.

Additionally, in some embodiments, as shown in FIG. 18A, each of the plurality of objects may be associated with and/or positioned according to an hour mark of a clock. In some embodiments, the plurality of objects may include twelve circular objects positioned around the affordance 1804. However, it should be understood that more or less than twelve objects may be positioned on user interface 1802.

User interface 1802 may also include a call/phone affordance 1814. For instance, upon receiving an input representing a contact or selection of the call/phone affordance 1814, electronic device 1800 may enable a call to a contact of the plurality of contacts (e.g., selected contact displayed at center affordance 1804). User interface 1802 may also include a message affordance 1816. For instance, upon receiving an input representing a contact or selection of the message affordance 1816, electronic device 1800 may enable a call to a contact of the plurality of contacts (e.g., selected contact displayed at center affordance 1804).

User interface 1802 may further include an indicator 1824 (FIG. 18A) that provides an indication of one or more unread messages from a contact associated with an object adjacent to the indicator (object 1812). In some embodiments, indicator 1824 may include a number or some other visual indication of a number of unread messages. Accordingly, electronic device 1800 may be configured to determine whether one or more messages received from one of the plurality of contacts is unread and in accordance with a determination that a message received from one of the plurality of contacts is unread, display an indicator 1824 proximate to the object (e.g., third object 1824 in FIG. 18A) of the plurality of objects associated with the one or more messages.

FIG. 18E illustrates an example user interface for adding or otherwise associating a contact to an object. In some embodiments, visual indicator may be positioned in proximity to an empty object 1840a. The empty object 1840a may be an empty circle position that transitions into including a plus icon. Further, affordance 1804 may also include a plus icon indicating a contact addition procedure. Additionally, selection of the affordance 1804 in FIG. 18E may initiate or otherwise trigger a contact selection procedure.

For example, electronic device 1800 may receive an input representing a second rotation of the rotatable input mechanism 1820 and in response, may determine whether the visual indicator 1806 is proximate an object not associated with any contact (e.g., object 1840*a*). Further, electronic device 1800 may update display of the affordance 1804 to an add contact affordance in accordance with a determination that the visual indicator 1806 is proximate the object not associated with any contact. Electronic device 1800 may receive a further input corresponding to a selection of the add contact and in response to receiving the fourteenth input, displaying a user interface for adding a contact.

Figure 18G:
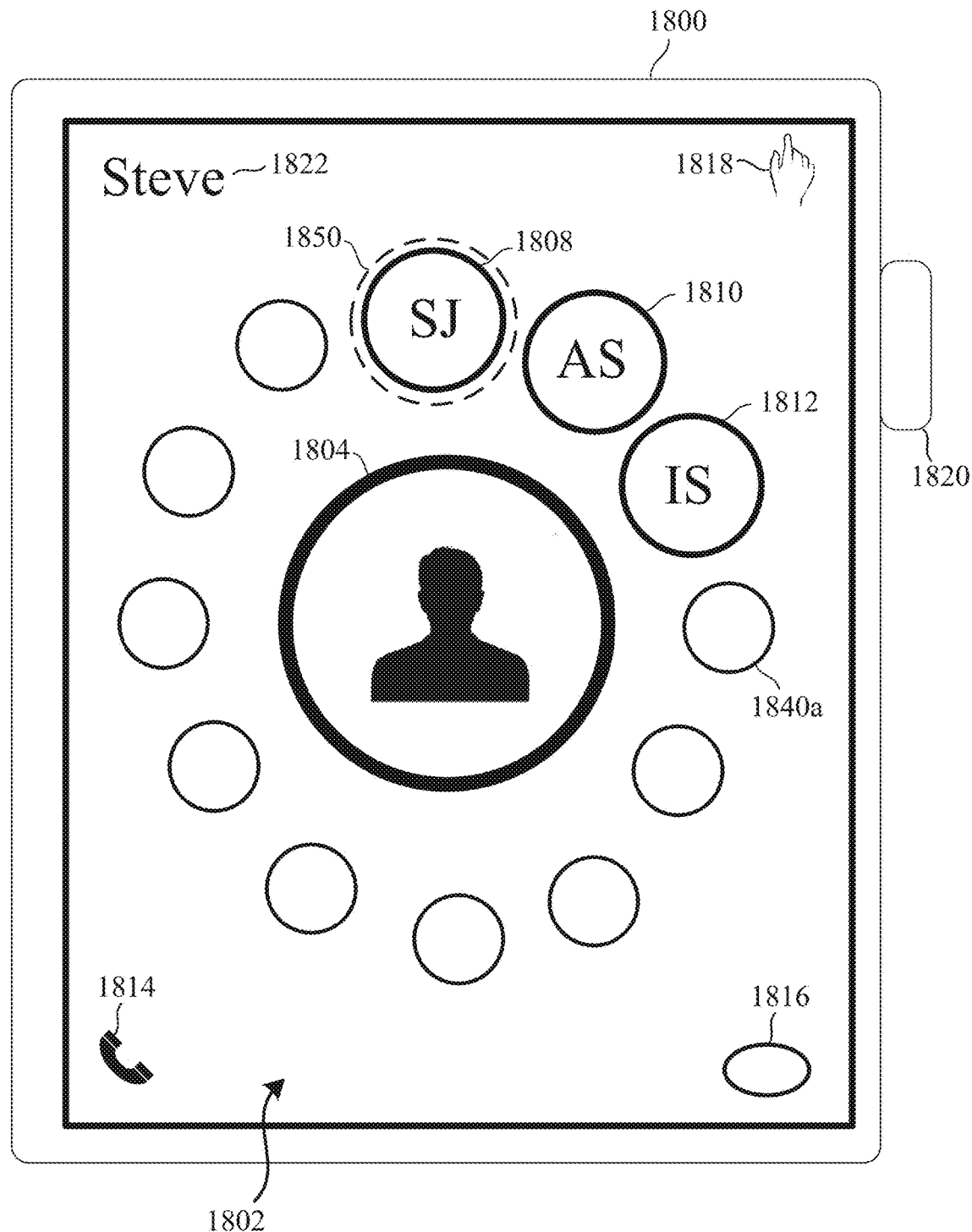
Figure 18H:
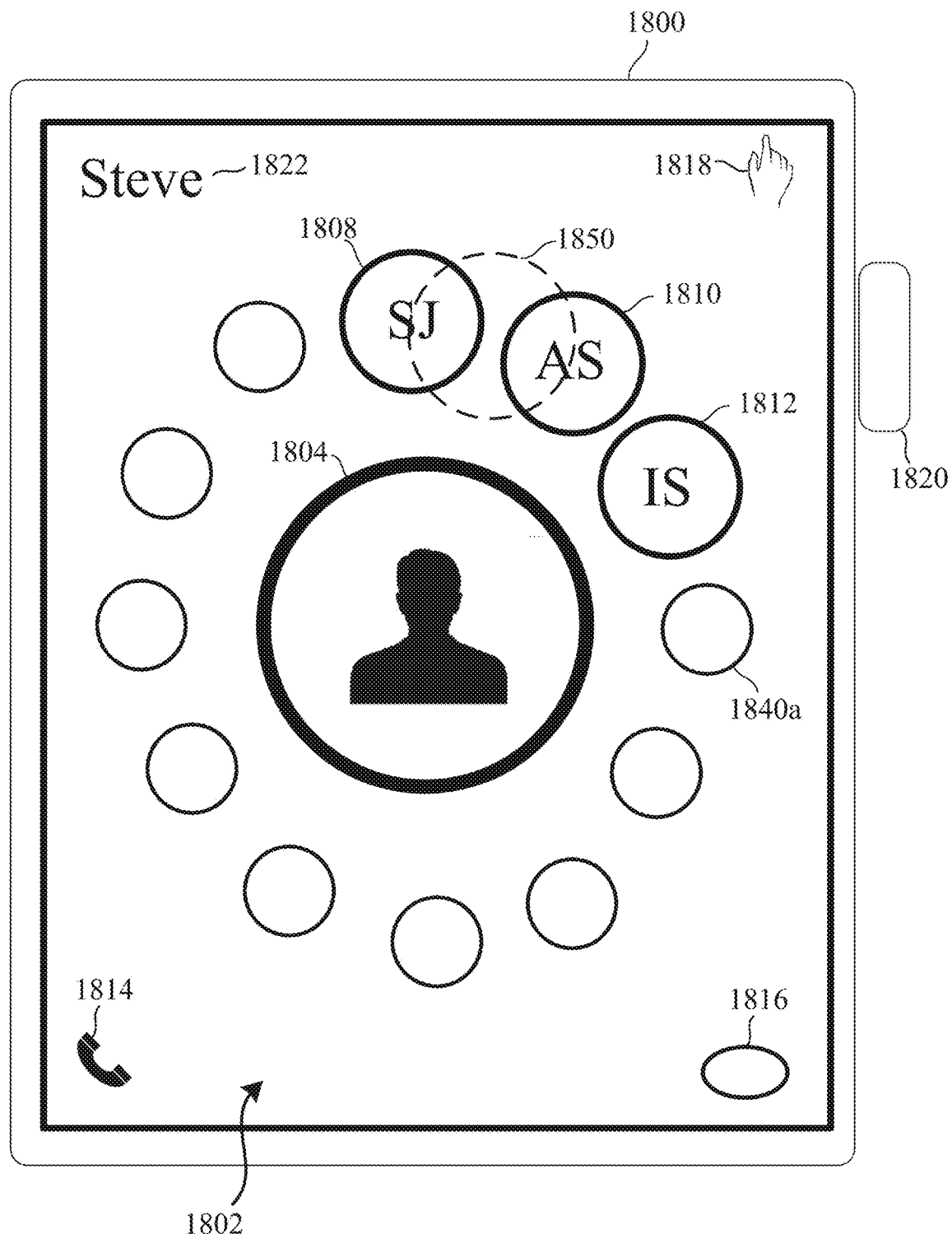
Figure 18I:
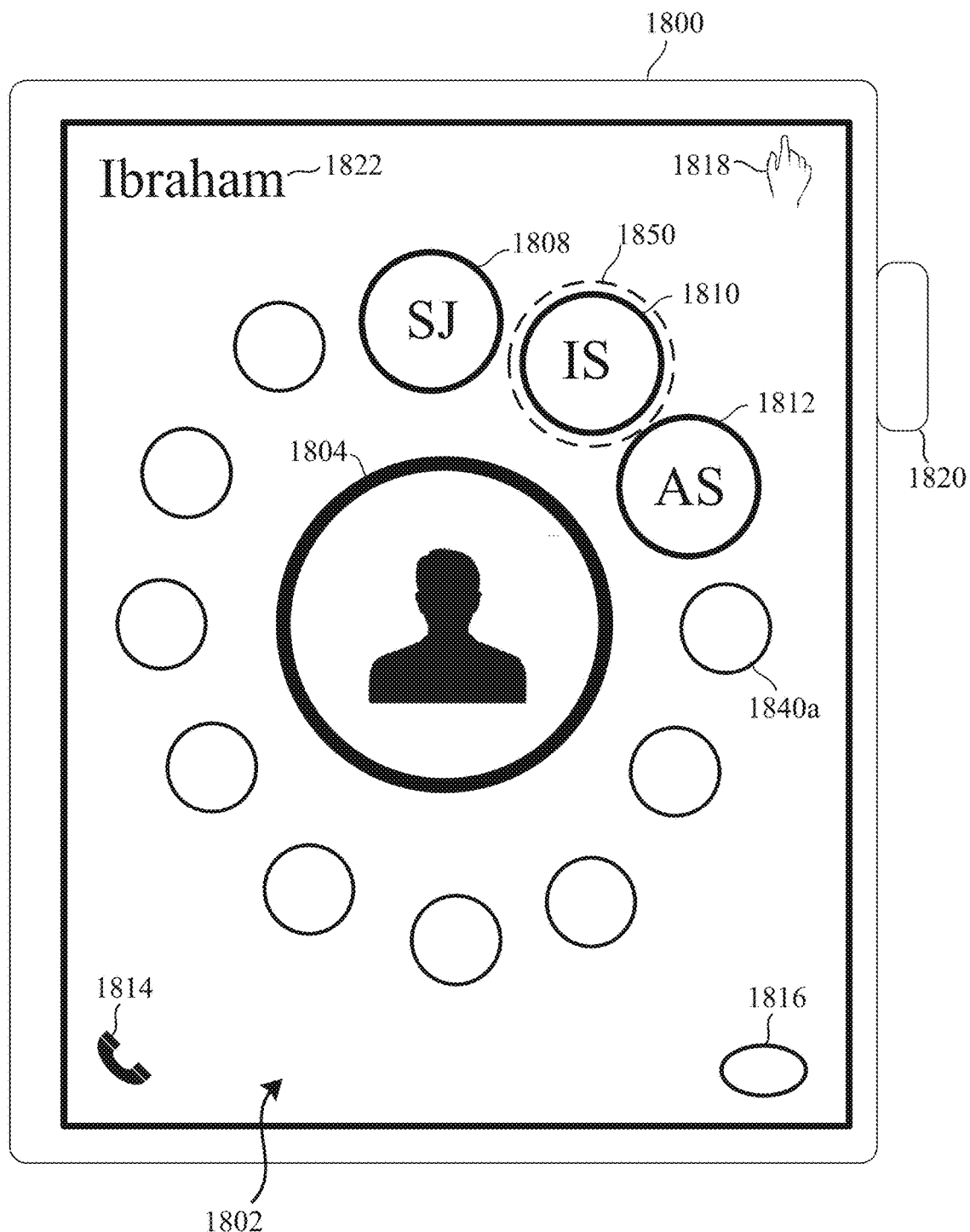

FIGS. 18G-18I illustrate additional exemplary embodiments of a touch-sensitive display including user interface 1802 at electronic device 1800 and having an visual indicator 1850 associated with a first object 1808. As seen in FIG. 18G, first object 1808 is associated with a currently selected contact represented by center affordance 1804. In such embodiments, visual indicator 1850 may provide the user with an indication that the contact associated with object 1808 is currently selected. In FIG. 18G, visual indicator 1850 is depicted as a circle slightly larger than 1808; in other embodiments, however, visual indicator 1850 may be presented differently and still convey to the user a currently selected object.

In some embodiments, visual indicator 1850 may be presented as an object having a shape that is the same size and dimensions as the currently selected object (e.g., object 1808). In some embodiments, the visual indicator is an object presented in the foreground of the user interface, such that it occludes elements of the user interface that are underneath the visual indicator. In other embodiments, the visual indicator is a foreground object that is translucent or transparent, such that underlying elements of the user interface are visible beneath the visual indicator. In such embodiments, the visual indicator may operate as a filter to alter the visual appearance of user interface elements beneath the visual indicator.

In other embodiments, visual indicator may not be separately displayed; rather visual indicator 1805 may be a predefined area in which the appearance (e.g., a change in color, brightness, contrast) of underlying elements of the interface are altered. In some such embodiments, the visual indicator may present a "spotlight" like effect whereby objects falling partially or completely within the current predefined area occupied by visual indicator 1805 have their appearance altered so that their appearance (or at least the portion within the visual indicator area) is emphasized or altered (e.g., a change in color, brightness, or contrast). Note that such an affect may be visually be very similar to the visual indicator operating as a filtering overlay, as described above, though the person of skill would recognize that the similar visual effect is implemented differently. In some embodiments, a spotlight-like visual indicator only alters the appearance of predefined or selected objects that are partially or completely within the area occupied by the visual indicator. For example, the spotlight-like visual indicator may only alter the appearance of the objects (e.g., 1808, 1810, 1812) arrayed in a circle around affordance 1804 without altering the appearance of any portion of the background of user interface 1802 that may be within the area of the visual indicator.

In some embodiments, the appearance of visual indicator 1850 may be a blended color composed of a color of one object and a color of another object as visual indicator 1850 moves between objects. Specifically, the appearance of visual indicator 1850 may be a blended color based on percentage of overlap. For example, a blue color may be associated with first object 1850, while a red color is associated with second object 1810. Accordingly, the color of visual indicator 1850 may be a first percentage of first color and a second percentage of second color, depending on X and Y overlap. As such, as visual indicator 1850 moves between objects, its color may be dynamically updated based on an inverse proportional relationship between a color of a preceding object (e.g., first object 1808) and a color of an adjacent object (e.g., second object 1810). That is, as the visual indicator 1850 moves towards the second object, a color of the second object will weigh more heavily in the color of the visual indicator 1850 than a color of a first object. In other words, as the visual indicator 1850 moves from a first object to a second object, a percentage of color of the first object that forms the color of the visual indicator 1850 will decrease as the visual indicator 1850 moves towards or closer to the second object 1810, and as such, a percentage of color of the second object will increase.

In FIG. 18H, visual indicator 1850 has, in response to input corresponding to rotation of mechanism 1820, has moved to a second position in between object 1808 and object 1810. Visual indicator 1808 now partially overlaps each of objects 1808 and 1810. FIG. 18I shows visual indicator in a third position and now associated with object 1810 and no longer overlapping, or associated with, object 1808. While not depicted, continued rotational input on mechanism 1820 may cause visual indicator to move further along the circle to object 1812 and so on, so that visual indicator may move from object to object along a circuit formed around affordance 1804. To facilitate a user's ability to control the movement of visual indicator 1850 along the circuit (e.g., from objects 1808, 1810, 1812, and so forth), a "magnetic" relationship is associated between each selectable object and the visual indicator 1850. Each element (e.g., 1808, 1810, 1812) is associated with a simulated magnetic value. In this example, the magnetic values of elements 1808, 1810, 1812) are equal. In other examples, the magnetic values may differ, such that visual indicator 1850 may have more magnetic affinity for one object versus another.

Using the magnetic relationship between the objects and visual indicator 1850, physics-based modeling can be used to simulate magnetic attraction between the objects and the visual indicator. As a result, when user input is not received while visual indicator 1850 is not aligned with any object (e.g., the second position depicted in 18H), visual indicator 1850 ultimately reaches a steady state where it is aligned with one of the objects (e.g., 1808, 1810, 1812, and so forth). visual indicator 1850 is considered to be in a steady state when the visual indicator is not being translated or moved due to rotation of mechanism 1820. This physics-based magnetic modeling results in the user interface exhibiting virtual detents that assist the user in selecting an object using visual indicator 1850, without the need for precise positioning, or re-positioning of the visual indicator. Furthermore, this behavior limits instances in which two objects are simultaneously indicated by visual indicator 1850 (e.g., FIG. 18H), which reduces cognitive dissonance.

In this example, physics-based magnetic modeling is achieved, for example, by modeling each object (e.g., 1808, 1810, 1812, and so forth) as an object made from a magnetized material that creates its own persistent magnetic field and modeling visual indicator 1850 as a material that is attracted to a magnet, such as ferromagnetic materials including iron, cobalt, and nickel. In another example, the physics-based modeling can be achieved by modeling each object as an object made from a material that is attracted to a magnet and modeling visual indicator 1850 as a material that creates its own persistent magnetic field. In another example, the physics-based modeling can be achieved by modeling each object as an object that creates its own persistent magnetic field and modeling visual indicator 1850 as a material that also creates its own persistent magnetic field, such as two magnets that attract. Each of these physics-based models can be adapted to include magnetic fields that vary, rather than remain persistent, based on certain factors, such as the distance between a given object and visual indicator 1850, the speed of visual indicator 1850, the acceleration of visual indicator 1850, or based on a combination of two or more factors. For example, the varying magnetic field may be simulated through the use of an electromagnet which can be turned on and off and can have a varying strength. In some embodiments, the magnetic modelling is a model described in U.S. Non-provisional patent application Ser. No. 14/476,657, filed Sep. 3, 2014, entitled "USER INTERFACE FOR MANIPULATING USER INTERFACE OBJECTS WITH MAGNETIC PROPERTIES" or PCT Patent Application Serial No. PCT/US2014/053961, filed Sep. 3, 2014, entitled "USER INTERFACE FOR MANIPULATING USER INTERFACE OBJECTS WITH MAGNETIC PROPERTIES", both of which are hereby incorporated by reference for at least their disclosures of magnetic models of motion.

With reference again to FIGS. 18H and 18I, in some embodiments, device 1800 may snap the visual indicator 1850 to a nearest object (in this case, object 1810) if the rotation of mechanism 1820 would result in translation of visual indicator 1850 to a position such as shown in FIG. 18H. As shown in FIG. 18I, rather than permitting visual indicator 1850 to remain in a steady state between objects 1808 and 1810, device 1800 determines the object having the most magnetic influence on visual indicator 1850 (e.g., the closest object if objects 1808 and 1810 have the same magnetic value) and "snaps" the visual indicator to that object. As shown in 18I, the determination results in snapping the visual indicator to object 1810.

In some embodiments, motion of visual indicator from object to object visual along a circuit formed around affordance 1804 is modeled as a series or range of potential positions that the visual indicator may occupy. Objects (e.g., 1808, 1810, 1812, and so forth) may be associated with particular positions along the series or range of potential positions. In response to rotation of mechanism 1820, device 1800 may determine if the input would result in translation of the visual indicator to a position within the series or range that is not associated with any object (e.g., the position of visual indicator 1850 in FIG. 18H). If so, device 1800 may update the position of the visual indicator to the nearest position that is associated with an object (object 1810 in FIG. 18H) and subsequently display the visual indicator at that updated position. In some embodiments, modelling motion of the visual indicator according to a model based on a series or range of positions is done according to a model described in U.S. Non-provisional patent application Ser. No. 14/476,657, filed Sep. 3, 2014, entitled "USER INTERFACE FOR MANIPULATING USER INTERFACE OBJECTS WITH MAGNETIC PROPERTIES" or PCT Patent Application Serial No. PCT/US2014/053961, filed Sep. 3, 2014, entitled "USER INTERFACE FOR MANIPULATING USER INTERFACE OBJECTS WITH MAGNETIC PROPERTIES", both of which are hereby incorporated by reference for at least their disclosures of modelling based on a range or series of positions (e.g., as depicted and described with respect to FIGS. 6A to 9B of each application).

In some embodiments, such as the embodiment of FIGS. 18G-18I, a visual indicator is displayed in a first position associated with a first object (object 1808) of a plurality of objects. In response to receiving a first input corresponding to the rotation of the rotatable input mechanism, device 1800 ceases to associate the visual indicator with the first object of the plurality of objects, and associates the visual indicator with an object (object 1810) of the plurality of objects that is associated with a second contact of the plurality of contacts.

In some embodiments, such as the embodiment of FIGS. 18G-18I, device 1800 displays, as part of the user interface, a visual indicator (visual indicator 1850) in accordance with a position value, the value being within a range of position values, each of the objects plurality of objects (e.g., 1808, 1810, 1812, and so forth) associated with a position within the range of position values. Further in response to the first input (rotation of mechanism 1820), device 1800 determines whether the first input is a request to update the position value of the visual indicator to a second position value that is not associated with an object of the plurality of objects or not associated with a single object of the plurality of objects. In accordance with a determination that the first input is a request to update the position value of the visual indicator to a second position value that is not associated with an object of the plurality of objects or not associated with a single object of the plurality of objects, device 1800 updates the position value of the visual indicator to a third position value that corresponds to the position value of the object of the plurality of objects that is nearest to the second position value within the range of position values, and also updates display of the visual indicator in accordance with the third position value.

In some embodiments, such as the embodiment of FIGS. 18G-18I, a visual indicator is displayed in a first position associated with a first object (object 1808) of a plurality of objects. In response to receiving a first input corresponding to the rotation of the rotatable input mechanism, device 1800 ceases to associate the visual indicator with the first object of the plurality of objects, and associates the visual indicator with the second contact of the plurality of contacts by: determining that the rotation of the rotatable input mechanism did not result in the association of the visual indicator with the second contact of the plurality of contacts. In accordance with a determination that the rotation of the rotatable input mechanism did not result in the association of the visual indicator with the second contact of the plurality of contacts, device 1800 determines whether a position of the visual indicator is in an object transition region, wherein the object transition region is a region located after the first object and before a second object associated with the second contact. In accordance with a determination that the position of the visual indicator is in the object transition region, device 1800 associates the visual indicator with the second contact of the plurality of contacts; and, in accordance with a determination that the position of the visual indicator is not in the object transition region, device 1800 maintains association of the visual indicator with the first object of the plurality of objects.

Figure 18J:
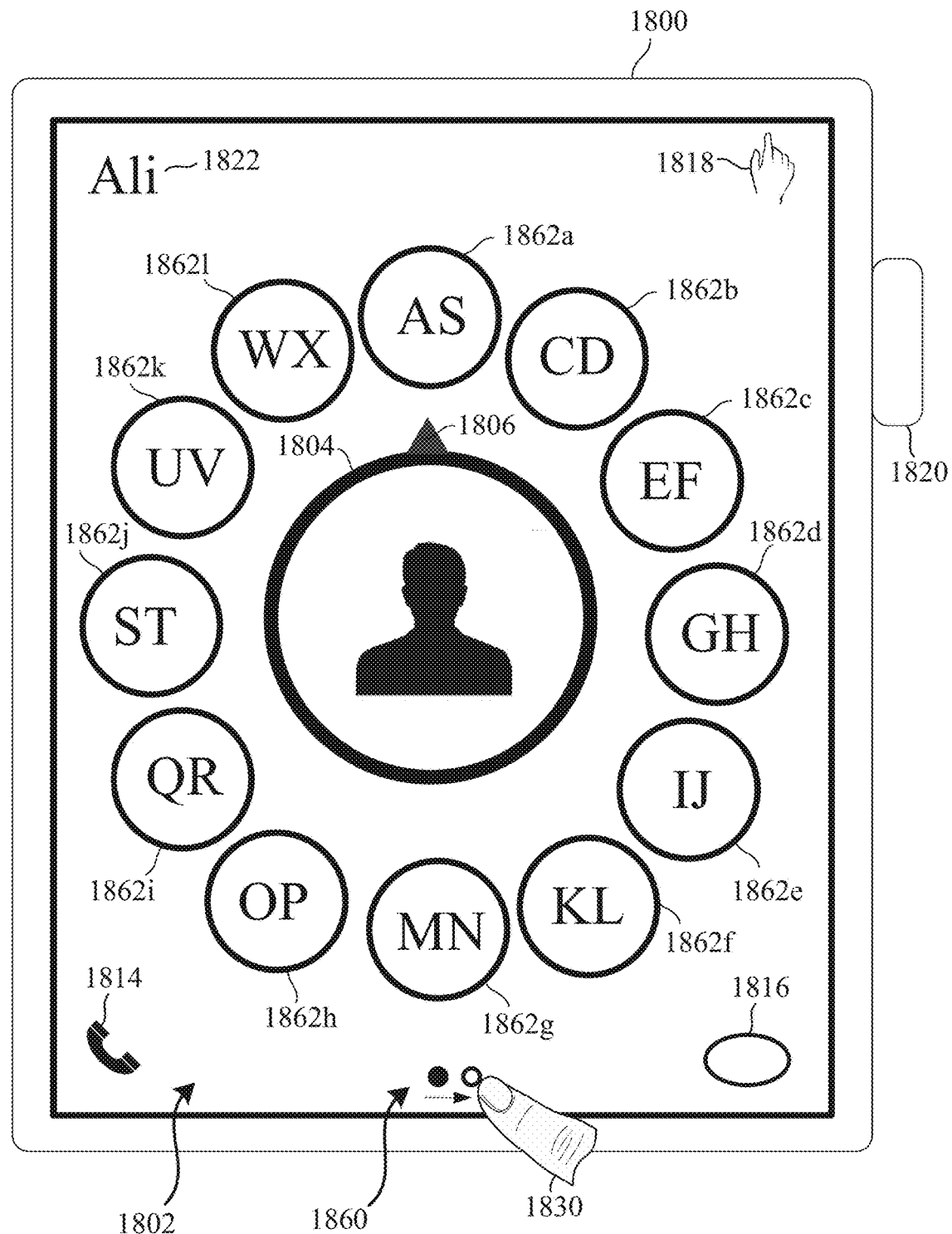
Figure 18K:
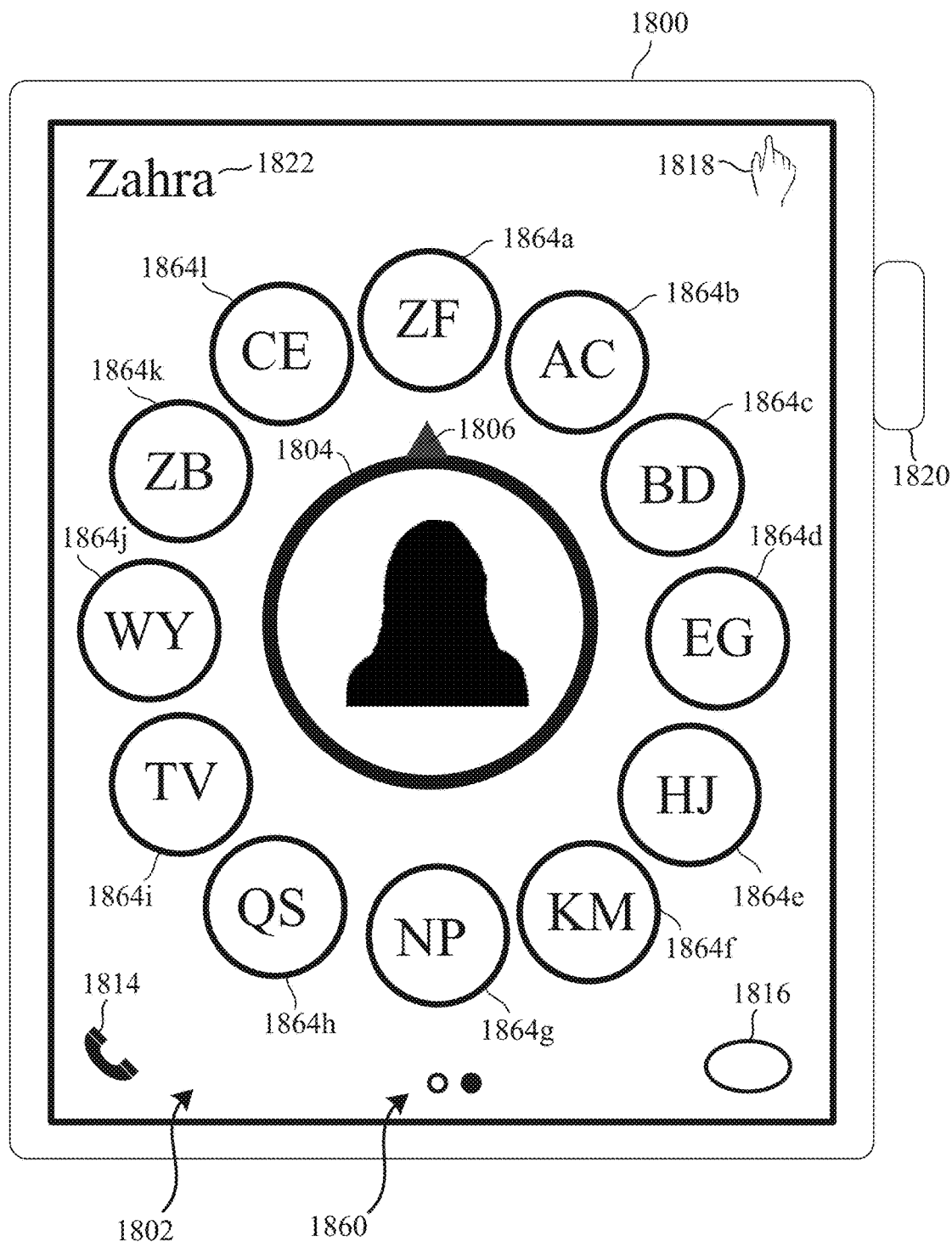

FIGS. 18J-18K illustrate embodiments of a touch-sensitive display including user interface 1802 at electronic device 1800 and having an page indicator 1860. Specifically, electronic device 1800 is configured to display, on user interface 1802, one or more additional pages and/or user interfaces of one or more objects (e.g., contacts) based on a determination by the electronic device 1800 that a number of objects meets or exceeds an object display limit/threshold. That is, in some embodiments, electronic device 1800 enables a user to select and have displayed any number of objects (e.g., contacts) on additional (e.g., two or more) pages or user interfaces in a similar manner as described herein with respect to FIGS. 18A-18I.

For example, at FIG. 18J, electronic device 1800 may display a first set of one or more objects 1862. Additionally, electronic device 1800 displays, on touch-sensitive display 1802, a page indicator 1860 that indicates a page or user interface at which the objects are displayed. As shown in FIG. 18J, page indicator 1860 may be at first position indicating a first page. For instance, as shown in FIG. 18J, first user interface includes the first set of one or more objects. While displaying the first user interface (e.g., first page), electronic device 1800 may be configured to receive an input corresponding to a request to display the second page. The input may be a swipe gesture detected by user finger 1830 and detected by touch-sensitive display 1802.

Electronic device 1800 may be configured to replace display of the first user interface with a second user interface (e.g., second page) in response to receiving the input, as shown in FIG. 18J. Electronic device 1800 may display, at second user interface, page indicator 1860 at a second position different from the first position. In some embodiments, the second page may be distinct from the first page such that the second page includes a second set of one or more objects (e.g., contacts) each associated with a contact of the plurality of contacts. In some embodiments, the objects (e.g., contacts) of set of one more objects on a page may each be associated with a group. In some embodiments, the groups are different, as between pages. For example, a first page may have contacts each identified (e.g., by the user or based on data associated with the contact) as a family member of the user of electronic device 1800; a second page may have contacts each identified (e.g., by the user or based on data associated with the contact) as a co-worker of the user of the electronic device 1800.

In some embodiments, providing the user with multiple pages and/or groups of one or more objects (e.g., contacts) may permit rapid access to communications with contacts of the user, thereby reducing the cognitive burden on a user and producing a more efficient human-machine interface by reducing the number of unnecessary, extraneous, repetitive, and/or redundant inputs, and may create a faster and more efficient user interface arrangement, which may reduce the number of required inputs, reduce processing power, and reduce the amount of time for which user interfaces need to be displayed in order for desired functions to be accessed and carried out.

FIG. 19A-19B illustrate an example user interface for displaying a life-like representation of a contact. For example, electronic device may include a touch-sensitive display 1900 including user interface 1910. Additionally, electronic device may display, on touch-sensitive display 1910, a life-like representation of contact 1920. User interface 1910 may also display a status 1930 of the contact 1920, which may include a current state and location. In one embodiment, contact 1920 may be available and located in London. In another embodiment, and at another point in time, a status 1930 of the contact 1920 may be updated to reflect a location of Manchester and a current state of sleeping.

In some embodiments, the visual appearance of the affordance (e.g., affordance 1804) may be an animated representation of the first contact when the affordance represents the first contact. In some embodiments, updating the visual appearance of the affordance (e.g., affordance 1804) to represent a second contact among the plurality of contacts may include updating the visual appearance of the affordance to an animated representation of the second contact, as shown in FIGS. 19A-19B. Further, the animated representation of the first contact may be dynamic and based on one or more of time zone information of the second contact, location information of the second contact, information regarding a state designated by the second contact (e.g., do not disturb).

Figure 20:
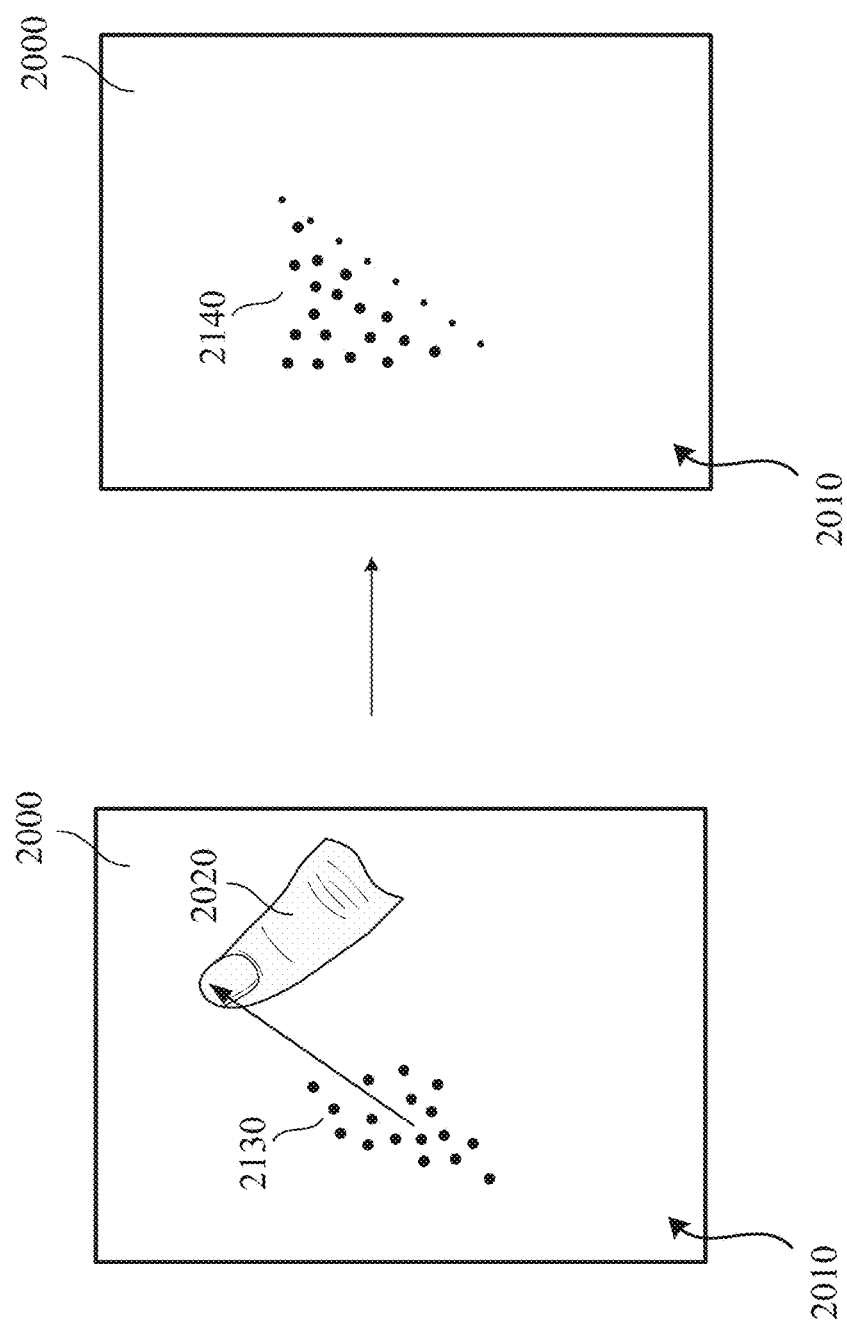
FIG. 20 illustrates exemplary user interfaces for electronic communication.

FIG. 20 illustrates an example user interface 2000 for enabling a drawing within a drawing area. In some embodiments, electronic device 1800 (FIG. 18A) may receive an input corresponding to a selection of drawing affordance 1818. Specifically, electronic device 1800 (FIG. 18A) may detect a fifth input corresponding to a selection of the drawing affordance 1818 and may display a drawing area 2010. The drawing area is responsive to touch input. In further embodiments, electronic device 1800 may detect a sixth input corresponding to a first stroke in the drawing area 2010 and in response, display a visual representation, in the drawing area, of the first stroke. In some embodiments, user interface 2000 is, or operates in a manner similar to, drawing area 630 or drawing area 710.

In some embodiments, electronic device 1800 (FIG. 18) may display an animated dissipation of residue 2130 along a stroke. In some embodiments, the animated dissipation of residue is a comet-like effect that is displayed at a trailing end of a location on the display representing a user contact 2020. Hence, as a user contacts the touch-sensitive display and moves their finger while maintaining contact, the comet-like effect will form and be displayed at a most recent contact location. Additionally, electronic device 1800 (FIG. 18) may display a fading out in smoke-form 21401 of the visual representation of the stroke from the drawing area. In some embodiments, fading out the visual representation includes displaying a gradual dispersion animation of the stroke (e.g., a smoke-like effect of the fading drawing strokes).

Figure 21:
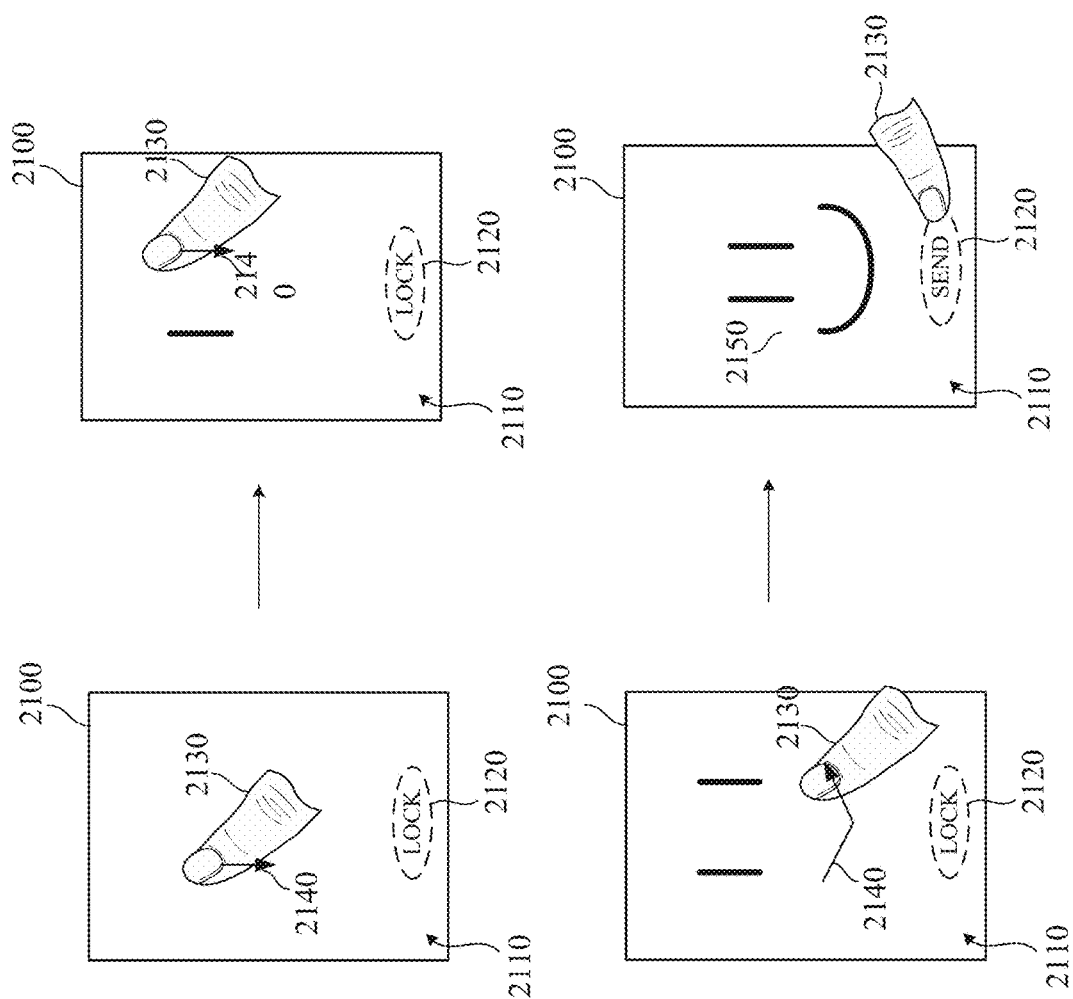
FIG. 21 illustrates exemplary user interfaces for electronic communication.

FIG. 21 illustrates example user interfaces 2100 having a lock affordance 2120 transition into a send affordance 2120 based on a user desiring to send the drawing to an external device. Specifically, the drawing area 2110 may include a drawing lock affordance 2120 that permits only a drawing in the drawing area 2110. Further, an input corresponding to a selection of the drawing lock affordance may be received resulting in a disabling of the sending of data representing any strokes in the drawing area 2110. Additionally, the drawing lock affordance 2120 may be replaced with a send affordance 2120 that permits a transmission of the drawing to an external device.

In some embodiments, a user may also shake electronic device 1800 to remove a most recent stroke in the drawing area. For example, electronic device 1800 may receive an input corresponding to a stroke in the drawing area. Further, electronic device 1800 may display a visual representation, in the drawing area, of the stroke in response to receiving the input. Electronic device 1800 may then detect a motion indicative of a shake or vibration, and in response, may determine if the motion of the electronic device meets a motion threshold. As such, electronic device 1800 may cease to display the visual representation of the stroke in response to detecting the input indicative of a shaking motion and in accordance with a determination that the motion meets or exceeds the motion threshold.

In some embodiments, electronic device 1800 may be configured to detect or otherwise determine whether another device with which a user desires to communicate is capable of engaging in a drawing procedure. As such, the drawing affordance 181 may not be provided if the contact does not have a device capable of processing and displaying data representing strokes in a drawing.

In additional embodiments, electronic device 1800 may be configured to record and send short audio messages based on a long press on the touch-sensitive display while, for example, in the contact-specific screen. Specifically, electronic device 1800 may be configured to detect another input representing a contact on the touch-sensitive display. Electronic device 1800 may be configured to determine that a duration of the twelfth input meets or exceeds a contact duration threshold. Accordingly, electronic device 1800 in accordance with a determination that the duration of the twelfth input meets or exceeds a contact duration threshold, recording an audio message. Additionally, electronic device 1800 send the audio message to an electronic device associated with the second contact.

FIG. 22 is a flow diagram illustrating a method 2200 of updating a visual appearance of an affordance, in accordance with some embodiments. Method 2200 may be performed at a device (e.g., 100, 300, 500, 550, and 1800) with a touch-sensitive display and a rotatable input mechanism Some operations in method 2200 may be combined, the order of some operations may be changed, and some operations may be omitted.

In some embodiments, a rotatable input mechanism (e.g., rotatable input mechanism 506) may be configured to receive user input. In some embodiments, method 2200 may be performed at an electronic device with a touch-sensitive surface/display (e.g., 112, 355, and 504). Example devices that may perform method 2200 include devices 100, 300, 500, 550, 1800 (FIGS. 1A, 3, 5A, and 18A-18I).

As described below, method 2200 provides an intuitive way for interacting with an electronic device by updating a visual appearance of an affordance. The method reduces the physical and/or cognitive burden on a user who may engage the rotatable input mechanism during various activities, thereby creating a more efficient human-machine interface.

At block 2202, method 2200 may display, on the touch-sensitive display, a user interface comprising a plurality of objects each associated with a contact of a plurality of contacts and an affordance having a visual appearance representing a first contact of the plurality of contacts. At block 2204, method 2200 may receive a first input corresponding to a rotation of the rotatable input mechanism. At block 2206, method 2200 may in response to receiving the input corresponding to the rotation of the rotatable input mechanism, update the visual appearance of the affordance to represent a second contact among the plurality of contacts.

In accordance with some embodiments, the user interface further comprises a visual indicator associated with a first object of the plurality of objects, the first object associated with the first contact of the plurality of contacts.

In accordance with some embodiments, further in response to receiving the first input corresponding to the rotation of the rotatable input mechanism: ceasing to associate the visual indicator with the first object of the plurality of objects, and associating the visual indicator with an object of the plurality of objects that is associated with the second contact of the plurality of contacts.

In accordance with some embodiments, displaying, as part of the user interface, a visual indicator in accordance with a position value, the value being within a range of position values, each of the objects plurality of objects associated with a position within the range of position values; further in response to the first input, determining whether the first input is a request to update the position value of the visual indicator to a second position value that is not associated with an object of the plurality of objects; in accordance with a determination that the first input is a request to update the position value of the visual indicator to a second position value that is not associated with an object of the plurality of objects: updating the position value of the visual indicator to a third position value that corresponds to the position value of the object of the plurality of objects that is nearest to the second position value within the range of position values; and updating display of the visual indicator in accordance with the third position value.

In accordance with some embodiments, wherein ceasing to associate the visual indicator with the first object of the plurality of objects, and associating the visual indicator with the second contact of the plurality of contacts comprises: determining that the rotation of the rotatable input mechanism did not result in the association of the visual indicator with the second contact of the plurality of contacts; in accordance with a determination that the rotation of the rotatable input mechanism did not result in the association of the visual indicator with the second contact of the plurality of contacts, determining whether a position of the visual indicator is in an object transition region, wherein the object transition region is a region located after the first object and before a second object associated with the second contact; in accordance with a determination that the position of the visual indicator is in the object transition region, associating the visual indicator with the second contact of the plurality of contacts; in accordance with a determination that the position of the visual indicator is not in the object transition region, maintaining association of the visual indicator with the first object of the plurality of objects.

In accordance with some embodiments, the visual indicator is a discrete area in which one or more displayed colors of the affordance are altered, the method further comprising: further in response to receiving the first input corresponding to the rotation of the rotatable input mechanism: altering a color of the visual indicator from a first color based on a color of the first object of the plurality of objects to a second color based on a color of a second object of the plurality of objects.

In accordance with some embodiments, altering the color of the visual indicator from the first color associated with the first object of the plurality of objects to the second color associated with the second contact of the plurality of contacts comprises blending the first color and the second color as the visual indicator moves from a first position associated with the first object to a second position preceding a position of a second object associated with the contact.

In accordance with some embodiments, the visual indicator is associated with the first object of the plurality of objects when the visual indicator is at a first position that overlaps with at least a portion of the first object and one or more displayed colors of the first object are altered.

In accordance with some embodiments, ceasing to associate the visual indicator with the first object of the plurality of objects, and associating the visual indicator with the second contact of the plurality of contacts comprises translating the visual indicator from the first position to a second position that overlaps with at least a portion of the second object and one or more displayed colors of the second object are altered.

In accordance with some embodiments, the visual appearance of the affordance is an animated representation of the first contact when the affordance represents the first contact and wherein updating the visual appearance of the affordance to represent a second contact among the plurality of contacts comprises updating the visual appearance of the affordance to an animated representation of the second contact.

In accordance with some embodiments, the animated representation of the first contact is dynamically based on information selected from the group consisting of time zone information of the second contact, location information of the second contact, information regarding a state designated by the second contact, and a combination thereof.

In accordance with some embodiments, the method further comprising: after updating the visual appearance of the affordance, receiving a second input corresponding to selection of a third object of the plurality of objects, the third object different than the first object and the second object, in response to receiving the second input, updating the visual appearance of the affordance to represent a third contact among the plurality of contacts.

In accordance with some embodiments, after updating the visual appearance of the affordance, determining that no input has been received for a period of time; and in response to determining that no input has been received for the period of time, forgoing display of the plurality of objects.

In accordance with some embodiments, after updating the visual appearance of the affordance, detecting a third input corresponding to a selection of the affordance; and in response to detecting the third input, forgoing display of the plurality of objects.

In accordance with some embodiments, further in response to determining that no input has been received for the period of time, displaying a second affordance.

In accordance with some embodiments, further in response to detecting the third input, displaying a second affordance.

In accordance with some embodiments, the second affordance comprises one or more affordances selected from the group consisting of a call affordance, a message affordance, a tutorial affordance, an affordance (e.g., affordance 1834 of FIG. 18F) to restore the user interface comprising a plurality of objects, and a drawing affordance.

In accordance with some embodiments, the second affordance is a tutorial affordance, the method further comprising: detecting a fourth input corresponding to a selection of the tutorial affordance; and in response to detecting the fourth input, displaying a user interface comprising one or more instructions for operating the electronic device.

In accordance with some embodiments, the second affordance comprises a drawing affordance, the method further comprising: detecting a fifth input corresponding to a selection of the drawing affordance; and in response to detecting the fifth input, displaying a drawing area, wherein the drawing area is responsive to touch input.

In accordance with some embodiments, detecting a sixth input corresponding to a first stroke in the drawing area; and in response to detecting the sixth input, displaying a visual representation, in the drawing area, of the first stroke.

In accordance with some embodiments, further in response to detecting the sixth input, determining whether a first predetermined duration of time has passed after the sixth input; in accordance with a determination that the first predetermined duration of time has passed after the sixth input, sending data representing the first stroke to an external device associated with the second contact.

In accordance with some embodiments, the sixth input corresponds to two or more strokes including the first stroke forming a drawing, the method further comprising: further in response to detecting the sixth input, determining whether a first predetermined duration of time has passed after the sixth input; in accordance with a determination that the first predetermined duration of time has passed after the sixth input, sending data representing the drawing to an external device associated with the second contact.

In accordance with some embodiments, the drawing area includes a drawing lock affordance that permits only a drawing in the drawing area, the method further comprising: detecting a seventh input corresponding to a selection of the drawing lock affordance; in response to detecting the seventh input, disabling sending of data representing any strokes in the drawing area; and replacing the drawing lock affordance with a send affordance that permits a transmission of the drawing to an external device.

In accordance with some embodiments, detecting an eighth input corresponding to a selection of the send affordance; and in response to detecting the eighth input, enabling sending of data representing any strokes in the drawing area.

In accordance with some embodiments, the electronic device comprises one or more motion sensors, the method further comprising: receiving an ninth input corresponding to a stroke in the drawing area; in response to receiving the ninth input, displaying a visual representation, in the drawing area, of the stroke; detecting a tenth input corresponding to motion of the electronic device; in response to detecting the tenth input, determining if the motion of the electronic device meets a motion threshold, and in response to detecting the tenth input and in accordance with a determination that the motion meets or exceeds the motion threshold, ceasing to display the visual representation of the stroke.

In accordance with some embodiments, ceasing to display the visual representation of the stroke comprises fading out the visual representation of the first stroke after a predetermined duration of time.

In accordance with some embodiments, receiving an eleventh input representing a stroke in the drawing area; while receiving the eleventh input, displaying an animated dissipation of residue along the stroke; displaying a visual representation, in the drawing area, of the stroke; and fading out the visual representation of the stroke from the drawing area, wherein fading out the visual representation includes displaying a gradual dispersion animation of the stroke.

In accordance with some embodiments, further in response to determining that no input has been received for the period of time, determining whether the contact currently represented by the affordance is associated with a device capable of processing and displaying data representing strokes in a drawing; in accordance with a determination that the contact currently represented by the affordance is associated with a device capable of processing and displaying data representing strokes in a drawing, displaying a drawing affordance; in accordance with a determination that contact currently represented by the affordance is not associated with a device capable of processing and displaying data representing strokes in a drawing, forgoing display of the drawing affordance.

In accordance with some embodiments, further in response to the third input, determining whether the contact currently represented by the affordance is associated with a device capable of processing and displaying data representing strokes in a drawing; in accordance with a determination that the contact currently represented by the affordance is associated with a device capable of processing and displaying data representing strokes in a drawing, displaying a drawing affordance; in accordance with a determination that contact currently represented by the affordance is not associated with a device capable of processing and displaying data representing strokes in a drawing, forgoing display of the drawing affordance.

In accordance with some embodiments, detecting a twelfth input representing a contact on the touch-sensitive display; determining that a duration of the twelfth input meets or exceeds a contact duration threshold; in accordance with a determination that the duration of the twelfth input meets or exceeds a contact duration threshold, recording an audio message; and sending the audio message to an electronic device associated with the second contact.

In accordance with some embodiments, receiving a thirteenth input representing a second rotation of the rotatable input mechanism; in response to receiving the thirteenth input, determining whether the visual indicator is proximate an object not associated with any contact; and in accordance with a determination that the visual indicator is proximate the object not associated with any contact, updating display of the affordance to an add contact affordance.

In accordance with some embodiments, receiving a fourteenth input corresponding to a selection of the add contact; and in response to receiving the fourteenth input, displaying a user interface for adding a contact.

In accordance with some embodiments, the visual appearance of the affordance is a set of initials representing a contact of the plurality of contacts or an image representing a contact of the plurality of contacts.

In accordance with some embodiments, the set of initials is a monogram.

In accordance with some embodiments, the plurality of objects comprise twelve circular objects positioned around the affordance.

In accordance with some embodiments, determining whether one or more messages received from one of the plurality of contacts is unread; and in accordance with a determination that a message received from one of the plurality of contacts is unread, displaying an indicator proximate to the object of the plurality of objects associated with the one or more messages.

In accordance with some embodiments, the indicator includes an indication of the number of the one or more unread messages.

In accordance with some embodiments, each object of the plurality of objects includes a unique color scheme.

In accordance with some embodiments, the visual indicator comprises a triangular shape movable about the affordance.

In accordance with some embodiments, each object of the plurality of objects includes a set of initials associated with contact associated with the object.

In accordance with some embodiments, the set of initials is a monogram.

In accordance with some embodiments, each of the plurality of objects is associated with an hour mark of a clock.

Figure 23:
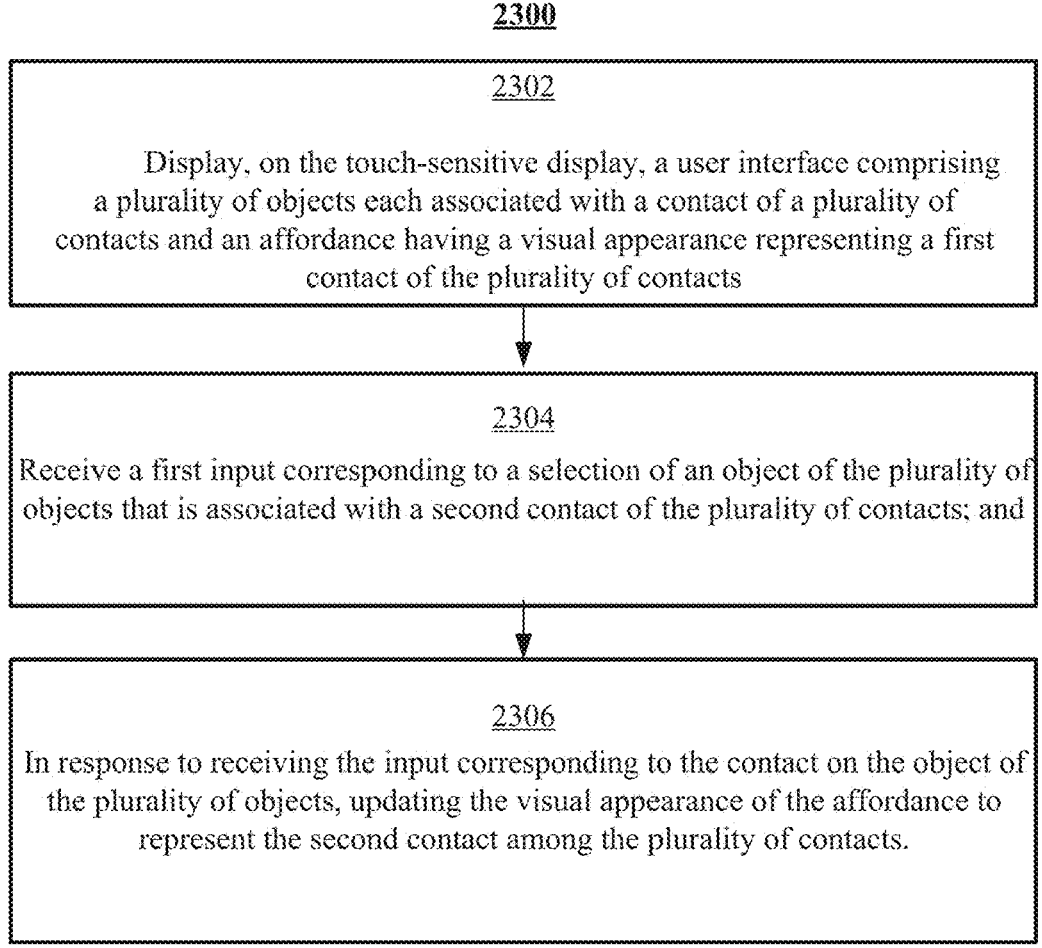

FIG. 23 is a flow diagram illustrating a method 2300 of updating a visual appearance of an affordance, in accordance with some embodiments. Method 2300 may be performed at a device (e.g., 100, 300, 500, 550, and 1800) with a touch-sensitive display and a rotatable input mechanism Some operations in method 2300 may be combined, the order of some operations may be changed, and some operations may be omitted.

In some embodiments, a rotatable input mechanism (e.g., rotatable input mechanism 506) may be configured to receive user input. In some embodiments, method 2300 may be performed at an electronic device with a touch-sensitive surface/display (e.g., 112, 355, and 504). Example devices that may perform method 2300 include devices 100, 300, 500, 550, 1800 (FIGS. 1A, 3, 5A, and 18A-18I).

As described below, method 2300 provides an intuitive way for interacting with an electronic device by updating a visual appearance of an affordance. The method reduces the physical and/or cognitive burden on a user who may engage the rotatable input mechanism during various activities, thereby creating a more efficient human-machine interface.

At block 2302, method 2300 may display, on the touch-sensitive display, a user interface comprising a plurality of objects each associated with a contact of a plurality of contacts and an affordance having a visual appearance representing a first contact of the plurality of contacts. At block 2304, method 2300 may receive a first input corresponding to a selection of an object of the plurality of objects that is associated with a second contact of the plurality of contacts. At block 2306, method 2300 in response to receiving the input corresponding to the contact on the object of the plurality of objects, updating the visual appearance of the affordance to represent the second contact among the plurality of contacts.

Figure 24:
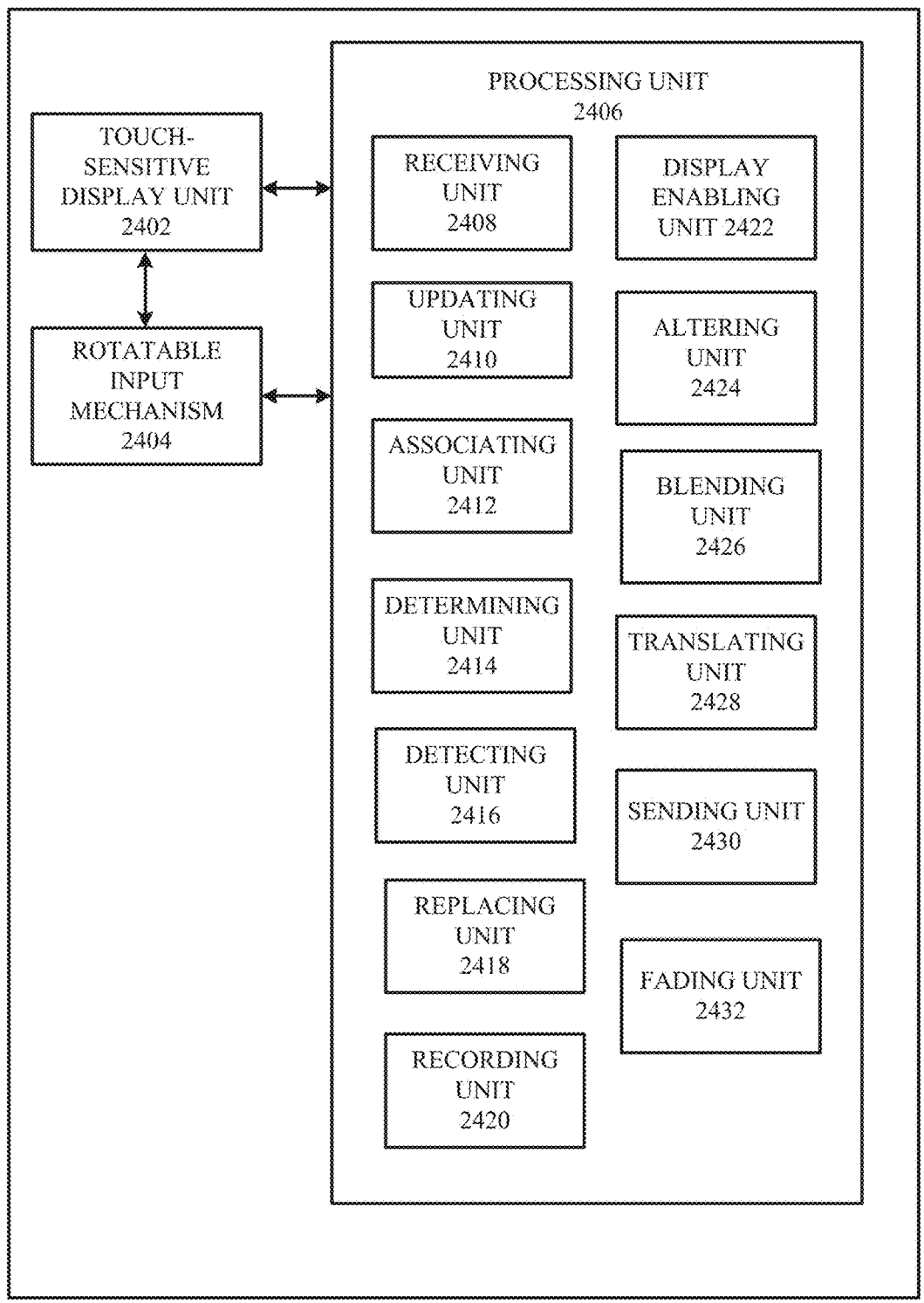
FIGS. 24-25 is a functional block diagram of an electronic device in accordance with some embodiments.

In accordance with some embodiments, FIG. 24 shows an exemplary functional block diagram of an electronic device 2400 configured in accordance with the principles of the various described embodiments. In accordance with some embodiments, the functional blocks of electronic device 2400 are configured to perform the techniques described above. The functional blocks of the device 2400 are, optionally, implemented by hardware, software, or a combination of hardware and software to carry out the principles of the various described examples. It is understood by persons of skill in the art that the functional blocks described in FIG. 24 are, optionally, combined or separated into sub-blocks to implement the principles of the various described examples. Therefore, the description herein optionally supports any possible combination or separation or further definition of the functional blocks described herein.

As shown in FIG. 24, an electronic device 2400 includes a touch-sensitive display unit 2402, a rotatable input mechanism 2404, and a processing unit 2406 coupled to the touch-sensitive display unit 2402 and the rotatable input mechanism 2404. In some embodiments, the processing unit 2406 includes receiving unit 2408, updating unit 2410, associating unit 2412, determining unit 2414, detecting unit 2416, replacing unit 2418, recording unit 2420, display enabling unit 2422, altering unit 2424, blending unit 2426, translating unit 2428, sending unit 2430, and fading unit 2432.

The processing unit 2406 is configured to: display (e.g., using display enabling unit 2422), on the touch-sensitive display unit 2402, a user interface comprising a plurality of objects each associated with a contact of a plurality of contacts and an affordance having a visual appearance representing a first contact of the plurality of contacts; receive (e.g., using receiving unit 2408) a first input corresponding to a rotation of the rotatable input mechanism; and in response to receiving the input corresponding to the rotation of the rotatable input mechanism, update (e.g., using updating unit 2410) the visual appearance of the affordance to represent a second contact among the plurality of contacts.

In accordance with some embodiments, the user interface further comprises a visual indicator associated with a first object of the plurality of objects, the first object associated with the first contact of the plurality of contacts.

In accordance with some embodiments, the processing unit 2406 further configured to further in response to receiving the first input corresponding to the rotation of the rotatable input mechanism: cease to associate the visual indicator with the first object of the plurality of objects, and associate (e.g., using associating unit 2412) the visual indicator with an object of the plurality of objects that is associated with the second contact of the plurality of contacts.

In accordance with some embodiments, the processing unit 2406 further configured to display (e.g., using display enabling unit 2422), as part of the user interface, a visual indicator in accordance with a position value, the value being within a range of position values, each of the objects plurality of objects associated with a position within the range of position values; further in response to the first input, determining (e.g., using determining unit 2414) whether the first input is a request to update the position value of the visual indicator to a second position value that is not associated with an object of the plurality of objects; in accordance with a determination that the first input is a request to update the position value of the visual indicator to a second position value that is not associated with an object of the plurality of objects: updating the position value of the visual indicator to a third position value that corresponds to the position value of the object of the plurality of objects that is nearest to the second position value within the range of position values; and updating display of the visual indicator in accordance with the third position value.

In accordance with some embodiments, the processing unit 2406 further configured to wherein ceasing to associate the visual indicator with the first object of the plurality of objects, and associating the visual indicator with the second contact of the plurality of contacts comprises: determining that the rotation of the rotatable input mechanism did not result in the association of the visual indicator with the second contact of the plurality of contacts; in accordance with a determination that the rotation of the rotatable input mechanism did not result in the association of the visual indicator with the second contact of the plurality of contacts, determining whether a position of the visual indicator is in an object transition region, wherein the object transition region is a region located after the first object and before a second object associated with the second contact; in accordance with a determination that the position of the visual indicator is in the object transition region, associating the visual indicator with the second contact of the plurality of contacts; in accordance with a determination that the position of the visual indicator is not in the object transition region, maintaining association of the visual indicator with the first object of the plurality of objects.

In accordance with some embodiments, the processing unit 2406 further configured to the visual indicator is a discrete area in which one or more displayed colors of the affordance are altered, the method further comprising: further in response to receiving the first input corresponding to the rotation of the rotatable input mechanism: altering (e.g., using altering unit 2424) a color of the visual indicator from a first color based on a color of the first object of the plurality of objects to a second color based on a color of a second object of the plurality of objects.

In accordance with some embodiments, the processing unit 2406 further configured to alter (e.g., using altering unit 2424) the color of the visual indicator from the first color associated with the first object of the plurality of objects to the second color associated with the second contact of the plurality of contacts comprises blending (e.g., using blending unit 2426) the first color and the second color as the visual indicator moves from a first position associated with the first object to a second position preceding a position of a second object associated with the contact.

In accordance with some embodiments, the visual indicator is associated with the first object of the plurality of objects when the visual indicator is at a first position that overlaps with at least a portion of the first object and one or more displayed colors of the first object are altered.

In accordance with some embodiments, the processing unit 2406 further configured to ceasing to associate the visual indicator with the first object of the plurality of objects, and associating the visual indicator with the second contact of the plurality of contacts comprises translating (e.g., using translating unit 2428) the visual indicator from the first position to a second position that overlaps with at least a portion of the second object and one or more displayed colors of the second object are altered.

In accordance with some embodiments, the processing unit 2406 further configured to: the visual appearance of the affordance is an animated representation of the first contact when the affordance represents the first contact and wherein updating the visual appearance of the affordance to represent a second contact among the plurality of contacts comprises updating the visual appearance of the affordance to an animated representation of the second contact.

In accordance with some embodiments, the processing unit 2406 further configured to: the animated representation of the first contact is dynamically based on information selected from the group consisting of time zone information of the second contact, location information of the second contact, information regarding a state designated by the second contact, and a combination thereof.

In accordance with some embodiments, t the processing unit 2406 further configured to: after updating the visual appearance of the affordance, receive a second input corresponding to selection of a third object of the plurality of objects, the third object different than the first object and the second object, in response to receiving the second input, updating the visual appearance of the affordance to represent a third contact among the plurality of contacts.

In accordance with some embodiments, the processing unit 2406 further configured to: after updating the visual appearance of the affordance, determine that no input has been received for a period of time; and in response to determining that no input has been received for the period of time, forgoing display of the plurality of objects.

In accordance with some embodiments, the processing unit 2406 further configured to: after updating the visual appearance of the affordance, detect (e.g., using detecting unit 2416) a third input corresponding to a selection of the affordance; and in response to detecting the third input, forgoing display of the plurality of objects.

In accordance with some embodiments, the processing unit 2406 further configured to: further in response to determining that no input has been received for the period of time, display (e.g., using display enabling unit 2422) a second affordance.

In accordance with some embodiments, the processing unit 2406 further configured to: further in response to detecting the third input, display a second affordance.

In accordance with some embodiments, the second affordance comprises one or more affordances selected from the group consisting of a call affordance, a message affordance, a tutorial affordance, an affordance to restore the user interface comprising a plurality of objects, and a drawing affordance.

In accordance with some embodiments, the second affordance is a tutorial affordance, the processing unit 2406 further configured to: detect (e.g., using detecting unit 2416) a fourth input corresponding to a selection of the tutorial affordance; and in response to detecting the fourth input, displaying a user interface comprising one or more instructions for operating the electronic device.

In accordance with some embodiments, the second affordance comprises a drawing affordance, the processing unit 2406 further configured to: detecting a fifth input corresponding to a selection of the drawing affordance; and in response to detecting the fifth input, displaying a drawing area, wherein the drawing area is responsive to touch input.

In accordance with some embodiments, the processing unit 2406 further configured to: detect a sixth input corresponding to a first stroke in the drawing area; and in response to detecting the sixth input, displaying a visual representation, in the drawing area, of the first stroke.

In accordance with some embodiments, the processing unit 2406 further configured to: further in response to detecting the sixth input, determine whether a first predetermined duration of time has passed after the sixth input; in accordance with a determination that the first predetermined duration of time has passed after the sixth input, sending (e.g., using sending unit 2430) data representing the first stroke to an external device associated with the second contact.

In accordance with some embodiments, the processing unit 2406 further configured to: the sixth input corresponds to two or more strokes including the first stroke forming a drawing, the method further comprising: further in response to detecting the sixth input, determining whether a first predetermined duration of time has passed after the sixth input; in accordance with a determination that the first predetermined duration of time has passed after the sixth input, sending data representing the drawing to an external device associated with the second contact.

In accordance with some embodiments, the processing unit 2406 further configured to: the drawing area includes a drawing lock affordance that permits only a drawing in the drawing area, the method further comprising: detecting a seventh input corresponding to a selection of the drawing lock affordance; in response to detecting the seventh input, disabling sending of data representing any strokes in the drawing area; and replacing (e.g., using replacing unit 2418) the drawing lock affordance with a send affordance that permits a transmission of the drawing to an external device.

In accordance with some embodiments, the processing unit 2406 further configured to: detect an eighth input corresponding to a selection of the send affordance; and in response to detecting the eighth input, enabling sending of data representing any strokes in the drawing area.

In accordance with some embodiments, the electronic device comprises one or more motion sensors, the processing unit 2406 further configured to: receive an ninth input corresponding to a stroke in the drawing area; in response to receiving the ninth input, displaying a visual representation, in the drawing area, of the stroke; detecting a tenth input corresponding to motion of the electronic device; in response to detecting the tenth input, determining if the motion of the electronic device meets a motion threshold, and in response to detecting the tenth input and in accordance with a determination that the motion meets or exceeds the motion threshold, ceasing to display the visual representation of the stroke.

In accordance with some embodiments, the processing unit 2406 further configured to: cease to display the visual representation of the stroke comprises fading (e.g., using fading unit 2432) out the visual representation of the first stroke after a predetermined duration of time.

In accordance with some embodiments, the processing unit 2406 further configured to: receive an eleventh input representing a stroke in the drawing area; while receiving the eleventh input, displaying an animated dissipation of residue along the stroke; displaying a visual representation, in the drawing area, of the stroke; and fading out the visual representation of the stroke from the drawing area, wherein fading out the visual representation includes displaying a gradual dispersion animation of the stroke.

In accordance with some embodiments, the processing unit 2406 further configured to: further in response to determining that no input has been received for the period of time, determine whether the contact currently represented by the affordance is associated with a device capable of processing and displaying data representing strokes in a drawing; in accordance with a determination that the contact currently represented by the affordance is associated with a device capable of processing and displaying data representing strokes in a drawing, displaying a drawing affordance; in accordance with a determination that contact currently represented by the affordance is not associated with a device capable of processing and displaying data representing strokes in a drawing, forgoing display of the drawing affordance.

In accordance with some embodiments, the processing unit 2406 further configured to: further in response to the third input, determine whether the contact currently represented by the affordance is associated with a device capable of processing and displaying data representing strokes in a drawing; in accordance with a determination that the contact currently represented by the affordance is associated with a device capable of processing and displaying data representing strokes in a drawing, displaying a drawing affordance; in accordance with a determination that contact currently represented by the affordance is not associated with a device capable of processing and displaying data representing strokes in a drawing, forgoing display of the drawing affordance.

In accordance with some embodiments, the processing unit 2406 further configured to: detect a twelfth input representing a contact on the touch-sensitive display; determining that a duration of the twelfth input meets or exceeds a contact duration threshold; in accordance with a determination that the duration of the twelfth input meets or exceeds a contact duration threshold, recording (e.g., using recording unit 2420) an audio message; and sending the audio message to an electronic device associated with the second contact.

In accordance with some embodiments, the processing unit 2406 further configured to: receive a thirteenth input representing a second rotation of the rotatable input mechanism; in response to receiving the thirteenth input, determining whether the visual indicator is proximate an object not associated with any contact; and in accordance with a determination that the visual indicator is proximate the object not associated with any contact, updating display of the affordance to an add contact affordance.

In accordance with some embodiments, the processing unit 2406 further configured to: receive a fourteenth input corresponding to a selection of the add contact; and in response to receiving the fourteenth input, displaying a user interface for adding a contact.

In accordance with some embodiments, the visual appearance of the affordance is a set of initials representing a contact of the plurality of contacts or an image representing a contact of the plurality of contacts.

In accordance with some embodiments, the set of initials is a monogram.

In accordance with some embodiments, the plurality of objects comprise twelve circular objects positioned around the affordance.

In accordance with some embodiments, the processing unit 2406 further configured to: determine whether one or more messages received from one of the plurality of contacts is unread; and in accordance with a determination that a message received from one of the plurality of contacts is unread, displaying an indicator proximate to the object of the plurality of objects associated with the one or more messages.

In accordance with some embodiments, the indicator includes an indication of the number of the one or more unread messages.

In accordance with some embodiments, each object of the plurality of objects includes a unique color scheme.

In accordance with some embodiments, the visual indicator comprises a triangular shape movable about the affordance.

In accordance with some embodiments, each object of the plurality of objects includes a set of initials associated with contact associated with the object.

In accordance with some embodiments, the set of initials is a monogram.

In accordance with some embodiments, each of the plurality of objects is associated with an hour mark of a clock.

In some embodiments, to display the user interface comprising the plurality of objects, the processing unit 2406 is further configured to display the user interface comprising a page indicator associated with a first page and a second page of the user interface, the processing unit is further configured to: receive (e.g., using receiving unit 2408) an input corresponding to a request to display the second page; in response to receiving the input corresponding to the request to display the second page, replace (e.g., using replacing unit 2418) display of the first page with the second page, wherein the second page is distinct from the first page.

In some embodiments, the second page includes a second plurality of objects each associated with a contact of the plurality of contacts.

In some embodiments, the user interface is associated with the first page and a second user interface is associated with a second user interface, and wherein replacing display of the first page with the second page includes replacing the user interface with the second user interface.

In some embodiments, the input is a swipe gesture on the touch-sensitive display.

Figure 25:
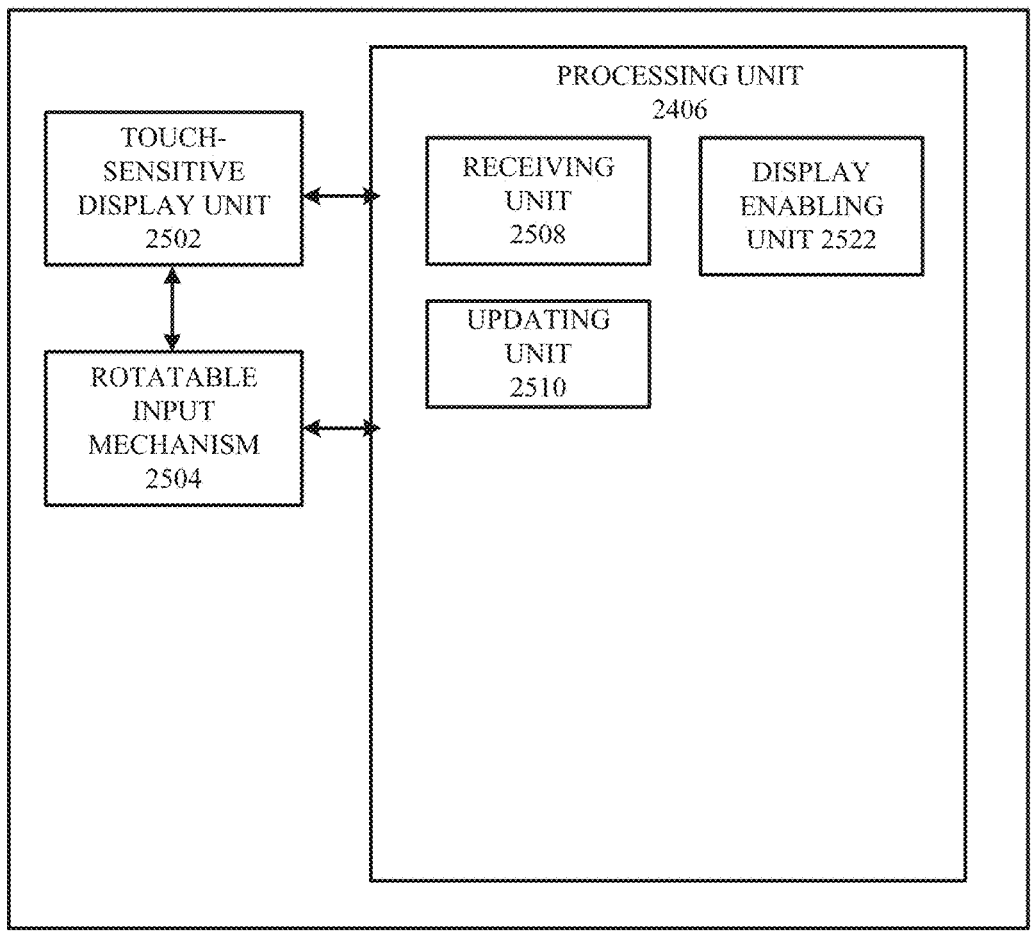

In accordance with some embodiments, FIG. 25 shows an exemplary functional block diagram of an electronic device 2500 configured in accordance with the principles of the various described embodiments. In accordance with some embodiments, the functional blocks of electronic device 2500 are configured to perform the techniques described above. The functional blocks of the device 2500 are, optionally, implemented by hardware, software, or a combination of hardware and software to carry out the principles of the various described examples. It is understood by persons of skill in the art that the functional blocks described in FIG. 25 are, optionally, combined or separated into sub-blocks to implement the principles of the various described examples. Therefore, the description herein optionally supports any possible combination or separation or further definition of the functional blocks described herein.

As shown in FIG. 25, an electronic device 2500 includes a touch-sensitive display unit 2502, a rotatable input mechanism 2504, and a processing unit 2506 coupled to the touch-sensitive display unit 2502 and the rotatable input mechanism 2504. In some embodiments, the processing unit 2506 includes receiving unit 2508, updating unit 2510, display enabling unit.

The processing unit 2406 is configured to: display (e.g., using display enabling unit 2522), on the touch-sensitive display unit 2502, a user interface comprising a plurality of objects each associated with a contact of a plurality of contacts and an affordance having a visual appearance representing a first contact of the plurality of contacts; receive (e.g., using receiving unit 2508) a first input corresponding to a selection of an object of the plurality of objects that is associated with a second contact of the plurality of contacts; and in response to receiving the input corresponding to the contact on the object of the plurality of objects, update (e.g., suing updating unit 2510) the visual appearance of the affordance to represent the second contact among the plurality of contacts.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the appended claims.

What is claimed is:

1. An electronic device comprising:
   a touch-sensitive display;
   a rotatable input mechanism;
   one or more processors;
   a memory; and
   one or more programs, wherein the one or more programs are stored in the memory and configured to be executed by the one or more processors, the one or more programs including instructions for:
      displaying, on the touch-sensitive display, a user interface comprising a plurality of objects each associated with a contact of a plurality of contacts and an affordance having a visual appearance representing a first contact of the plurality of contacts;
      receiving a first input corresponding to a selection of an object of the plurality of objects that is associated with a second contact of the plurality of contacts;
      in response to receiving the first input corresponding to the selection of the object of the plurality of objects that is associated with the second contact of the plurality of contacts, updating the visual appearance of the affordance to represent the second contact among the plurality of contacts;

after updating the visual appearance of the affordance to represent the second contact among the plurality of contacts, receiving a second input corresponding to a selection of an object that is not associated with any contact, wherein the selection of the object that is not associated with any contact corresponds to a rotation of the rotatable input mechanism;

in response to receiving the second input corresponding to the selection of the object that is not associated with any contact, updating display of the affordance to an add contact affordance, wherein the add contact affordance was not displayed prior to detecting the second input corresponding to the selection of the object that is not associated with any contact;

after displaying the add contact affordance, receiving a third input corresponding to a selection of the add contact affordance; and in response to receiving the third input corresponding to the selection of the add contact affordance, displaying a user interface for adding a contact.

2. The electronic device of claim 1, wherein, prior to receiving the second input corresponding to the selection of the object that is not associated with any contact, a visual indicator is associated with a first object of the plurality of objects, and wherein the first object is associated with the first contact of the plurality of contacts.

3. The electronic device of claim 2, the one or more programs further including instructions for:
further in response to receiving the first input corresponding to the selection of the object of the plurality of objects that is associated with the second contact of the plurality of contacts:
ceasing to associate the visual indicator with the first object of the plurality of objects; and
associating the visual indicator with the object of the plurality of objects that is associated with the second contact of the plurality of contacts.

4. The electronic device of claim 3, wherein ceasing to associate the visual indicator with the first object of the plurality of objects, and associating the visual indicator with the second contact of the plurality of contacts comprises:
determining that the selection of the object of the plurality of objects that is associated with the second contact of the plurality of contacts did not result in the association of the visual indicator with the second contact of the plurality of contacts;
in accordance with a determination that the selection of the object of the plurality of objects that is associated with the second contact of the plurality of contacts did not result in the association of the visual indicator with the second contact of the plurality of contacts, determining whether a position of the visual indicator is in an object transition region, wherein the object transition region is a region located after the first object and before a second object associated with the second contact;
in accordance with a determination that the position of the visual indicator is in the object transition region, associating the visual indicator with the second contact of the plurality of contacts; and
in accordance with a determination that the position of the visual indicator is not in the object transition region, maintaining association of the visual indicator with the first object of the plurality of objects.

5. The electronic device of claim 2, wherein the visual indicator is a discrete area in which one or more displayed colors of the affordance are altered, the one or more programs further including instructions for:
further in response to receiving the first input corresponding to the selection of the object of the plurality of objects that is associated with the second contact of the plurality of contacts:
altering a color of the visual indicator from a first color based on a color of the first object of the plurality of objects to a second color based on a color of a third object of the plurality of objects.

6. The electronic device of claim 1, the one or more programs further including instructions for:
displaying, a visual indicator in accordance with a first position value, the first position value being within a range of position values, each of the plurality of objects associated with a position within the range of position values;
further in response to receiving the second input corresponding to the selection-of the object that is not associated with any contact, determining whether the second input is a request to update the first position value of the visual indicator to a second position value that is not associated with an object of the plurality of objects; and
in accordance with a determination that the second input is a request to update the first position value of the visual indicator to a second position value that is not associated with an object of the plurality of objects:
updating the first position value of the visual indicator to a third position value that corresponds to a fourth position value of the object of the plurality of objects that is nearest to the second position value within the range of position values; and
updating display of the visual indicator in accordance with the third position value.

7. The electronic device of claim 1, wherein the visual appearance of the affordance is an animated representation of the first contact when the affordance represents the first contact, and wherein updating the visual appearance of the affordance to represent the second contact among the plurality of contacts comprises updating the visual appearance of the affordance to an animated representation of the second contact.

8. The electronic device of claim 1, the one or more programs further including instructions for:
after updating the visual appearance of the affordance, receiving a fourth input corresponding to selection of a fourth object of the plurality of objects, the third object different than a fifth object and a sixth object; and
in response to receiving the fourth input, updating the visual appearance of the affordance to represent a third contact among the plurality of contacts.

9. The electronic device of claim 1, the one or more programs further including instructions for:
after updating the visual appearance of the affordance, detecting a fifth input corresponding to a selection of the affordance; and
in response to detecting the fifth input, forgoing display of the plurality of objects.

10. The electronic device of claim 9, the one or more programs further including instructions for:
further in response to detecting the fifth input, displaying a second affordance.

11. The electronic device of claim 10, wherein the second affordance comprises a drawing affordance, the one or more programs further including instructions for:

detecting a sixth input corresponding to a selection of the drawing affordance; and in response to detecting the sixth input, displaying a drawing area, wherein the drawing area is responsive to touch input.

12. The electronic device of claim 1, wherein the plurality of objects comprise twelve circular objects positioned around the affordance.

13. The electronic device of claim 1, the one or more programs further including instructions for:

determining whether one or more messages received from one of the plurality of contacts is unread; and in accordance with a determination that a message received from one of the plurality of contacts is unread, displaying an indicator proximate to the object of the plurality of objects associated with the one or more messages.

14. The electronic device of claim 1, wherein displaying the user interface comprising the plurality of objects includes displaying a page indicator associated with a first page and a second page of the user interface, the one or more programs further including instructions for:

receiving a seventh input corresponding to a request to display the second page; and in response to receiving the seventh input corresponding to the request to display the second page, replacing display of the first page with the second page, wherein the second page is distinct from the first page.

15. The electronic device of claim 14, wherein the second page includes a second plurality of objects each associated with a contact of the plurality of contacts.

16. The electronic device of claim 14, wherein the user interface is associated with the first page and a second user interface is associated with a second user interface, and wherein replacing display of the first page with the second page includes replacing the user interface with the second user interface.

17. A non-transitory computer readable-storage medium storing one or more programs configured to be executed by one or more processors of an electronic device with a touch-sensitive display and a rotatable input mechanism, the one or more programs including instructions for:

displaying, on the touch-sensitive display, a user interface comprising a plurality of objects each associated with a contact of a plurality of contacts and an affordance having a visual appearance representing a first contact of the plurality of contacts;

receiving a first input corresponding to a selection of an object of the plurality of objects that is associated with a second contact of the plurality of contacts;

in response to receiving the first input corresponding to the selection of the object of the plurality of objects that is associated with the second contact of the plurality of contacts, updating the visual appearance of the affordance to represent the second contact among the plurality of contacts;

after updating the visual appearance of the affordance to represent the second contact among the plurality of contacts, receiving a second input corresponding to a selection of an object that is not associated with any contact, wherein the selection of the object that is not associated with any contact corresponds to a rotation of the rotatable input mechanism;

in response to receiving the second input corresponding to the selection of the object that is not associated with any contact, updating display of the affordance to an add contact affordance, wherein the add contact affordance was not displayed prior to detecting the second input corresponding to the selection of the object that is not associated with any contact;

after displaying the add contact affordance, receiving a third input corresponding to a selection of the add contact affordance; and in response to receiving the third input corresponding to the selection of the add contact affordance, displaying a user interface for adding a contact.

18. The non-transitory computer readable-storage medium of claim 17, wherein, prior to receiving the second input corresponding to the selection of an object that is not associated with any contact, a visual indicator is associated with a first object of the plurality of objects, and wherein the first object is associated with the first contact of the plurality of contacts.

19. The non-transitory computer readable-storage medium of claim 18, the one or more programs further including instructions for:

further in response to receiving the first input corresponding to the selection of the object that is associated with the second contact of the plurality of contacts:

ceasing to associate the visual indicator with the first object of the plurality of objects; and associating the visual indicator with the object of the plurality of objects that is associated with the second contact of the plurality of contacts.

20. The non-transitory computer readable-storage medium of claim 19, wherein ceasing to associate the visual indicator with the first object of the plurality of objects, and associating the visual indicator with the second contact of the plurality of contacts comprises:

determining that the selection of the object of the plurality of objects that is associated with the second contact of the plurality of contacts did not result in the association of the visual indicator with the second contact of the plurality of contacts;

in accordance with a determination that the selection of the object of the plurality of objects that is associated with the second contact of the plurality of contacts did not result in the association of the visual indicator with the second contact of the plurality of contacts, determining whether a position of the visual indicator is in an object transition region, wherein the object transition region is a region located after the first object and before a second object associated with the second contact;

in accordance with a determination that the position of the visual indicator is in the object transition region, associating the visual indicator with the second contact of the plurality of contacts; and in accordance with a determination that the position of the visual indicator is not in the object transition region, maintaining association of the visual indicator with the first object of the plurality of objects.

21. The non-transitory computer readable-storage medium of claim 18, wherein the visual indicator is a discrete area in which one or more displayed colors of the affordance are altered, the one or more programs further including instructions for:

further in response to receiving the first input corresponding to the selection of the object of the plurality of objects that is associated with the second contact of the plurality of contacts:

altering a color of the visual indicator from a first color based on a color of the first object of the plurality of objects to a second color based on a color of a third object of the plurality of objects.

22. The non-transitory computer readable-storage medium of claim 17, the one or more programs further including instructions for:
displaying, a visual indicator in accordance with a first position value, the first position value being within a range of position values, each of the plurality of objects associated with a position within the range of position values;
further in response to receiving the second input corresponding to the selection-of the object that is not associated with any contact, determining whether the second input is a request to update the first position value of the visual indicator to a second position value that is not associated with an object of the plurality of objects; and
in accordance with a determination that the second input is a request to update the first position value of the visual indicator to a second position value that is not associated with an object of the plurality of objects:
updating the first position value of the visual indicator to a third position value that corresponds to a fourth position value of the object of the plurality of objects that is nearest to the second position value within the range of position values; and
updating display of the visual indicator in accordance with the third position value.

23. The non-transitory computer readable-storage medium of claim 17, wherein the visual appearance of the affordance is an animated representation of the first contact when the affordance represents the first contact, and wherein updating the visual appearance of the affordance to represent the second contact among the plurality of contacts comprises updating the visual appearance of the affordance to an animated representation of the second contact.

24. The non-transitory computer readable-storage medium of claim 17, the one or more programs further including instructions for:
after updating the visual appearance of the affordance, receiving a fourth input corresponding to selection of a fourth object of the plurality of objects, the third object different than a fifth object and a sixth object; and
in response to receiving the fourth input, updating the visual appearance of the affordance to represent a third contact among the plurality of contacts.

25. The non-transitory computer readable-storage medium of claim 17, the one or more programs further including instructions for:
after updating the visual appearance of the affordance, detecting a fifth input corresponding to a selection of the affordance; and
in response to detecting the fifth input, forgoing display of the plurality of objects.

26. The non-transitory computer readable-storage medium of claim 25, the one or more programs further including instructions for:
further in response to detecting the fifth input, displaying a second affordance.

27. The non-transitory computer readable-storage medium of claim 26, wherein the second affordance comprises a drawing affordance, the one or more programs further including instructions for:
detecting a sixth input corresponding to a selection of the drawing affordance; and
in response to detecting the sixth input, displaying a drawing area, wherein the drawing area is responsive to touch input.

28. The non-transitory computer readable-storage medium of claim 17, wherein the plurality of objects comprise twelve circular objects positioned around the affordance.

29. The non-transitory computer readable-storage medium of claim 17, the one or more programs further including instructions for:
determining whether one or more messages received from one of the plurality of contacts is unread; and
in accordance with a determination that a message received from one of the plurality of contacts is unread, displaying an indicator proximate to the object of the plurality of objects associated with the one or more messages.

30. The non-transitory computer readable-storage medium of claim 17, wherein displaying the user interface comprising the plurality of objects includes displaying a page indicator associated with a first page and a second page of the user interface, the one or more programs further including instructions for:
receiving a seventh input corresponding to a request to display the second page; and
in response to receiving the seventh input corresponding to the request to display the second page, replacing display of the first page with the second page, wherein the second page is distinct from the first page.

31. The non-transitory computer readable-storage medium of claim 30, wherein the second page includes a second plurality of objects each associated with a contact of the plurality of contacts.

32. The non-transitory computer readable-storage medium of claim 30, wherein the user interface is associated with the first page and a second user interface is associated with a second user interface, and wherein replacing display of the first page with the second page includes replacing the user interface with the second user interface.

33. A method comprising:
at an electronic device with a touch-sensitive display and a rotatable input mechanism:
displaying, on the touch-sensitive display, a user interface comprising a plurality of objects each associated with a contact of a plurality of contacts and an affordance having a visual appearance representing a first contact of the plurality of contacts;
receiving a first input corresponding to a selection of an object of the plurality of objects that is associated with a second contact of the plurality of contacts;
in response to receiving the first input corresponding to the selection of the object of the plurality of objects that is associated with the second contact of the plurality of contacts, updating the visual appearance of the affordance to represent the second contact among the plurality of contacts;
after updating the visual appearance of the affordance to represent the second contact among the plurality of contacts, receiving a second input corresponding to a selection of an object that is not associated with any contact, wherein the selection of the object that is not associated with any contact corresponds to a rotation of the rotatable input mechanism;
in response to receiving the second input corresponding to the selection of the object that is not associated with any contact, updating display of the affordance to an add contact affordance, wherein the add contact affordance was not displayed prior to detecting the second input corresponding to the selection of the object that is not associated with any contact;

after displaying the add contact affordance, receiving a third input corresponding to a selection of the add contact affordance; and in response to receiving the third input corresponding to the selection of the add contact affordance, displaying a user interface for adding a contact.

34. The method of claim 33, wherein, prior to receiving the second input corresponding to the selection of the object that is associated with any contact, a visual indicator is associated with a first object of the plurality of objects, and wherein the first object is associated with the first contact of the plurality of contacts.

35. The method of claim 34, further comprising:

further in response to receiving the first input corresponding to the selection of the object of the plurality of objects that is associated with the second contact of the plurality of contacts:

ceasing to associate the visual indicator with the first object of the plurality of objects; and associating the visual indicator with the object of the plurality of objects that is associated with the second contact of the plurality of contacts.

36. The method of claim 35, wherein ceasing to associate the visual indicator with the first object of the plurality of objects, and associating the visual indicator with the second contact of the plurality of contacts comprises:

determining that the selection of the object of the plurality of objects that is associated with the second contact of the plurality of contacts did not result in the association of the visual indicator with the second contact of the plurality of contacts;

in accordance with a determination that the selection of the object of the plurality of objects that is associated with the second contact of the plurality of contacts did not result in the association of the visual indicator with the second contact of the plurality of contacts, determining whether a position of the visual indicator is in an object transition region, wherein the object transition region is a region located after the first object and before a second object associated with the second contact;

in accordance with a determination that the position of the visual indicator is in the object transition region, associating the visual indicator with the second contact of the plurality of contacts; and in accordance with a determination that the position of the visual indicator is not in the object transition region, maintaining association of the visual indicator with the first object of the plurality of objects.

37. The method of claim 35, wherein the visual indicator is a discrete area in which one or more displayed colors of the affordance are altered, the method further comprising:

further in response to receiving the first input corresponding to the selection of the object of the plurality of objects that is associated with the second contact of the plurality of contacts:

altering a color of the visual indicator from a first color based on a color of the first object of the plurality of objects to a second color based on a color of a third object of the plurality of objects.

38. The method of claim 33, further comprising:

displaying, a visual indicator in accordance with a first position value, the first position value being within a range of position values, each of the plurality of objects associated with a position within the range of position values;

further in response to receiving the second input corresponding to the selection-of the object that is not associated with any contact, determining whether the second input is a request to update the first position value of the visual indicator to a second position value that is not associated with an object of the plurality of objects; and in accordance with a determination that the second input is a request to update the first position value of the visual indicator to a second position value that is not associated with an object of the plurality of objects:

updating the first position value of the visual indicator to a third position value that corresponds to a fourth position value of the object of the plurality of objects that is nearest to the second position value within the range of position values; and updating display of the visual indicator in accordance with the third position value.

39. The method of claim 33, wherein the visual appearance of the affordance is an animated representation of the first contact when the affordance represents the first contact, and wherein updating the visual appearance of the affordance to represent the second contact among the plurality of contacts comprises updating the visual appearance of the affordance to an animated representation of the second contact.

40. The method of claim 33, further comprising:

after updating the visual appearance of the affordance, receiving a fourth input corresponding to selection of a fourth object of the plurality of objects, the third object different than a fifth object and a sixth object; and in response to receiving the fourth input, updating the visual appearance of the affordance to represent a third contact among the plurality of contacts.

41. The method of claim 33, further comprising:

after updating the visual appearance of the affordance, detecting a fifth input corresponding to a selection of the affordance; and in response to detecting the fifth input, forgoing display of the plurality of objects.

42. The method of claim 41, further comprising:

further in response to detecting the fifth input, displaying a second affordance.

43. The method of claim 42, wherein the second affordance comprises a drawing affordance, the method further comprising:

detecting a sixth input corresponding to a selection of the drawing affordance; and in response to detecting the sixth input, displaying a drawing area, wherein the drawing area is responsive to touch input.

44. The method of claim 33, wherein the plurality of objects comprise twelve circular objects positioned around the affordance.

45. The method of claim 33, the method further comprising:

determining whether one or more messages received from one of the plurality of contacts is unread; and in accordance with a determination that a message received from one of the plurality of contacts is unread, displaying an indicator proximate to the object of the plurality of objects associated with the one or more messages.

46. The method of claim 33, wherein displaying the user interface comprising the plurality of objects includes displaying a page indicator associated with a first page and a second page of the user interface, the one or more programs further including instructions for:
  receiving a seventh input corresponding to a request to display the second page; and
  in response to receiving the seventh input corresponding to the request to display the second page, replacing display of the first page with the second page, wherein the second page is distinct from the first page.

47. The method of claim 46, wherein the second page includes a second plurality of objects each associated with a contact of the plurality of contacts.

48. The method of claim 46, wherein the user interface is associated with the first page and a second user interface is associated with a second user interface, and wherein replacing display of the first page with the second page includes replacing the user interface with the second user interface.

* * * * *

UNITED STATES PATENT AND TRADEMARK OFFICE
CERTIFICATE OF CORRECTION

| | | |
|---|---|---|
| PATENT NO. | : 10,209,810 B2 | Page 1 of 1 |
| APPLICATION NO. | : 14/839919 | |
| DATED | : February 19, 2019 | |
| INVENTOR(S) | : Freddy Allen Anzures et al. | |

It is certified that error appears in the above-identified patent and that said Letters Patent is hereby corrected as shown below:

In the Claims

In Column 74, Line 20, Claim 6, delete "selection-of" and insert -- selection of --, therefor.

In Column 77, Line 12, Claim 22, delete "selection-of" and insert -- selection of --, therefor.

In Column 79, Line 13, Claim 34, before "associated" insert -- not --.

In Column 80, Line 5, Claim 38, delete "selection-of" and insert -- selection of --, therefor.

Signed and Sealed this
Eighteenth Day of June, 2019

Andrei Iancu
*Director of the United States Patent and Trademark Office*